United States Patent [19]
Tabata et al.

[11] Patent Number: 6,037,726
[45] Date of Patent: Mar. 14, 2000

[54] ELECTRIC MOTOR VEHICLE

[75] Inventors: Kunio Tabata; Minoru Kozaki; Issei Yamakoshi; Kunihiko Takagi; Yoshikazu Koike, all of Suwa; Takeo Sato, Yokohama; Nobuki Sasaki, Yokohama; Atsushi Mizukoshi, Yokohama, all of Japan

[73] Assignees: Seiko Epson Corporation; Tokyo R & D Co., Ltd., both of Tokyo, Japan

[21] Appl. No.: 09/244,899

[22] Filed: Feb. 4, 1999

Related U.S. Application Data

[62] Division of application No. 08/335,707, Dec. 8, 1994.

[30] Foreign Application Priority Data

| May 12, 1992 | [JP] | Japan | 4-119127 |
| Sep. 8, 1992 | [JP] | Japan | 4-239695 |
| Sep. 8, 1992 | [JP] | Japan | 4-239696 |
| Sep. 9, 1992 | [JP] | Japan | 4-240912 |
| Sep. 9, 1992 | [JP] | Japan | 4-240913 |
| Sep. 9, 1992 | [JP] | Japan | 4-240914 |
| Sep. 9, 1992 | [JP] | Japan | 4-240915 |
| Sep. 9, 1992 | [JP] | Japan | 4-240916 |
| Sep. 9, 1992 | [JP] | Japan | 4-240917 |
| Sep. 9, 1992 | [JP] | Japan | 4-240918 |
| Sep. 9, 1992 | [JP] | Japan | 4-240919 |
| Sep. 9, 1992 | [JP] | Japan | 4-240920 |
| Sep. 9, 1992 | [JP] | Japan | 4-240921 |
| Sep. 9, 1992 | [JP] | Japan | 4-240922 |
| Sep. 24, 1992 | [JP] | Japan | 4-254892 |
| Sep. 29, 1992 | [JP] | Japan | 4-283720 |
| Sep. 29, 1992 | [JP] | Japan | 4-283721 |

[51] Int. Cl.[7] .................................... H02P 1/00
[52] U.S. Cl. ............... 318/139; 318/430; 388/827; 180/65.8
[58] Field of Search ............... 318/430–434, 318/139; 388/825–827; 180/65.1, 65.3, 65.8

[56] References Cited

U.S. PATENT DOCUMENTS

| 3,858,674 | 1/1975 | Tabor | 318/161 |
| 4,679,484 | 7/1987 | Kemeny | 89/8 |
| 4,835,360 | 5/1989 | Parks et al. | 219/137 PS |
| 5,148,001 | 9/1992 | Stava | 219/137 PS |
| 5,149,287 | 9/1992 | Koike | 440/88 |
| 5,528,721 | 6/1996 | Searcy, II et al. | 388/824 |
| 5,900,686 | 5/1999 | Tabata et al. | 310/71 |

FOREIGN PATENT DOCUMENTS

52-002898   1/1977   Japan .

*Primary Examiner*—Brian Sircus
*Attorney, Agent, or Firm*—Kanesaka & Takeuchi

[57] ABSTRACT

An electric motor vehicle comprises as a drive system a battery, a motor, and a controller for controlling the rotation of the motor. The electric motor vehicle disposes an accelerator for controlling speed of the motor, a key switch for turning on or off the motor and the controller, a circuit for judging an opening/closing state of the accelerator when the key switch is turned on, and a circuit for preventing the rotation of the motor when the key switch is turned on with the accelerator open.

3 Claims, 56 Drawing Sheets

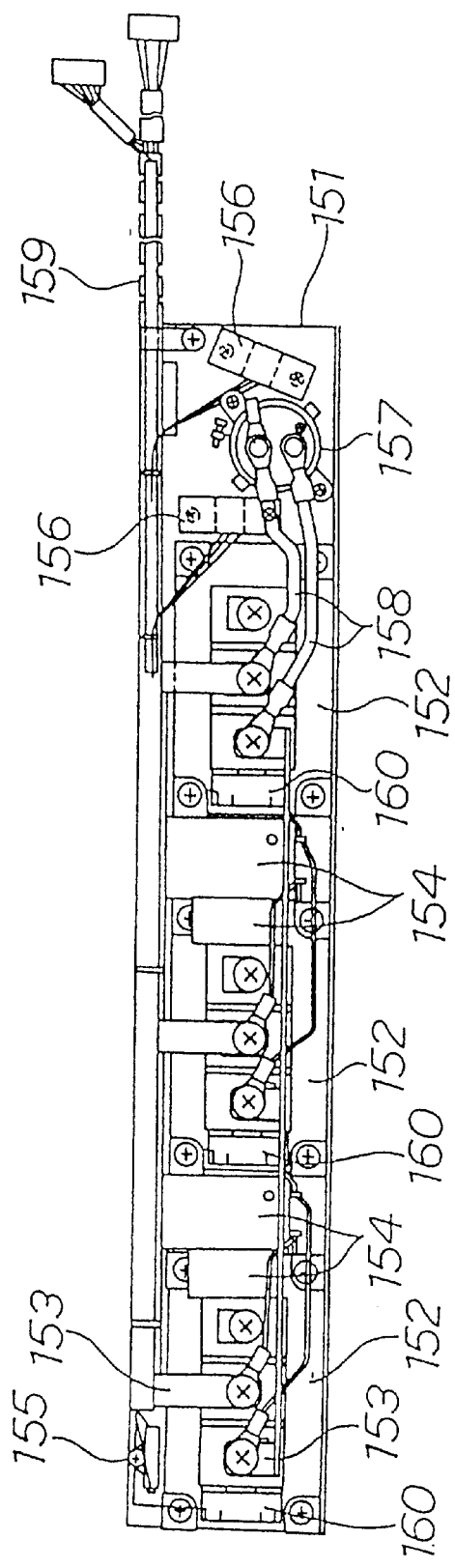
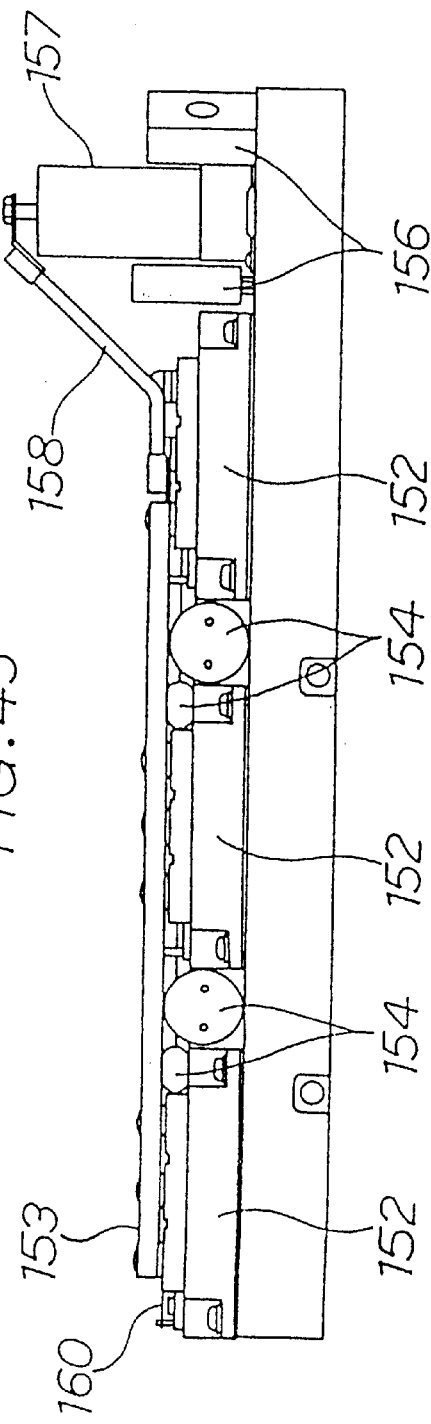
FIG. 44
FIG. 45

ELECTRIC MOTOR VEHICLE

CROSS REFERENCE TO RELATED APPLICATIONS

This application is a division of application Ser. No. 08/335,707 filed Dec. 8, 1994.

BACKGROUND OF THE INVENTION

This invention relates to an electric motor vehicle using a motor as a drive motive power, and particularly to an electric motor vehicle which is preferably applied to two wheelers and three wheelers such as motorcycles and scooters.

It is now said to be an age of electric motor vehicles. It is said that the electric motor vehicles will solve most of the environmental issues such as the exhaust gas from automobiles which is said to make up about 70% of air pollution, noises, or the like, and will extend the life of oil resources by two times or more.

Known electric motor vehicles are provided as their drive system with a battery, a motor, and a controller for controlling the speed of the motor, and a wheel is rotated by a drive transmission mechanism like conventional automobiles, or a wheel is rotated by a motor disposed on it without necessitating such a drive transmission mechanism like conventional automobiles. And, in developing an electric motor vehicle, the improvement of the performance of an onboard battery is an issue to be solved and it will not be long before it is solved.

Incidentally, the electric motor vehicle is also demanded to have its safety improved together with the improvement of its performance. A mere replacement of the drive motive power of a conventional gasoline automobile by a motor can not sufficiently provide the safety of the electric motor vehicle. Specifically, the electric motor vehicle uses electricity for a drive source, and the power is a motor which rotates at a high speed as compared with an engine. Therefore, a trouble of the electric system or a failure of the motor may suddenly stop a running vehicle or suddenly start a vehicle which was out of action. Besides, in common to a running vehicle and a stopping vehicle, there is the possibility that a driver or a mechanic may suffer from an electric shock, be caught by the drive unit in the vicinity of the motor, or break the motor or the controller when servicing. These troubles or the necessity of protection is caused due to the device or structure peculiar in the electric motor vehicle, which is not seen in conventional automobiles.

The inventors involved in the development of an electric motor vehicle have proposed the following points to prevent accidents or failures from occurring and to assure safety.

First point for safety: To avoid a travel motion trouble of the electric motor vehicle which may suddenly occur when traveling, for example, a sudden stop of the electric motor vehicle.

When the vehicle is exposed to wind and rain and suffers from vibration when traveling, water may enter the motor or the electric control circuit, causing an insulation failure (electrical short). This is very dangerous because it leads to a stop of the electrical motor vehicle. In this connection, the improvement of a stator fixing structure, a motor case structure, and a waterproof structure of electronic equipment will be proposed. And, the vibration during traveling loosens individual sections or causes component parts to come off, resulting in stopping the motor or lowering the efficiency of the drive transmission mechanism. This will cause the electric motor vehicle to stop. In this connection, the improvement of a stator fixing structure, an attaching structure of a fixed substrate of a magnetic detecting element, a buildup structure of a power transmission mechanism, a switch structure, and a fixing structure of an encoder magnet will be proposed.

Second point for safety: To prevent a sudden start of the electronic motor vehicle which may happen suddenly.

Since the motor has a rapid start-up of rotation and a high torque at a low speed, the electric motor vehicle may start suddenly depending on a way of driving operation. This is very dangerous. On this point, the improvement of a drive controller will be proposed.

Third point for safety: To avoid a danger when inspecting the electric motor vehicle.

In view of preventing an electric shock, the improvement of a power circuit and a stator winding will be proposed.

Fourth point for safety: To protect the controller and the drive unit of the electric motor vehicle.

Overheating of the motor may result in its breakdown. On this point, a protection device will be proposed. Since this protection device prevents a breakdown of the motor from happening and also prevents a sudden stop of the vehicle due to the motor failure, it also relates to the above first point for safety. And, in view of preventing destruction of the device due to malfunction, the improvement of a protection device and a structure for protecting the drive unit in packaging, transporting and assembling works will be proposed.

The above first to fourth points for safety are not sufficient if any of them is alternatively disposed on the electric motor vehicle but all of them shall be preferably disposed on the electric motor vehicle. And, the above first to seventeenth inventions relate to the drive system of the electric motor vehicle and also to at least any of the above first to fourth points for safety, and some of them relate to more than one of the above points. Specifically, the above first to seventeenth inventions of this application are closely related to one another for securing safety. They will be described hereinafter in detail to clarify the contents of this application which aims to obtain an electric motor vehicle having high safety.

SUMMARY OF THE INVENTION

A conventional motor is known to have a structure to prevent the entry of water from outside as shown in FIG. 53. As shown in FIG. 53, it is known that a stator 203 is fixed to a motor case 201 by shrinkage fitting or press fitting, and an O-ring 205 is fitted at an engagement section of the motor case 201 and a motor cover 202. And, when a fastening bolt 204 is turned to tighten the motor cover 202 against the motor case 201, the O-ring 205 is adequately crushed to seal the motor case 201 and the motor cover 202.

The above conventional structure has a drawback that machining is difficult because holes of the motor case for fitting the stator have to be machined accurately, though sealing properties are good. And, since assembling needs two steps, one for fixing the stator by shrinkage fitting or press fitting, and the other for sealing a space between the motor case and the motor cover with the O-ring, it is necessary to reduce the works in view of workability.

Further, it is known that a brushless motor which is often used for the electric motor vehicle has its performance greatly affected depending on the agreement or disagreement between a detector for detecting a position of a rotor and a circumferential position of the stator. And, because the stator which is once fixed can not be moved in the circumferential direction, a guide for positioning is needed to previously determine a position of the stator and to pinpointedly fix to the motor case. Therefore, it has drawbacks that the structure becomes complex and the manufacturing is difficult. And, when the stator is fixed at a position different from a predetermined position, there is a disadvantage that the motor performance cannot be exhibited fully.

Then, the invention of this application has been completed to remedy the above drawbacks. Specifically, this invention, in an electric motor vehicle which has as the drive system a battery, a motor, and a controller for controlling the rotation of the motor, is characterized by fixing a stator between a motor case and a motor cover and sealing a space between the motor case and the motor cover with a filler.

Therefore, this invention remedies the above drawbacks and particularly retains sealing properties, enabling to prevent an insulation failure due to the entry of water into the motor. And, the above first point for safety, or a sudden stop of the electric motor vehicle, can be avoided.

A power transmission section of an electric motor vehicle has a high probability to be exposed to wind and rain, and covered with dust or mud when the vehicle is running. Therefore, if a casing is not securely closed, there is a high probability of causing a failure in functional parts (contents) of a motor attached to a power transmission device and elements of the power transmission device. Consequently, it is an important issue how a closing method is rationally realized. Sealing a part (output shaft) for taking out a turning force from a motor makes a structure complex, and using a contact type sealant results in a load, preventing an efficient transmission of power. And, for an electric motor vehicle, there is an issue how a motor for power is miniaturized. Therefore, it is an important issue to rationally make arrangement and form of parts forming the motor.

Then, the invention of this application has been completed to remedy the above issues. Specifically, in an electric motor vehicle which has as the drive system a battery, a motor, and a controller for controlling the rotation of the motor, this invention has characteristics that the power of the above motor is transmitted to a wheel through a power transmission mechanism, the motor is fixed at one end of a case for accommodating the power transmission mechanism, and a coupling section of the motor and the case is sealed by a sealant excepting passages of a motor output shaft and a motor wiring. Therefore, this invention remedies the above drawbacks and particularly retains sealing properties, enabling to prevent an insulation failure due to the entry of water into the motor. And, the above first point for safety, or a sudden stop of the electric motor vehicle, can be avoided.

As described above, the electric motor vehicle has a high probability to be exposed to wind and rain, and covered with dust or mud when running. Therefore, it is a significant issue to rationally realize a waterproofing method for the electronic equipment of the electric motor vehicle.

Conventionally, the electronic equipment was housed in a closed container or covered with a silicon resin to provide a closed condition, thereby protecting the electronic equipment from mud or dust.

However, the method of housing in a closed container has difficulty in providing a completely closed state and has a disadvantage of increasing a weight depending on the closed container used. And, the method of covering with a silicon resin has an advantage of easily providing a closed state but has a disadvantage of increasing a weight by the silicon resin itself.

Then, the invention has been completed to solve the above problems, and aims to provide a structure which is light-weighted and whose closed state can be attained easily. Specifically, in an electric motor vehicle which has as the drive system a battery, a motor, and a controller for controlling the rotation of the motor, this invention has characteristics that electronic parts of electronic equipment forming all or parts of the controller and cables for connecting the electronic parts are covered with an epoxy resin coating or the like. Therefore, this invention remedies the above drawbacks and particularly retains sealing properties, enabling to prevent an insulation failure due to the entry of water into the electronic equipment. And, the above first point for safety, or a sudden stop of the electric motor vehicle, can be avoided.

A DC brushless motor used for the electric motor vehicle switches an excitation phase on a circuit depending on a rotor. Therefore, a detection element such as a Hall element is used to detect a position of the rotor with respect to a stator. When the Hall element is attached to the motor case, a change of the positional relation between the motor case and the stator causes the positional relation of the Hall element and the stator to be changed. To make the positional relation between the Hall element and the stator correct, a conventional DC brushless motor has a groove for positioning formed on the outer periphery of the stator and a hole for positioning formed on the end face of the stator.

FIG. 54 shows a perspective view of a stator for a conventional DC brushless motor. In this case a stator 203 is formed by multilaying tens of silicon steel plates which have a round hole for receiving a rotor therein and slots for winding a coil, and a hole 203a for positioning is formed at the stator end face. It is not shown, but a motor case has a pin embedded, so that the positioning is made by the pin of the motor case and the hole 203a.

But, the structure having the groove on the outer periphery of the stator or the structure having the hole at the stator end face makes a magnetic circuit of the stator small because of the groove or the hole and increases a magnetic flux density around the groove or the hole. Thus, it has disadvantages that a core loss of the motor increases and the motor efficiency is deteriorated.

Therefore, the invention aims to remedy the disadvantages of the prior art, to enhance safety, and to obtain an electric motor vehicle provided with a DC brushless motor having a good motor efficiency. Specifically, in an electric motor vehicle which has as the drive system a battery, a motor, and a controller for controlling the rotation of the motor, this invention is characterized by using as the above motor a DC brushless motor which detects the rotor position and switches an excitation phase, and this DC brushless motor has a projection on the outer periphery of a stator, a groove for engaging with the projection formed on a motor case, and engages the stator with the motor case. Therefore, this invention remedies the above drawbacks and particularly improves the accuracy of positioning, enabling to prevent a motor trouble which may be caused when the accuracy is poor. And, the above first point for safety, or a sudden stop of the electric motor vehicle, can be avoided.

As shown in FIG. 55, a DC brushless motor used for the electric motor vehicle has an encoder magnetic cover 207 having an encoder magnet 207 fixed by adhering and a rotor 208 for producing a drive magnetic field to a shaft 206. The encoder magnet 207 is magnetized axially. A sensor board 209 disposed to oppose to the encoder magnetic cover 207a is a ring whose inner diameter is larger than the outer diameter of a bearing 210, and whose outer diameter is smaller than a coil end inner diameter of a stator 203. On the sensor board 209, magnet detection elements 211 for detecting a magnetic field of the encoder magnet 207 are soldered. And, the sensor board 209 is disposed at a position to oppose to a magnetic pole of the encoder magnet 207 and fixed to the motor case 201 by a screw 212. The screw 212 has its head shaped to be as small as possible so that the pattern on the board does not suffer from a short circuit due to the head of the screw 212.

Since the above conventional DC brushless motor having the sensor board fixing structure has a small area of the sensor board, it is necessary to use a screw whose head is as small as possible to fix the sensor board to a case in such a manner that a copper foil pattern connecting the magnet detection elements on the sensor board does not cause a short circuit. When a screw with a small head is used, the magnet detection elements soldered to the sensor board protrude above the screw head axially. Therefore, in a state that the shaft is not fixed when assembling, the rotor comes into contact with the magnet detection elements giving an undue force thereto or peeling the soldering from the magnet detection elements, resulting in possibly causing the magnet detection elements to come off the sensor board. And, there is also a drawback that a fixing work of the sensor board is difficult because the screw is small.

Then, the invention aims to remedy the disadvantages of the prior art and to produce an electric motor vehicle having a sensor board fixing structure in which the sensor board can be easily fixed and a rotor does not come into contact with magnet detection elements regardless of the fixed state of a shaft. Specifically, in an electric motor vehicle which has as the drive system a battery, a motor, and a controller for controlling the rotation of the motor, this invention is characterized by using as the above motor a DC brushless motor which detects the rotor position and switches an excitation phase, and this DC brushless motor has a rotor which has a permanent magnet magnetized radially, encoder magnets which correspond to the number of pole pairs of the rotor and are magnetized axially, and a board which has more than one magnetic detection elements soldered to detect a position of the magnetic pole in the axial direction of the encoder magnet. Further, the above board is fixed by a screw at a position to oppose to the encoder magnet of the motor case and to detect the magnetic pole of the encoder magnet axially, and the head of the screw fixing the board protrudes axially above the magnet detection elements.

Further, in an electric motor vehicle which has as the drive system a battery, a motor, and a controller for controlling the rotation of the motor, this invention is characterized by using as the above motor a DC brushless motor which detects the rotor position and switches an excitation phase, and the above DC brushless motor has a rotor which supports a shaft by two bearings and has a permanent magnet magnetized radially, encoder magnets which correspond to the number of pole pairs of the rotor and are magnetized axially, and a board which has more than one magnetic detection elements soldered to detect a position of the magnetic pole in the axial direction of the encoder magnet.

Further, the above board is fixed by a screw at a position to oppose to the encoder magnet of the motor case and to detect the magnetic pole of the encoder magnet axially, and at least one of the above two bearings is fixed by press fitting from outside the case. Therefore, this invention remedies the above drawbacks and particularly provides a sensor board fixing structure in which a rotor does not come into contact with magnet detection elements, enabling to avoid a motor failure which may be caused if the rotor comes into contact with the magnet detection elements. And, the above first point for safety, or a sudden stop of the electric motor vehicle, can be avoided.

In a structure to transmit the power of a motor of an electric motor vehicle to a wheel via a power transmission mechanism, it is necessary to take into account the maximum angle (banking angle) of, for example, an electric motor two wheeler (scooter), which is an inward inclination of the wheeler caused when it turns a corner. This angle limits the mounting position of a motor to the wheeler body, narrowing a space between the motor shaft and the power transmission mechanism. Therefore, a conventional power transmission method cannot be merely utilized for an electric motor vehicle. Thus, it is always a designing issue to devise a motor size and arrangement. These problems are applied to not only the electric motor two wheelers but also all of electric motor vehicles such as three wheelers and four wheelers. In the above electric motor vehicles, it is necessary to consider a power transmission method which can be realized even when a space between the motor shaft and the power transmission mechanism is narrow and an assembling property to mount the motor to the power transmission mechanism.

Then, the invention aims to obtain a power transmission method which can be realized even when a space between the motor shaft and the power transmission mechanism is narrow, and to obtain a structure which provides an easy assembling property to mount the motor to the power transmission mechanism. Specifically, in an electric motor vehicle which has as the drive system a battery, a motor, and a controller for controlling the rotation of the motor, this invention is characterized by applying a spline shaft working to a coupling section of the motor shaft and the input shaft of the power transmission mechanism, and disposing a collar spline between the both shaft ends to transmit the power from the motor to the input shaft of the power transmission mechanism. Therefore, this invention remedies the above drawbacks and particularly improves reliability by the spline shaft, enabling to avoid a failure of the motor power transmission which may be caused easily conventionally. And, the above first point for safety, or a sudden stop of the electric motor vehicle, can be avoided.

A switch used for an electric motor vehicle generally has a mechanical contact only, and when the contact is kept open, a resistance value between terminals becomes infinite.

In an environment that vehicles are heavily vibrated, to avoid an incidental opening of a contact of the closed switch when being used, a circuit may be incorporated so that equipment operates with the contact open like, for example, a kill switch (emergency switch) of two wheelers. But, a conventional switch having such a circuit cannot distinguish a state that the contact is opened from a state that a conductor reaching the switch is broken (a state that the switch is detached). Therefore, the detachment of the switch when being used may not be found, resulting in a possibility that a prescribed function does not work even when the contact of the switch is closed. Such a situation becomes a life-threatening serious problem for the above kill switch of two wheelers.

Therefore, the invention aims to preclude the above risk and to obtain a switch for an electric motor vehicle which can extensively improve the reliability of equipment. Specifically, in an electric motor vehicle which has as the drive system a battery, a motor, and a controller for controlling the rotation of the motor, this invention is characterized by having a resistor built in or externally disposed in parallel between the contact terminals of one or more switches used. Therefore, this invention remedies the above drawbacks and particularly can exclude a risk of a conventional switch which does not work because a proper function works when the switch being used is detached. And, the above first point for safety, or a sudden running accident of the electric motor vehicle, can be avoided.

FIG. 56 shows a conventional encoder magnet fixing structure and is a vertical sectional view around a shaft and a rotor. In this drawing, a rotor 208 is formed by multilaying silicon steel plates having slots and inserting a magnet 213 for a field magnet into the slots. The silicon steel plates have even numbers of salient poles on the outer periphery, and each salient pole has at its base a slot for inserting the magnet for a field magnet. The magnets 213 for a field magnet are not axially fixed, so that they may come off the slots of the rotor 208. To prevent it from occurring, a disc 214 is attached to each end of the rotor 208. And, encoder magnets 207 which are used to detect the rotor position are fixed to an encoder magnet cover 207a, and fixed to a shaft 206 at a position apart from the rotor 208.

FIG. 57 is a perspective view showing a conventional encoder magnet and encoder magnet cover. It is shown that the encoder magnet has four poles. The encoder magnets 207 are magnetized in the thickness direction, and in this embodiment, since they are of four poles, four of them having a fan shape opened to about 90 degrees are used. And, the encoder magnet cover 207a has two score lines 207b made at an interval of 90 degrees for aligning the magnetic poles of the encoder magnets 207 with the magnetic pole position of the rotor. And, the encoder magnets 207 are fixed to the encoder magnet cover 207a by adhering so that the fan shape's circumferential end face is aligned with the score lines 207b, and the neighboring magnetic poles are inverted.

But, a brushless motor using such conventional encoder magnets needs the discs for preventing the magnets for a field magnet from coming off at the both ends of the rotor and the encoder magnet cover for fixing the encoder magnets, having a disadvantage that it has many numbers of parts. And, it also has a disadvantage that when the adhesion of the encoder magnets is separated, the encoder magnets are flown off within the motor, breaking the motor.

Further, since the encoder magnets are formed by adhering a plurality of fan-shaped magnets, part numbers are increased, and there is a disadvantage that the positional accuracy of the encoder magnets is poor though the magnet adhering work in alignment with the score lines on the encoder magnet cover is quite troublesome.

Therefore, the invention aims to remedy the above problems or drawbacks. Specifically, in an electric motor vehicle which has as the drive system a battery, a motor, and a controller for controlling the rotation of the motor, this invention has characteristics that the motor is a brushless motor comprising a rotor which has even numbers of salient poles on the outer periphery, slots for inserting magnets for a field magnet at the base of each salient pole, and the magnets for a field magnet inserted into the slots, two discs for preventing the magnets for a field magnet from coming out the slots, and an encoder magnet. And, the encoder magnet is incorporated into one of the discs, and all sides of the encoder magnet is covered with the discs and the rotor. Therefore, this invention remedies the above drawbacks and prevents the magnets for a field magnet from coming out the slots, enabling to prevent a breakage of the motor from happening when the magnets for a field magnet come out the slots. And, the above first point for safety, or a sudden stop of the electric motor vehicle, can be avoided.

In a conventional controller for the electric motor vehicle, a key switch and an accelerator work independently from each other and are not restricted by the other.

But, since the key switch and the accelerator work independently from each other in this conventional controller, when a driver turns on the key switch with the accelerator open, the electric motor vehicle makes an abrupt start. And, the abrupt start may result in an accident.

Therefore the invention has been completed to remedy the above drawbacks. Specifically, in an electric motor vehicle which has as the drive system a battery, a motor, and a controller for controlling the rotation of the motor, this invention is characterized by disposing an accelerator for controlling the speed of the motor, a key switch for turning on or off the motor and the controller, a circuit for judging the opening/closing state of the accelerator when the key switch is turned on, and a circuit for preventing the rotation of the motor when the key switch is turned on with the accelerator open. Therefore, this invention can prevent the above second point for safety, or an abrupt start of the electric motor vehicle.

The electric motor vehicle may need to be prevented from moving in view of safety. Specifically, it is necessary to prevent the electric motor vehicle from running when a door is open or a kickstand is erected for a scooter. Therefore, for example, it is considered to dispose a switch on a door or a kickstand and to configure a circuit to prevent running when the contact of the switch is open.

But, the disposition of such a switch may result in an unexpected accident because when the switch is turned off with the accelerator open and a travel prohibited state is shifted to a travel allowed state, the vehicle starts abruptly.

Therefore, the invention prevents such a risk and provides a safer travel prohibiting circuit. Specifically, in an electric motor vehicle which has as the drive system a battery, a motor, and a controller for controlling the rotation of the motor, this invention is characterized by disposing an accelerator for controlling the speed of the motor, a switch for prohibiting running, and a travel prohibiting circuit which judges the opening/closing of the accelerator and maintains a travel prohibiting state even when the switch is released with the accelerator open. And, the travel prohibiting circuit is characterized in that the travel prohibiting state which is continuously maintained when the switch is released with the accelerator open is shifted to a travel allowed state by closing the accelerator. Therefore, this invention can prevent the above second point for safety, or an abrupt start of the electric motor vehicle.

Generally, the electric motor vehicle uses electrical equipment provided with a large-capacity capacitor, and a residual charge is discharged from the large-capacity capacitor because it is dangerous if a person serving the vehicle touches it.

A conventional discharge circuit of this type is a resistive circuit, which is connected between the both electrodes of a large-capacity capacitor, and a residual charge is discharged through this resistive circuit.

However, for the electrical equipment for the electric motor vehicle, which is required to be small and light-weighted, the provision of a resistive circuit only for discharging a residual charge from a large-capacity capacitor has disadvantages that a space factor is deteriorated and a weight is increased.

Therefore, the invention has been completed in view of the above disadvantages and aims to improve a space factor and achieve the light weight by discharging a residual charge from a capacitor without providing a resistive circuit for discharging the capacitor while basically maintaining safety. Specifically, in an electric motor vehicle which has as the drive system a battery, a motor, and a controller for controlling the rotation of the motor, this invention is characterized by providing a capacitor and a DC/DC converter in which a no-load current flows, wherein the capacitor is connected with the DC/DC converter in parallel, and a residual charge of the capacitor is discharged by the DC/DC converter. Further, it has characteristics that an FET is connected between the capacitor and the DC/DC converter, and a residual charge of the capacitor is discharged by the DC/DC converter through a parasitic diode between source drains of the FET. Therefore, this invention remedies the above drawbacks and prevents an electric shock. And, the above third point for safety, or a risk when servicing the electric motor vehicle, can be avoided.

For a motor for the electric motor vehicle, a battery voltage is set at a relatively low voltage of 48V for an electric scooter for example to realize a safe handling of the battery and a low cost of the battery, but required to provide a high output for its voltage. For a general motor, a stator winding uses a coil with many turns having a thin electrical wire wound many times. On the other hand, a motor for the electric motor vehicle uses a low power voltage, so that the number of turns for a coil cannot be made many in view of an back electromotive force. Therefore, the motor torque constant becomes small, increasing electricity passed through the motor. And flowing a large current causes the stator winding of the motor to generate heat, so that a coil having many electrical wires in parallel is required to lower the current. But, prior art has been developed aiming principally at winding a thin electrical wire many turns, and a technical development has not been made for a coil with many electrical wires arranged in small turns in parallel.

FIG. 58 shows a side view of a conventional stator winding. Reference numeral 215 stands for a stator, 216 for a coil, and 217 for a lead wire. Reference numeral 218 stands for a connecting section of the coil and the lead wire, and 219 for a connecting section of the coil and another coil.

A conventional stator winding forms a coil by winding one to six electrical wires on a bobbin at one time, and the coil is fit to a winding inserting machine and inserted into the stator. When the number of electrical wires is many, coils made by winding on bobbins are fitted to the winding inserting machine more than one times, and the coils were inserted into the stator. FIG. 59 shows a flow chart for producing a conventional stator winding. First, an electrical wire is wound on a bobbin. Then, the bobbin is decomposed to remove a coil from the bobbin. The coil is then inserted in a jig of a winding inserting machine. The above procedure is repeated for prescribed times. Lastly, the winding inserting machine is operated to insert the coil into a slot of the stator. Thus, the stator winding is produced.

The connecting section 219 of the coils which is called a star connection or Y-connection is connected by peeling an insulating coating of electric wires, twisting the electric wires, and soldering or welding.

After inserting the coil into the stator, when the coil is formed by holding the coil by a forming jig to adjust the shape of the coil, the forming jig is received by the stator to position the forming jig. FIG. 60 shows a sectional view of a conventional forming jig. Reference numeral 220 stands for an upper forming jig, and a tip part 221 is made of metal to prevent abrasion. Reference numeral 222 stands for a lower forming jig, and a tip part 223 is made of metal. When the upper and lower stator jigs are pushed from above, the forming jigs 220, 222 are in direct contact with the stator 215.

But, the production method in which the coils wound using the bobbin are fitted to the winding inserting machine more than one times and the coils are inserted into the stator has disadvantages that a lot of trouble is needed to fit the coils to the winding inserting machine and the coils are often fitted in error. Besides, there are disadvantages that since crossovers of the coils are tangled intricately, the number of coils cannot be increased so much, the coils cannot be inserted easily, and the coil ends become large.

And, in the stator winding using soldering to connect the coils, when the number of the electrical wires is many, preheating before soldering and cooling after soldering take time and productivity is poor. Besides, it is difficult to surely solder the inside of the bundled electrical wires, reliability of connection is poor, and preheating effects on parts other than connecting sections. Similar disadvantages are seen in case of welding. Further, the connection of the coils and the lead wires have the same drawbacks.

Besides, the production method for a stator winding in which when the coils are formed by holding with the holding jig, the forming jigs are received by the stator to position the forming jigs, has a drawback that the stator 215 is deformed in the coil forming process as shown in FIG. 58 because a forming force is applied to the stator.

Therefore, the invention remedies the drawbacks of prior art and provides a stator winding by increasing the productivity for inserting the coil winding, decreasing a coil fitting error, facilitating the coil inserting, eliminating the need for preheating and cooling when connecting to improve productivity, eliminating effects due to heat, improving the connecting reliability, and preventing the deformation of the stator. Specifically, in an electric motor vehicle which has as the drive system a battery, a motor, and a controller for controlling the rotation of the motor, this invention has characteristics that the stator winding of the motor is a stator winding formed by forming a coil by winding an electrical wire using a bobbin and inserting the coil into a stator, the electrical wire is wound on the bobbin more than one times in layers to form a coil of one phase, the electrical wire is further wound on the above bobbin to form a coil of the second and later phases, and after forming a coil of a prescribed number of phases, the coil is inserted into the stator to form the stator winding.

And, the stator winding of the invention is characterized by using a crimp connector to connect the coil and the lead wire.

Further, the stator winding of the invention forms a coil by inserting the coil into the stator and holding the coil by the forming jig, and has a characteristic that the forming jigs on both sides of the stator come into contact with each other, and a forming force is not applied to the stator from the forming jigs. Therefore, this invention remedies the above drawbacks and particularly avoids an electric shock. And, the above third point for safety, or a risk when servicing the electric motor vehicle, can be avoided.

A motor for the electric motor vehicle requires a permanent magnet used for a field magnet to generate a higher magnetic force with the demand for miniaturizing these years. And many rare earth magnets consisting of Sm—Co, Nd—Fe—B, Pr—Fe—B, or other component are used as magnets.

The allowable maximum temperature of these rare earth magnets is not always high under the present state, and if used at a higher temperature, unfavorable phenomena such as demagnetization are caused due to heat. Therefore, to maintain the performance of magnets, it is indispensable to make a sufficient thermal design in advance to prevent the motor from overheating.

But, for a motor to be used for the electric motor vehicle, it is not easy to restrict the driving environments or driving conditions, and it may be used under sever conditions exceeding the intention of designers.

Therefore, in view of the above reasons, the thirteenth invention aims to prevent the motor from overheating by constantly monitoring the motor interior temperature. Specifically, in an electric motor vehicle which has as the drive system a battery, a motor, and a controller for controlling the rotation of the motor, this invention is characterized by providing the controller with a means for detecting a temperature of the motor and a protection mechanism for stopping the rotation of the motor when the motor is overheated.

And, preferably, an indication means for warning the overheat of the motor is provided. This indication means starts to blink at a temperature lower than a temperature at which the motor stops rotating due to the overheat, and remains lit when the motor stops rotating. Therefore, this invention remedies the above drawbacks and protects the above fourth point for safety, or the controller and the drive unit of the electric motor vehicle. Further, a failure of the motor due to the overheat of the motor is prevented from happening, and an abrupt stop of the vehicle due to the motor failure can be prevented. Thus, the above first point for safety can be accomplished.

In a conventional electric motor vehicle, a known means for preventing a short circuit between battery terminals when a key switch is off is as follows.

FIG. 61 shows a conventional drive circuit diagram of a motor controller. An example using an MOSFET as a semiconductor switch and a brushless DC motor as a motor will be described hereinbelow.

In FIG. 61, reference numeral 121 stands for a battery. An inverter device 122 consists of a semiconductor switch 127 (127a to 127f) and a diode 128 (128a to 128f), and the semiconductor switch 127 is turned on or off according to an electrifying signal 126 from a control circuit 125 to apply a current to a motor 131. The semiconductor switch to be electrified is selected according to a rotor position signal 133 from an encoder 132 for detecting the rotor position and the opening of an accelerator 134. A power source 123 lowers the voltage of the battery 121 to an appropriate stabilized voltage. But, the power source 123 may be one independent from the battery. Reference numeral 124 represents a key switch.

The semiconductor switch 127 is turned on or off according to four power sources 129 (129a to 129f) having the output insulated respectively and a control circuit 130 (130a to 130f) disposed for each element. The control circuit 130 receives power from the power sources 129 and applies a positive or negative voltage to the control terminal of the semiconductor switch 127 according to the electrically insulated electrifying signal 126. When the applied voltage is positive, the semiconductor switch 127 is turned on, and when negative, it is turned off.

FIG. 63 is a circuit diagram specifically showing a part of the control circuit 130 and a control circuit 125. The electrifying signal 126 is sent as an optical signal to the control circuit 130 using a photo-coupler 226. The electrifying signal 126 is outputted for a period that a transistor 229 is on, and at this time, a transistor 227 is turned on and a transistor 228 off, then a positive voltage is applied to the control terminal of the semiconductor switch 127. Specifically, the semiconductor switch 127 is turned on. Conversely, the electrifying signal 126 is not outputted for a period when the transistor 229 is off, and at this time, the transistor 227 is turned off and the transistor 228 is on, then a negative voltage is applied to the control terminal of the semiconductor switch 127. Thus, the semiconductor switch 127 is turned off.

Incidentally, it is indispensable that with the battery voltage applied to the inverter device, either of the semiconductor switch pair connected to the battery in parallel must be non-conductive to prevent a short circuit between the battery terminals. Therefore, the application of the battery voltage in a state that ON/OFF of the switch is not determined with no positive or negative voltage applied to the control terminal of the semiconductor switch is risky and must be avoided absolutely. Therefore, in this conventional example, when the key switch 124 is turned off and a voltage is not given to the control terminal of the semiconductor switch, measures are taken to open a relay 230 linked with the key switch 124 and cut off the input of the battery voltage into the inverter device. But, in the electric motor vehicle which generally uses high power, the relay 230 is needed to be of a large type but it is not preferable for the electric motor vehicle which is required to have a light body.

Therefore, a conventional method not using the relay shown in FIG. 62 is known. In FIG. 62, it is configured that an inverter device 122 is kept applied with the battery voltage, and power is always supplied to the power source and the control circuit without relying on the contact of a key switch 124. Therefore, it is controlled that an exact voltage is always applied to the control terminal of a semiconductor switch 127, and a shot circuit of the battery does not occur. But, this technique keeps consuming power even when the key switch is off and the vehicle is disabled to move. Therefore, the reduction of the consumption power is indispensable for the electric motor vehicle which is required to travel for a long time with a limited power, to be put into actual use.

As described above, the technique shown in FIG. 62 needs a large relay for the electric motor vehicle which uses high power. This is not favorable for the electric motor vehicle which is required to have a lighter body than the vehicle using an internal combustion engine. On the other hand, the technique of FIG. 63 keeps consuming power even when the key switch is off and the vehicle is disabled to move. Therefore, the reduction of the consumption power is indispensable for the electric motor vehicle which is required to travel for a long time with a limited power, to be put into actual use.

Therefore, the invention aims to substantially reduce the consumption power by limiting to minimum a circuit to which power is supplied when the key switch is off and to exclude the necessity of a relay. Specifically, in an electric motor vehicle which has as the drive system a battery, a motor, and a controller for controlling the rotation of the motor, this invention has characteristics that the controller includes an inverter device having a battery as an input and a key switch which gives a travel permission of the vehicle, and when the key switch is on, a signal is given to the control terminal of either of a semiconductor switch pair arranged in parallel with the battery within an inverter device to prevent the conduction of the semiconductor switch. Therefore, this invention remedies the above drawbacks and protects the above fourth point for safety, or the controller and the drive unit of the electronic motor vehicle. Further, a breakage of equipment is prevented, and a trouble which may be caused by the breakage is excluded. Thus, the above first to third points for safety can be accomplished.

In an electric motor vehicle, the terminal voltage value of a battery is not constant and varies depending on the value of electric current being taken out, a remainder of the battery, or an ambient temperature at which the vehicle is used. And, when regeneration is made using the battery as a generator, the terminal voltage value of the battery varies depending on the regeneration quantity.

Conventionally, when one and the same battery is used as the power source for driving the motor and for the control circuit, the voltage value of the battery decreases with the increase of an electric current flowing the motor, and in a regenerative state that the battery is fully charged, the power source for the control circuit has to be of a very wide input voltage range because the voltage value of the battery increases.

The excessive increase of the terminal voltage value of the battery when regenerating deteriorates the battery, so that a load such as a resistor is attached to prevent the terminal voltage of the battery from increasing. But, the expansion of the input voltage range of the power source for the control circuit has drawbacks that it is disadvantageous in view of costs, and use must be made in an operation area in which the power source has a poor efficiency. And, if the voltage value of the battery exceeds the input voltage range of the power source for the control circuit, the device will be broken due to a breakage of the power source for the control circuit or a malfunction of the control circuit.

And, as described above, when a load such as a resistor is attached when regenerating, the resistor has to be a large type to absorb the power generated by the motor, and a device for cooling the resistor has to be attached at the same time. Therefore, the fifteenth invention aims to provide a motor drive unit which detects the terminal voltage value of a battery to control the terminal voltage of the battery, and to prevent a malfunction of the control circuit and the degradation of the battery. Specifically, in an electric motor vehicle which has as the drive system a battery, a motor, and a controller for controlling the rotation of the motor, this invention has characteristics that the same battery is used as the power source for supplying power to the motor and as the power source for operating the control circuit, and a means for detecting the terminal voltage of the battery and a means for varying the output of the motor according to the terminal voltage value of the battery are provided.

Further, in an electric motor vehicle which has as the drive system a battery, a motor, and a controller for controlling the rotation of the motor, the invention is characterized by providing a regenerative device for charging power into the battery by using the battery as a power source for driving the motor and the motor as a generator, a means for detecting the voltage of the battery, and a means for varying the regeneration quantity according to the voltage of the battery. Therefore, this invention remedies the above drawbacks and protects the above fourth point for safety, or the controller and the drive unit of the electric motor vehicle. Further, a breakage of equipment is prevented, and a trouble which may be caused by the breakage is excluded. Thus, the above first to third points for safety can be accomplished.

A conventional inverter device for the electric motor vehicle is integral with a controller, requiring a large space for installation. Under the circumstance, for example, the inverter device for an electric two wheeler (including an electric three wheeler. The same is applied hereinafter.) is often attached below the seat, and forced cooling by means of a fan or the like is required because air flow below the seat is not much and cooling efficiency is poor even when the vehicle is traveling. And, in many cases of electric four-wheel cars, the large space under a hood has to be used for a controller.

The electric motor vehicle needs a battery and a drive unit for a motor as compared with a vehicle with an internal-combustion engine. Therefore, in order to provide the same storage space as that of the vehicle with the internal-combustion engine, a space efficiency has to be improved. The drive unit is generally formed of a controller and an inverter device. And, since the inverter device is voluminous, it is a significant issue to devise a place where the inverter device is mounted.

And, it is very important to dispose the inverter device in a place where good cooling performance is obtained because it generates much heat. By improving the cooling performance, a radiator for the inverter device can be minimized. Further, installing the inverter device in an optimum place may separate the inverter device from the controller. If the inverter device and the controller are separated, it is necessary to use a long wire to wire a gate drive signal of semiconductor devices which are component elements of the inverter device. When a long wire is used, a serge voltage may be generated by external noise, possibly resulting in a malfunction or breakdown of the semiconductor devices.

In view of the above, the invention aims to minimize the inverter device to enhance the space efficiency and to prevent the malfunction or breakdown of the semiconductor devices when the inverter device and the controller are separately mounted. Specifically, in an electric motor vehicle which has as the drive system a battery, a motor, and a controller for controlling the rotation of the motor, this invention is characterized by having an inverter device for the electric motor vehicle, and semiconductor devices which are component elements of the inverter are neatly arranged longitudinally. And, it is also characterized in that a snubber capacitor is disposed between the semiconductor devices.

Further, in an electric motor vehicle which has as the drive system a battery, a motor, and a controller for controlling the rotation of the motor, this invention is characterized by disposing an inverter device for the electric motor vehicle, and attaching a semiconductor device gate protecting part to a terminal of the semiconductor devices. Therefore, this invention remedies the above drawbacks and protects the above fourth point for safety, or the controller and the drive unit of the electric motor vehicle. Further, a breakage of equipment is prevented, and a trouble which may be caused by the breakage is excluded. Thus, the above first to third points for safety can be accomplished.

For the electric motor vehicle, a motor which is a prime mover is a significant functional part and, since the motor itself is a heavy part, its handling in packaging, transporting and assembling works is required to be made carefully. Dropping the motor applies a heavy impact to its functional parts, causing a trouble to the motor performance. Therefore, it is necessary to provide a structure so that such a trouble can be prevented from happening.

And, in view of the significance of a motor for the electric motor vehicle, when the motor is disassembled or remodeled by a user or a third person other than the personnel in charge of the production, the performance as the electric motor vehicle may be deteriorated, or such an illegal remodeling may result in an accident. Therefore, it is necessary to prevent such a remodeling. Further, in case of an external impact to a vehicle, e.g., a falling of an electric two wheeler, it is important to minimize a damage to the motor which is a significant functional part.

Therefore, the invention has been completed in view of the above necessity and demands. Specifically, in an electric motor vehicle which has as the drive system a battery, a motor, and a controller for controlling the rotation of the motor, this invention has characteristics that the above motor has its output shaft positioned within a motor case and not protruded from the motor case. And, it has characteristics that the motor case and motor cover for accommodating functional parts such as a stator have a two-piece motor casing, and the split sections of the motor case and the motor cover are assembled by means of special bolts different from other bolts. Further, it is characterized by integrally forming rib-shaped projections on the outer periphery of the motor cover and the motor case for accommodating functional parts such as a stator.

Therefore, this invention remedies the above drawbacks and protects the above fourth point for safety, or the controller and the drive unit of the electric motor vehicle. Further, a breakage of equipment is prevented, and a trouble which may be caused by the breakage is excluded. Thus, the above first to third points for safety can be accomplished.

BRIEF DESCRIPTION OF THE DRAWINGS

FIG. 44 is a plan view showing the arrangement of parts for an inverter device, one embodiment of the sixteenth invention.

FIG. 45 is a side view showing the arrangement of parts for an inverter device, one embodiment of the sixteenth invention.

DESCRIPTION OF THE PREFERRED EMBODIMENTS

Figure 1:
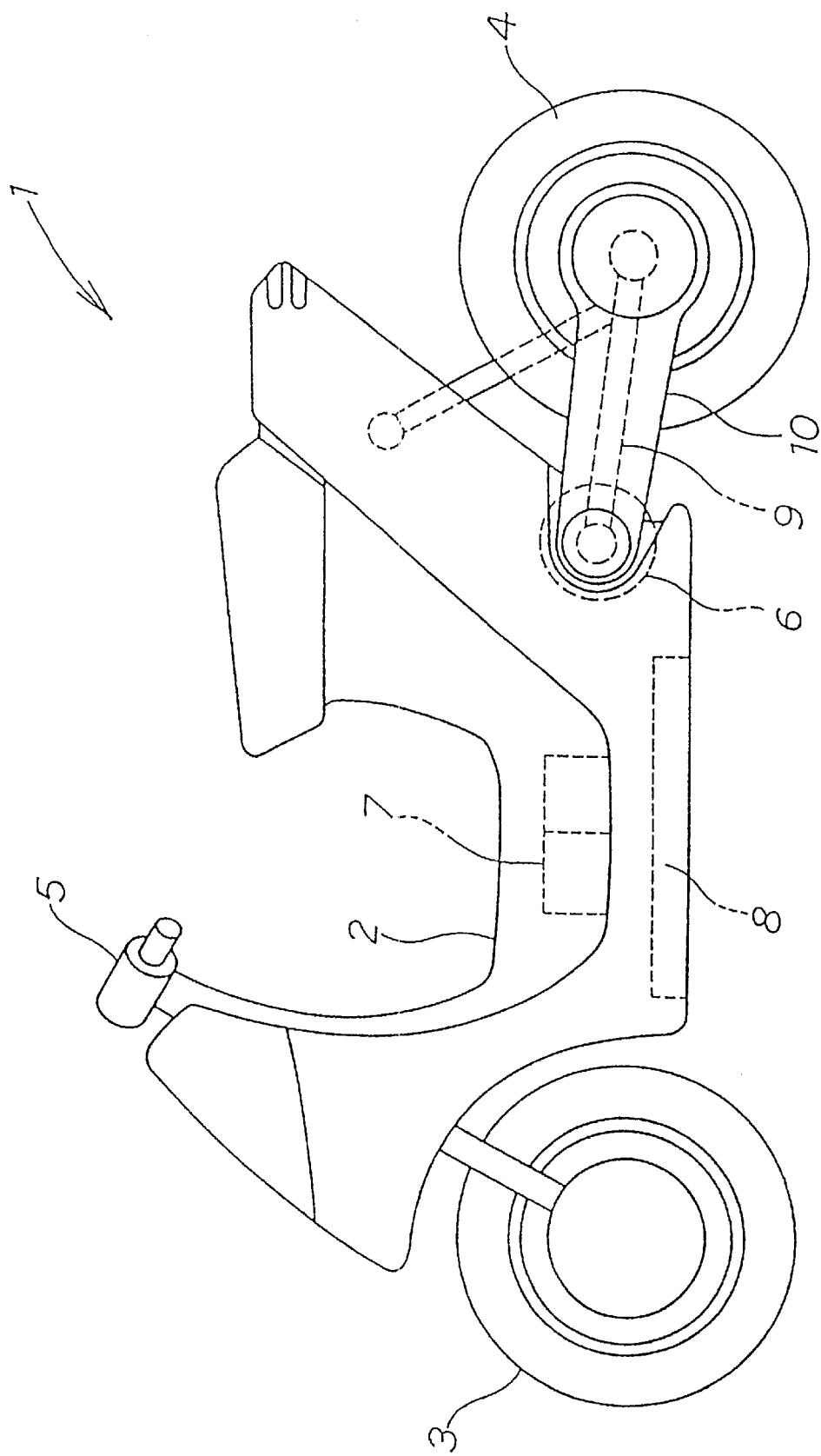
FIG. 1 is a side view of an electric two wheeler according to one embodiment of the invention.

FIG. 1 shows an electric two wheeler which is one embodiment of an electric motor vehicle. The invention will be described taking an electric two wheeler (including a scooter) as an example through the specification.

An electric two wheeler 1 has wheels 3, 4 at the front and the rear of a body 2 in the same way as a conventional two wheeler driven by an engine. The front wheel 3 is operated by a handle 5, and the rear wheel 4 is not driven by an engine but a motor 6.

The motor 6 is driven by a battery 7, and the motor rotation is controlled by a controller 8. In FIG. 1, though some are not shown, an accelerator grip and a brake lever disposed on the handle 5, a brake mechanism, a power transmission mechanism, a suspension and others may be same as those for conventional two wheelers.

Referring to FIG. 2 through FIG. 5, the embodiment of the invention will be described.

Figure 2:
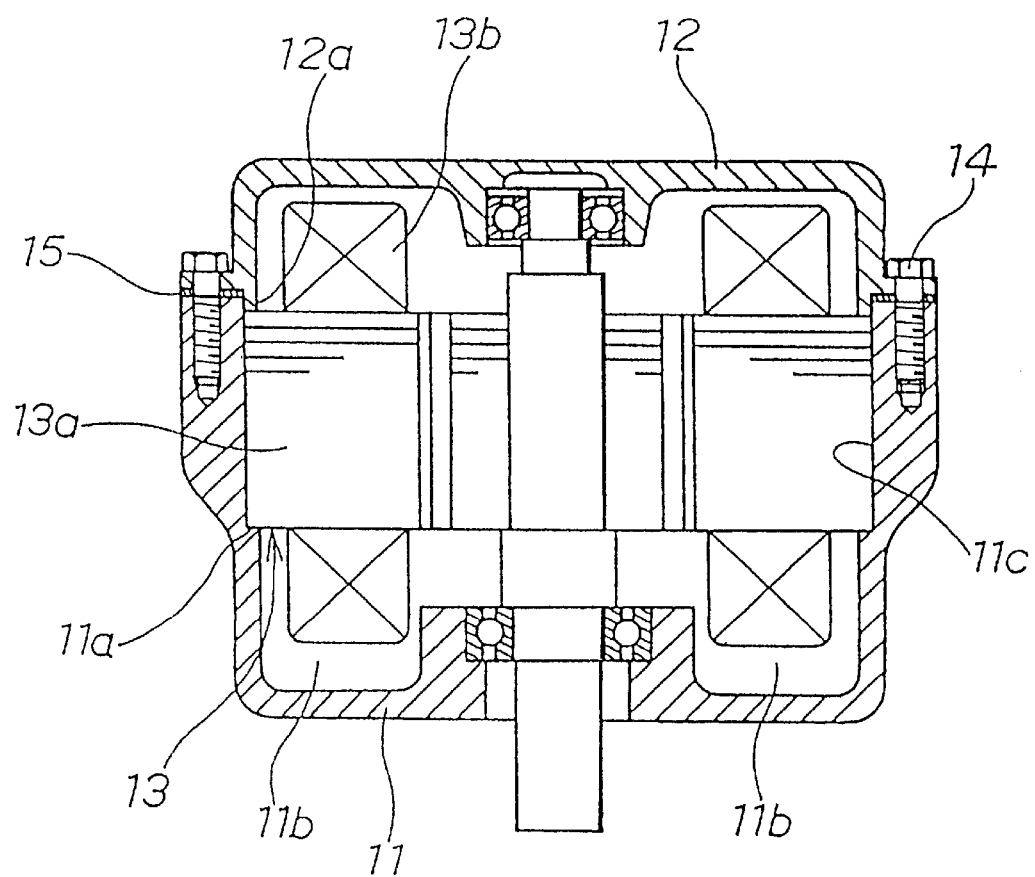
FIG. 2 is a vertical sectional view of a motor according to one embodiment of the invention.

In FIG. 2, a stator 13 is structured by winding a multiple-phased coil for driving a rotor on a stator core 13a which is made of tens of multilayered silicon steel plates having a circular hole large enough to accommodate the rotor therein and a slot for winding the coil. A part of the coil protruded from the stator core is called a coil end 13b.

A motor case 11 has a hollow section to clear the coil end 13b and a hollow section 11c to insert the stator 13, formed almost coaxial with the former. The hollow section 11b to clear the coil end has a smaller diameter than the hollow section 11c for inserting the stator, and a step 11a is formed at a boundary between the two hollow sections. The hollow section 11c for inserting the stator 13 has a diameter to fit with the outer circumference of the stator core 13a by "loose fitting" and a depth deeper than the axial length of the stator core 13a. Conventionally, to fix the stator to the motor case by shrinkage fitting or press fitting, the hollow section for inserting the stator had to be drilled precisely with respect to the outer diameter of the stator core. But, as the loose fitting is employed in this embodiment, the hollow section machining precision can be eased, thus simplifying the machining. And, the outer circumference of the motor case 11 has a plurality of tapped holes for joining to a motor cover 12.

The motor cover 12 has a ring projection 12a to press the end face of the stator core 13a. The ring projection 12a has an outer diameter for loose fitting with the hollow section 11c of the motor case 11 for inserting the stator, and an axial length of the projection 12a is sufficient so that the end face can be pressed even when the stator core 13a is multilayered to be short within a tolerance. And, a plurality of holes are formed in the outer circumference for inserting joining bolts to join with the motor case 11.

The stator core 13a is held between the step 11a and the projection 12a by means of a plurality of joining bolts 14, and as a result, the stator 13 is fixed between the motor case 11 and the motor cover 12. The stator core 13a is fitted to the hollow section 11c of the motor case 11 for inserting the stator 13 by loose fitting, so that the stator 13 can be moved in the circumferential direction within the motor case 11. Therefore, in case of a brushless motor whose performance is greatly affected by the circumferential positional relationship between the stator and a detector for detecting a position of a rotor, the inserted stator can be moved in the circumferential direction to determine a precise position with respect to the detector before fixing, thereby remedying the generation of a defective fixing of the stator. Specifically, in a conventional case, since the stator was fixed to the motor case by shrinkage fitting or press fitting, a later positional adjustment was quite difficult, and the fixing position of the stator was displaced. But, such a drawback can be removed by employing the above structure. And, since a filler 15 comprising a liquid packing such as a silicon sealant or a liquid gasket is applied in advance to between the motor case 11 and the motor cover 12, the filler 15 is crushed by tightening the joining bolts 14, satisfactorily sealing a space between the motor case 11 and the motor cover 12.

As described above, since the stator core 13a is produced by multilaying tens of silicon steel plates in the axial direction, a tolerance of the thickness of each silicon steel plate is accumulated, so that the length of the stator core in the axial direction has a difference of about 1 mm depending on if it is long or short.

Figure 3:
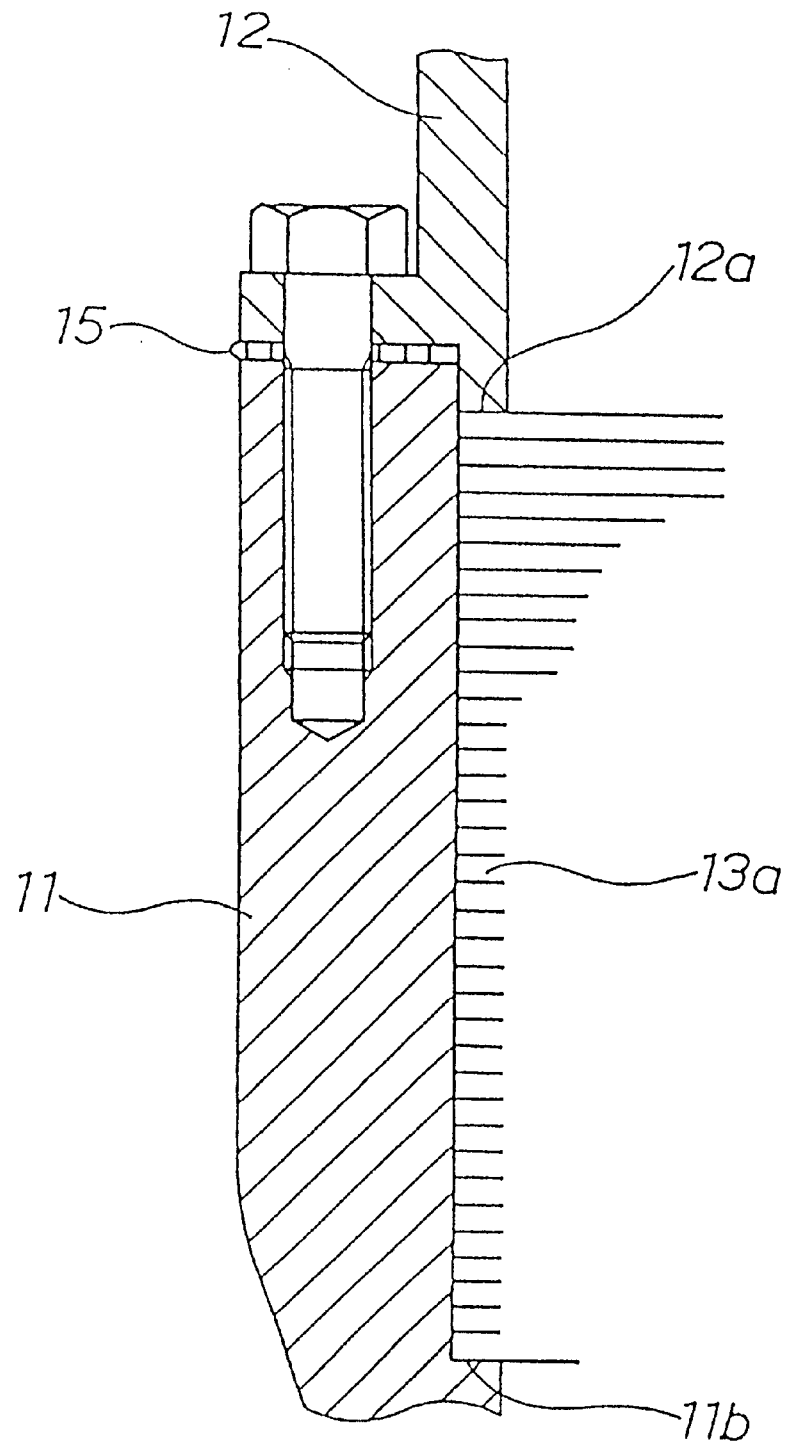
FIGS. 3 and 4 are a partially enlarged view of a stator holding section with a short stator core according to one embodiment of the invention.

A state of a stator core sandwiching section where the axial length of the stator core is short will be described. FIG. 3 is a fragmentary enlarged view of the stator core sandwiching section, wherein the axial length of the stator core 13a is short. When the stator core 13a is short, the projection 12a does not come into contact to the end face of the stator core 13a, causing a problem that the stator core 13a cannot be pressed. To avoid such a problem, the axial length of the projection 12a is made to be relatively long. Specifically, the axial length of the projection 12a is designed such that the end face of the stator core 13a is pressed by the projection 12a and a space is formed between the motor case 11 and the motor cover 12 even when the stator core 13a is short.

Figure 4:
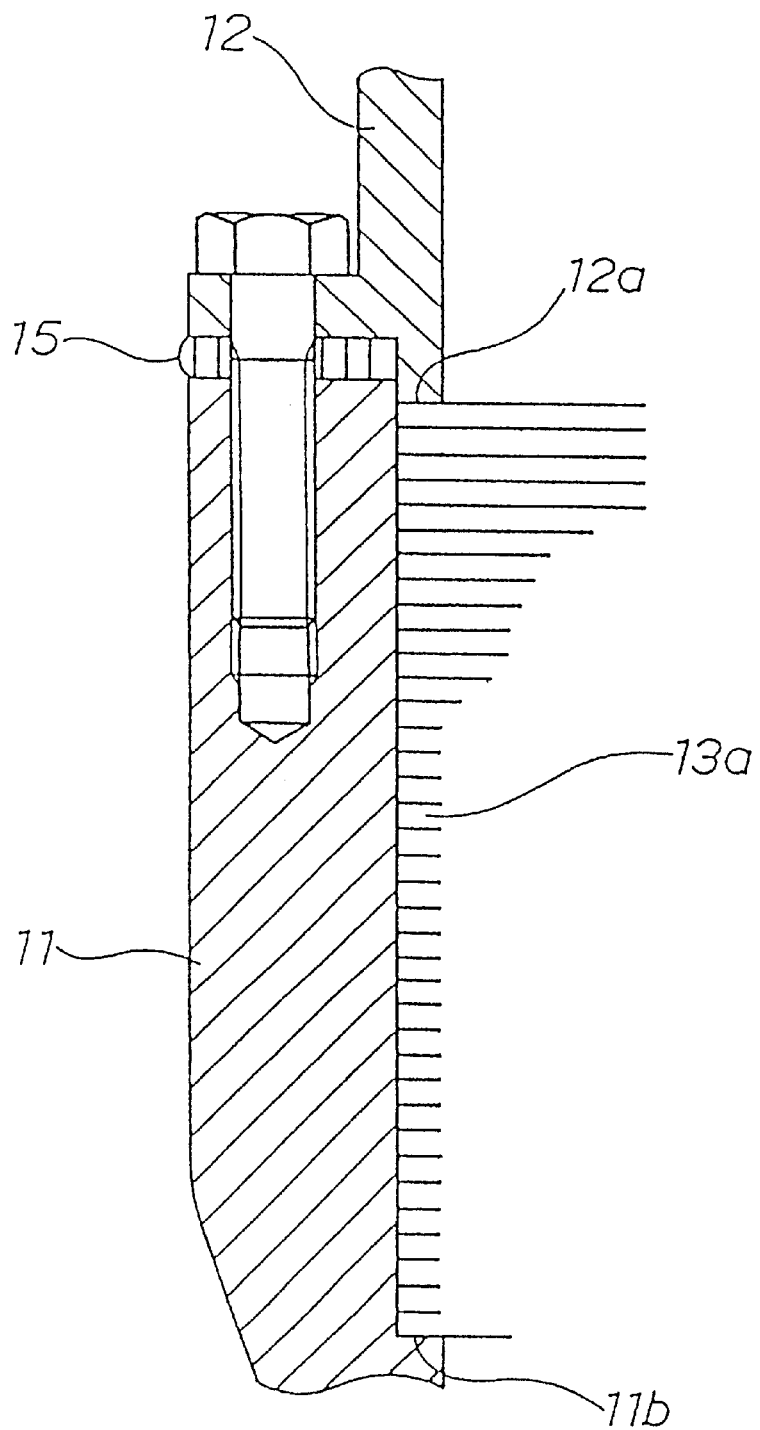

A state of the stator core sandwiching section when the axial length of the stator core is long will be described. FIG. 4 is a fragmentary enlarged view of the stator core sandwiching section, and the axial length of the stator core 13a is long. As described above, since the axial length of the projection 12a is designed to exhibit a pressing function even when the stator core 13a is short, when the stator core 13a is multilayered to be long in the axial direction, a space between the motor case 11 and the motor cover 12 is widened. When the space is so wide, a conventional O-ring cannot be crushed between the motor case 11 and the motor cover 12, and a sealing effect by the O-ring cannot be exhibited. But, using the filler 15, its filling amount can be varied depending on the width of the space, so that a sealing effect can be exhibited regardless of the width of the space.

Figure 5:
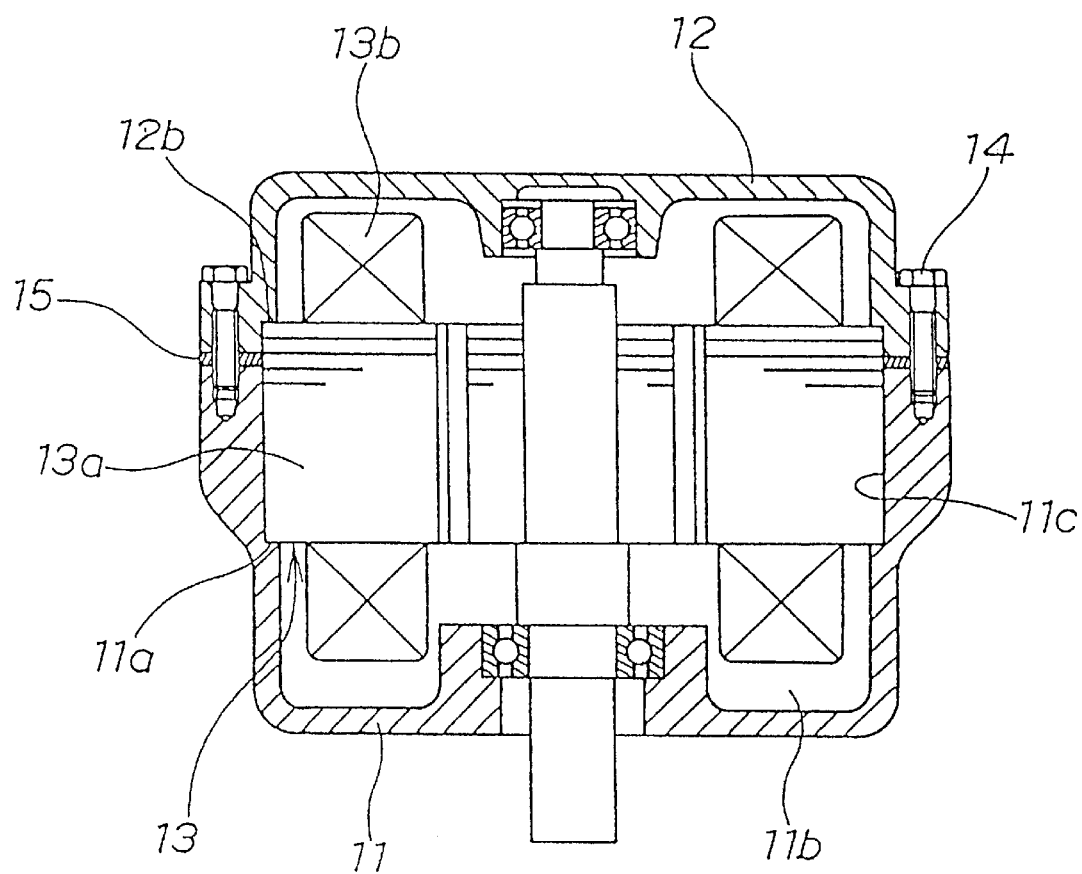
FIG. 5 is a vertical sectional view of a motor according to another embodiment of the invention.

FIG. 5 is another embodiment of the invention. In this embodiment, the common component elements with the above embodiment are given the same reference numerals and their detail description will be omitted. In FIG. 5, in the same way as the above embodiment, the stator 13 is fixed between the motor case 11 and the motor cover 12, and the filler 15 is applied to seal the space between the motor case 11 and the motor cover 12. In this case, in the motor cover 12, there are a hollow section to clear the coil end 13 and a hollow section for inserting the stator almost coaxially with the former, and a step 12a is formed at a boundary between the two hollow sections. And, the stator core 13a is held between the steps 11a, 12b and the stator 13 is fixed to the motor case 11 and the motor cover 12.

In this embodiment, since the filler 15 comprising a liquid packing such as a silicon sealant or a liquid gasket is also applied in advance to between the motor case 11 and the motor cover 12, the filler 15 is crushed by tightening the joining bolts 14, satisfactorily sealing a space between the motor case 11 and the motor cover 12. Since the filler 15 comes into contact with the stator core 13a, it shall not corrode the stator core 13a.

According to the invention, a sealing property is retained, so that an insulation failure due to the entry of water into the motor can be prevented. And, a sudden stop of the conventional electric motor vehicle due to an insulation failure can be prevented. Besides, according to the invention, a tolerance of the hollow section for inserting the stator 13 of the motor case can be increased, so that machining can be made easily. And, the fixing work of the stator 13 can be simplified, and the fixing of the stator 13 and the sealing of the motor case 11 can be made at the same time. Further, since the stator core 13a and the motor case 11 are engaged by loose fitting to allow the circumferential movement after inserting the stator 13, when this invention is applied to a brushless motor, the positional precision with respect to the detector can be attained, having an advantage of remedying a failure at fixing.

Back to FIG. 1, reference numeral 9 represents a power transmission mechanism, which is accommodated in a closed case 10 which is cast from an aluminum alloy. Further, in FIG. 6, a motor 6 having a casing structure cast from the aluminum alloy is fixed to one end of the case 10 by the joining bolts 14, and the rear wheel 4 is connected to a shaft supported by a bearing on the case 10 at another end. Power of the motor 6 is transmitted to the rear wheel 4 through the power transmission mechanism 9 to drive the rear wheel for traveling.

The motor 6 is fixed by the joining bolts 14 with a liquid sealant 16 therebetween. Specifically, the sealant 16 is applied to the entire periphery of the joint portion of the case 10 and the motor case 11, then the joining bolts 14 arranged at equal intervals are tightened. The case 10 accommodates the power transmission mechanism 9 which comprises a belt, a pulley, a centrifugal clutch, and gears. And, on the side fixing the motor 6 in the case 10, an input shaft 9a connected to an output shaft 6a of the motor is supported by a bearing of the case 10. And, the fitting portions of the motor case 11 and the case 10 are machined to be smooth so that they are easily sealed by the sealant 16.

The case 10 for accommodating the power transmission mechanism 9 has an oil seal disposed on the bearing of the shaft connected to the rear wheel, and the hollow section 10a has a closed structure. The hollow section 10b which is formed by the case 10, the motor case 11 and the sealant 16 is engaged with the hollow section 10a to form a closed chamber. And, a wiring 6b and a sensor wiring 6c of the motor 6 are pulled out in the same direction as the output shaft, and lead to the hollow section 10b. Therefore, without providing a special sealing structure for the outlet sections of the motor case 11 for the output shaft 6a of the motor 6, the wiring 6b and the sensor wiring 6c, the hollow section 10a and the hollow section 10b are securely sealed when the case 10 and the motor 6 are assembled, remedying a failure which may be caused by dust or mud. An insulation failure due to the entry of water into the motor can be avoided, and a sudden stop of the electric motor vehicle due to an insulation failure in conventional cases can be prevented. And, since the output shaft 6a does not need the sealing mechanism such as an oil seal for the motor case 11 (bearing section), the motor 6 suffers from little power loss, and an efficient motor is provided. Further, among the parts forming the motor, a sealing mechanism part is not needed. Therefore, the number of parts can be reduced, and assembling can be made easily. In this embodiment, the sealant is of a liquid type, but a solid sealant may be used.

And the motor wiring 6b and the sensor wiring 6c taken out into the hollow section 10b are bent within the hollow section 10b and pulled out from the connection section of the case 10 and the motor 6 through a grommet 18. The grommet 18 is made of silicon rubber and has a hole (not shown) having the same diameter with those of the wiring 6b and the sensor wiring 6c formed, and the closed structure of the hollow section 10b is secured because the wiring is passed through the above hole.

FIG. 7 through FIG. 10 are explanatory views of laying and fixing of the sensor wiring. In these drawings, on a wall face 11d of the outer periphery of the bearing supporting section which is integrally formed with the motor case 11, a U-shaped groove 11e is formed in parallel with the motor case, and the sensor wiring 6c within the motor 6 is laid in the U-shaped groove 11e. The sensor wiring 6c is held between a fixture 17 and the groove 11e, passed through a narrow space between the output shaft 6a and the coil 8 of the stator, and pulled outside of the case 11 in parallel with the output shaft 6a. Therefore, since the wirings 6b, 6c are pulled out of the motor 6 without bending within the motor case 11, the wiring can be laid efficiently, and the outside shape of the motor can be minimized. The fixture 17 has its end fixed to the motor case 11 by means of a bolt, pressing the sensor wiring 6c against the groove 11e with its plate section having elasticity in parallel with the output shaft 6a.

And, the wirings 6b, 6c which are pulled out in parallel with the output shaft 6a are formed so as to be laid on the outer periphery of the wall face 11d. Therefore, the wirings 6b, 6c of the motor pulled out in the same direction with the output shaft 6a are completely separated from the output shaft 6a with the wall face 11a as a partition. They can be laid without forcedly bending. The wiring assembling work is simple, and any damage to the wirings due to the output shaft 6a can be prevented. Thus, a highly reliable motor for the electric motor vehicle can be provided.

Figure 11:
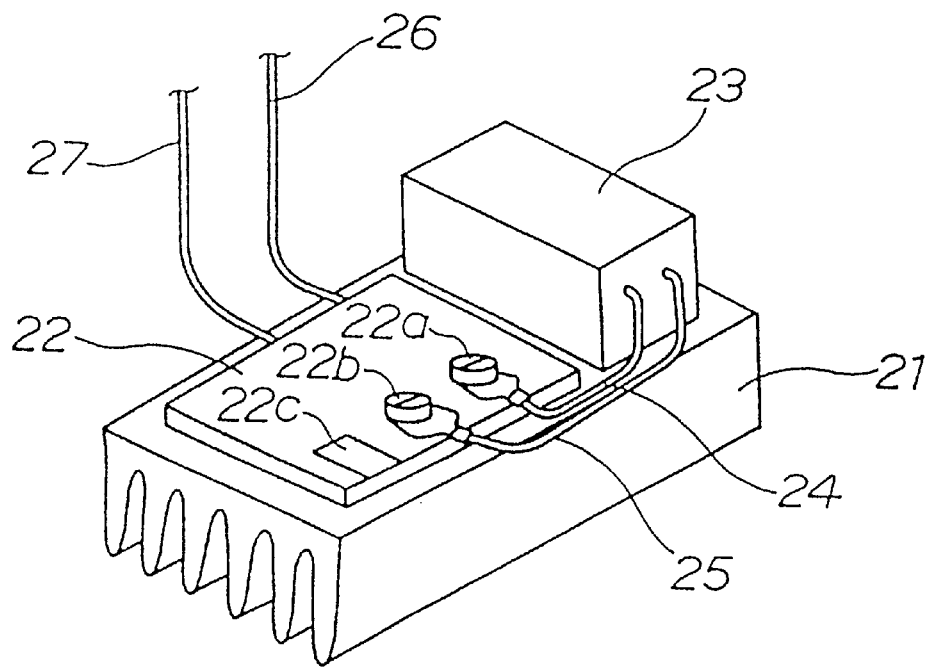
FIG. 11 is a perspective view showing electronic equipment, one embodiment of the third invention.

FIG. 11 is a perspective view showing dust- and water-proof electronic equipment according to this embodiment. In the drawing, a power transistor 22 and a large-capacity capacitor 23 are disposed adhered to the top face of a radiating board 21. The power transistor 22 and the large-capacity capacitor 23 are connected with a cable 24 and a cable 25, and the leading ends of the cable 24 and the cable 25 led from the large-capacity capacitor 23 are fixed to the power transistor 22 with machine screws 22a and 22b. In addition to the cable 24 and the cable 25, an input/output cable 26 and an input/output cable 27 are connected to the power transistor 22, and the input/output cable 26 and the input/output cable 27 are connected to equipment not shown.

Figure 12:
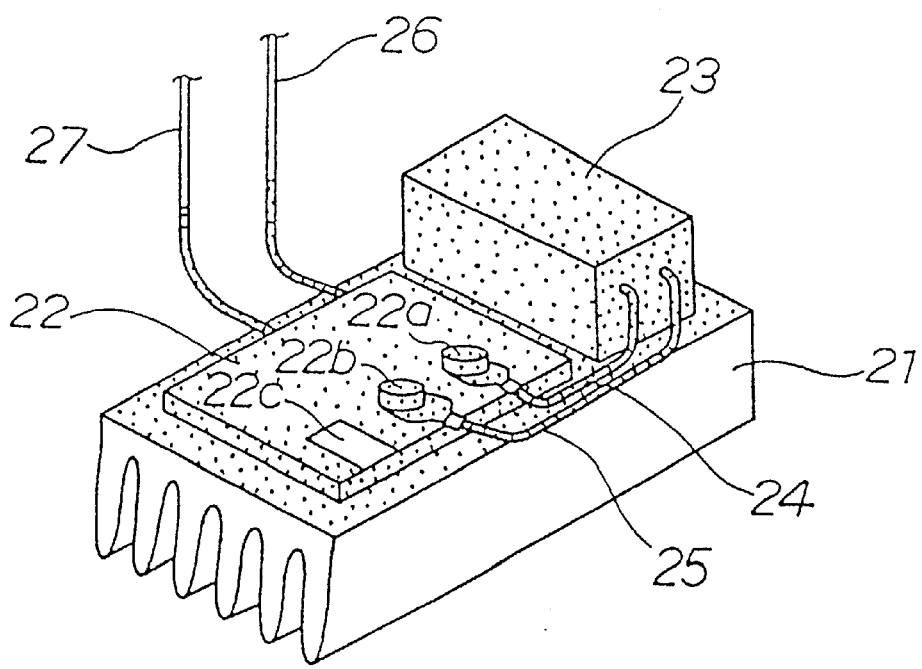
FIG. 12 is a perspective view showing dust- and waterproof electronic equipment, one embodiment of the third invention.

In this embodiment, an epoxy resin paint is applied to the electronic equipment shown in FIG. 11 to entirely cover the power transistor 22, the large-capacity capacitor 23, the cable 24, and the cable 25. Specifically, the epoxy resin paint is applied to the topside part (and the lower parts of the input/output cable 26 and the input/output cable 27) of the radiating board 21 as shown in FIG. 12. The application is conducted using a brush or an air brush. But, the epoxy resin paint may be applied by masking the radiating board 21 and the input/output cables 26 and 27 and dipping in a paint bath. Sine a connection terminal 22c is connected after the painting work, it is masked so that the epoxy resin paint is not applied thereto.

The electronic equipment thus applied with the epoxy resin paint prevents dusts or water from entering into the parts of the machine screws 22a and 22b and the parts of the large-capacity capacitor 23 from where the cables 24 and 25 come out. Thus, high dust- and water-proofing effects can be obtained, and reliability of the electronic equipment can be improved.

And, since the cable 24 and the cable 25 are applied with the epoxy resin paint, the cable 24 and the cable 25 do not come into contact with other parts or are not trembled, and reliability against an impact or vibration is high. Further, the epoxy resin paint is applied instead of a lacquer paint, so that it can be applied to be thicker than the lacquer paint, enabling to obtain higher reliability against an impact or vibration.

In the above embodiment, the electronic equipment has been described disposed on the top face of the radiating board 21, but the electronic equipment may be disposed on a printed-wiring board or the like other than the radiating board 21. Further, this invention can be applied to electronic equipment which is entirely made of a tubular electronic part without a substrate.

According to the invention, since the electronic parts and the cables are covered with the paint, the insulation failure due to the entry of water into the electronic equipment can be avoided, and the dust- and water-proof electronic equipment, which is light-weighted and whose closed state can be obtained easily, can be obtained.

Figure 13:
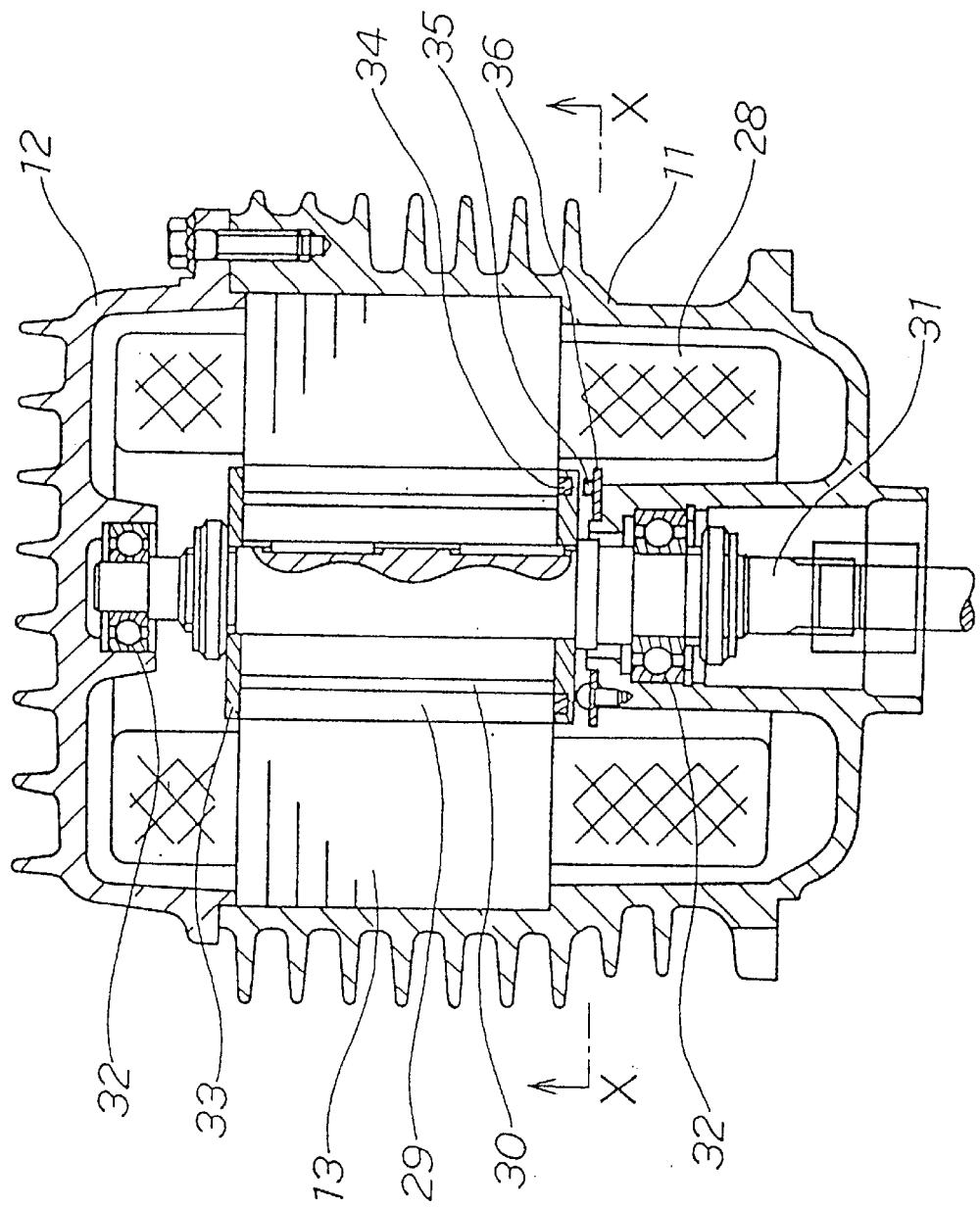
FIG. 13 is a sectional view showing a DC brushless motor, one embodiment of the fourth invention.
Figure 14:
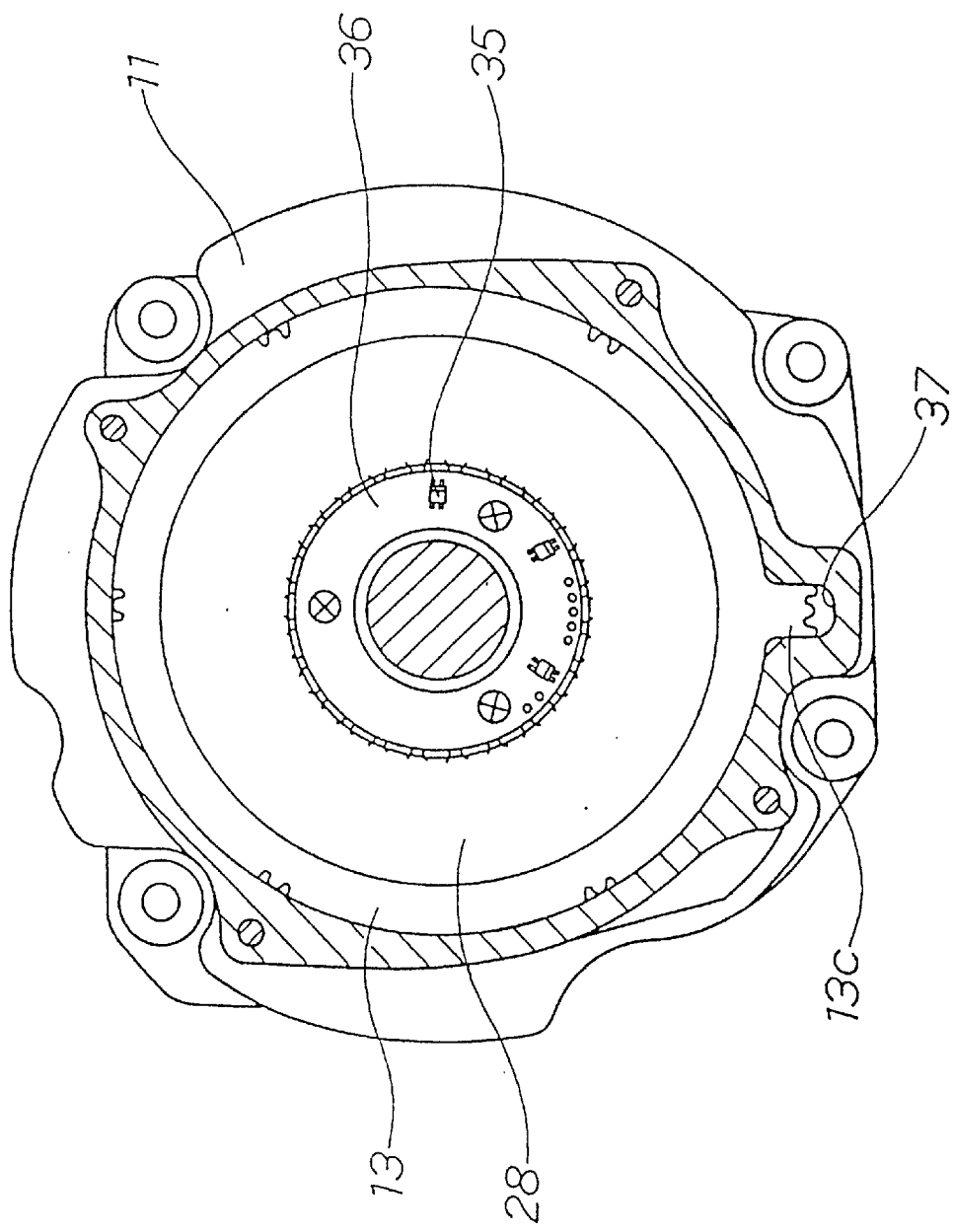
FIG. 14 is a sectional view taken on line X—X of FIG. 13.
Figure 15:
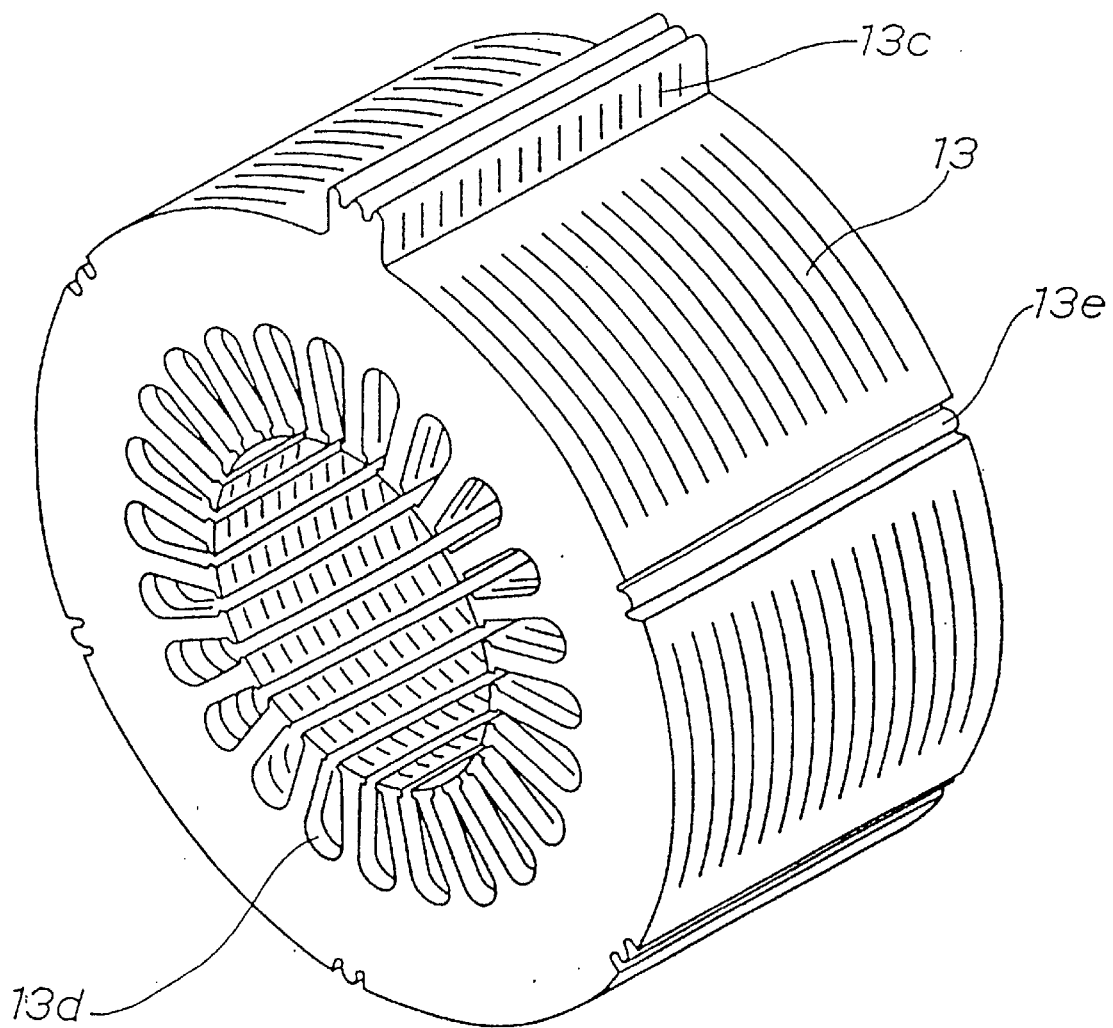
FIG. 15 is a perspective view showing the stator of a DC brushless motor, one embodiment of the fourth invention.

In FIG. 13, FIG. 14 and FIG. 15, a projection 13c of about 10 mm wide and 9 mm high is formed on the outer periphery of a stator 13 of a DC brushless motor shown as an embodiment. Reference numeral 28 represents a coil which is inserted into a slot 13d of the stator 13. A direct contact of the coil 28 with the stator 13 may break the insulation of the coil 28, causing an electric shock accident due to electric leakage. Therefore, insulating paper or wedge is inserted between the coil 28 and the stator 13. Reference numeral 13e represents a welding section for making the stator by multilaying silicon steel plates. The stator 13 is made by stamping a 0.5-mm thick silicon steel plate into a prescribed shape by pressing, multilaying into prescribed numbers, and welding the welding section 13e. As the multilaying method, a caulking method may be employed in addition to the welding. Reference numeral 29 is a rotor. The rotor 29 is made by multilaying many silicon steel plates with a magnet 30 for a field magnet inserted to generate a field magnet. Reference numeral 31 is an output shaft, which is rotatably attached to a case by bearings 32, 32. Reference numeral 34 is an encoder magnet which is a magnet to detect a position. The encoder magnet 34 is axially magnetized to be N and S every 90 degrees so as to have the same four poles as the rotor 29. The rotor 29 and the encoder magnet are fixed to the output shaft 31 using a key and a nut. An end plate 33 is inserted between the rotor 29 and the nut to prevent the magnet 30 for a field magnet from coming off and to prevent the rotor 29 from being deformed. An assembly of the output shaft 31, the rotor 29, the encoder magnet and others is called a rotor assembly. Reference numeral 35 is a Hall IC for detecting a position, and it is disposed in three for a three-phase motor as in this embodiment. The Hall IC 35 is soldered on a board 36, which is then screwed to a motor case 11. The motor case 11 has a groove 37 formed at a position corresponding to the projection 13c on the outer periphery of the stator 13 so as to engage with the projection 13c. A tapped hole of the motor case 11 to fix the board 36 is accurately formed with respect to the groove 37, so that the Hall IC 35 for detecting a position is attached in high positional precision with respect to the groove 37.

A coil 28 consists of multiple-phase coils, and each coil is wound and attached so as to excite a certain magnetic pole section of the stator 13. It generates a rotating field when a controlled electric current is passed, to rotate the rotor 29. The rotor 29 detects a position by detecting a magnetic force of the encoder magnet 34 by the Hall IC 35. According to the detected rotor position, a drive circuit switches an exciting phase of the coil 28. The interaction of a magnetic force and an electric current generates a rotating torque in the rotor 29, and the output shaft 31 is rotated.

In the stator 13, magnetic flux having a high magnetic flux density is flowing according to a magnetic force generated by the coil 28 and a field magnet of the rotor 29. Rotation of the motor generates a core loss. Since the core loss is proportional to the square of a magnetic flux density, it is important to lower the magnetic flux density of the magnetic circuit of the stator 13 to decrease the core loss. In this embodiment, the positioning section of the stator 13 is the projection 13c, so that the magnetic flux density of the stator 13 is not increased by the positioning section. In the case of the silicon steel plate, the machined sections such as holes and grooves have a particularly increased core loss due to degradation in magnetic properties owing to a residual stress by machining. A conventional stator 21 has a narrow magnetic circuit and a high magnetic flux density due to a positioning section 22, and a core loss is further increased due to a machining stress. On the other hand, in this embodiment, since a core loss is not increased by the disposition of the positioning section, a high motor efficiency is obtained.

The switching timing of the exciting phase of the coil 28 has an optimum position, and if the switching timing is deviated, the motor efficiency is deteriorated, and a loss is increased. Therefore, the exciting phase switching timing has to be accurate. The rotating position of the rotor 29 with respect to the stator 13 is detected by the Hall IC 35 attached to the motor case 11, so that the stator 13 is required to be assembled to have a small turning angle error with respect to the motor case 11 to make a switching timing accurate. A turning angle error E is calculated from the following formula. When a positioning radial is assumed to be R and a positioning accuracy to be S, the following formula is given.

$$E = \arctan(S/R)$$

It is seen form the formula that a turning angle error can be decreased by increasing the positioning radial R. In this embodiment, since the positioning in the rotating direction of the stator 13 and the motor case 11 is made at the projection 13c on the outer periphery of the stator 13, a positioning radial is large, and an effecting ratio of a tolerance of the positioning section to a turning angle is small. Therefore, precision in positional relation between the stator 13 and the Hall IC 35 is good. And, degradation in efficiency due to a positional displacement is decreased. Besides, in an assembling process to install the stator 13 into the motor case 11, a conventional structure having a groove needs a key, and a structure having a hole needs a pin. But, in this embodiment, such parts are not required to be installed at the same time, so that the number of parts is decreased, and assembling is quite simple. Further, since the projection 13c is formed on the stator 13 to engage with the motor case 11, a contact area of the stator 13 and the motor case 11 is increased, the stator 13 has better heat radiation, and a temperature rise is reduced. And, the outer face of the motor case 11 is curved, but the outer face of the motor case 11 which engages with the stator projection 13c is flat, making it convenient to stamp a motor number.

This application calls the motor used in this embodiment as a DC brushless motor, but may call the same structured motor as an AC synchronous type motor. This embodiment has the encoder magnet 34 for detecting a position separately from the magnet 30 for a field magnet, but a position may be detected by the magnetic flux of the magnet 30 for a field magnet, omitting the encoder magnet 34 for detecting a position. And, this embodiment uses the Hall IC 35 as a position detecting means, but a detecting means such as a Hall element, an MR head, a magnetic head or an optical encoder may be used.

According to the invention, since the projection is formed on the outer periphery of the stator and the stator is engaged with the motor case, the magnetic flux density of the stator is not increased by the positioning section or the magnetic property is not deteriorated by a residual stress due to machining. Thus, a high motor efficiency is obtained without the increase of a core loss. Further, since the positioning is made by the projection on the outer periphery of the stator and a positioning radius is large, an effecting ratio to a turning angle is decreased, and precision of the positional relation of the stator and the Hall IC is good, so that an efficiency degradation due to a positional displacement is decreased. Besides, in the assembling process to install the stator into the motor case, the pin and the key are not required to be assembled at the same time, reducing the number of parts and making the assembly quite simple. Further, since the stator has the projection, it has good heat radiation, making a temperature rise small. And, the outside of the motor case which engages with the stator projection is flat, making it convenient to stamp a motor number. Further, since positioning precision is improved, a motor failure which may be caused when the positioning precision is not good can be avoided, and the safety of the electric motor vehicle can be improved.

Figure 16:
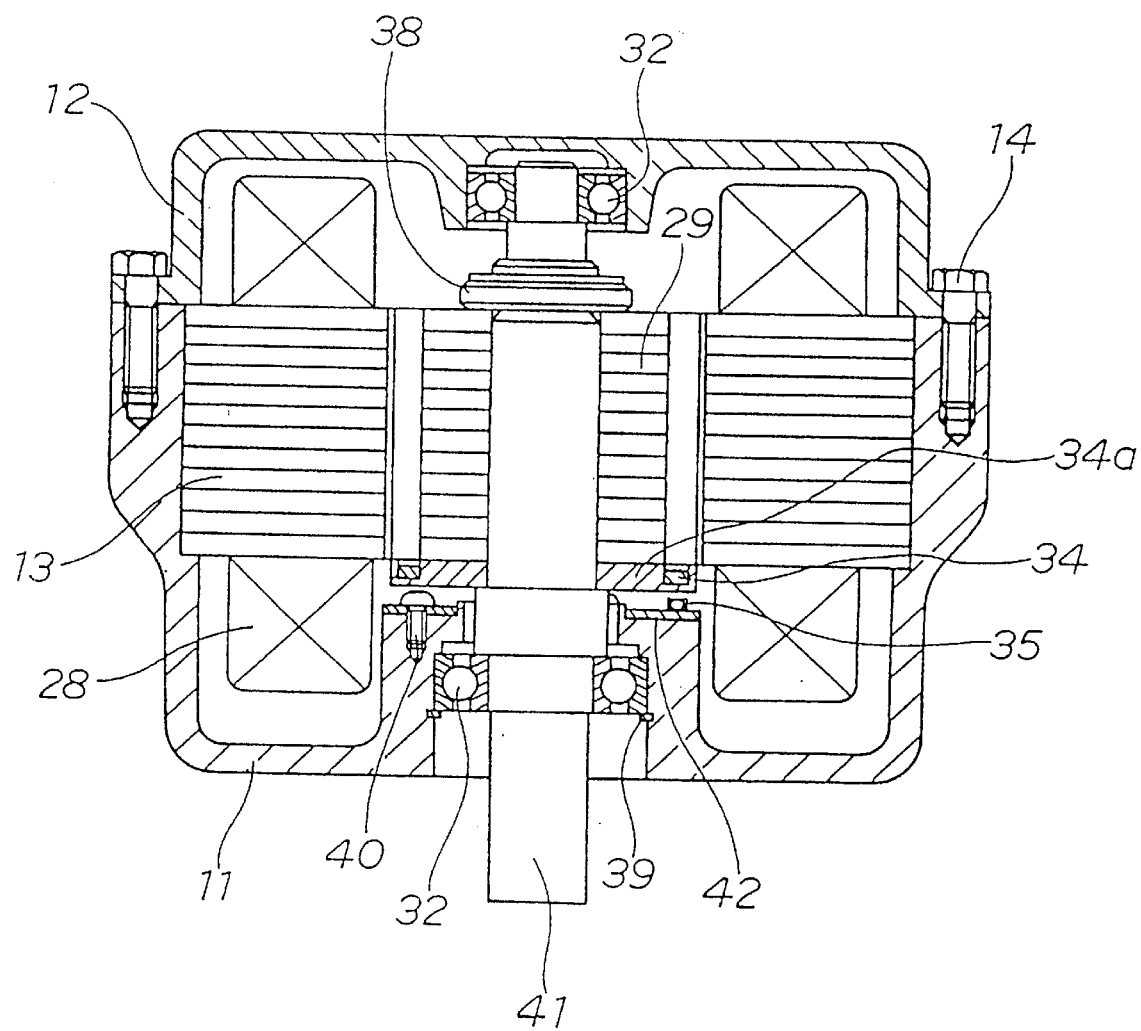
FIG. 16 is a vertical sectional view showing a DC brushless motor, one embodiment of the fifth invention.

FIG. 16 is a vertical sectional view of a three-phase DC brushless motor, and this embodiment will be described with reference to an inner rotor type three-phase DC brushless motor. A stator 13 has a three-phase coil 28 wound on a stator yoke having an opening of a round cross section therein, and held between a motor case 11 and a motor cover 12 by fastening bolts 14.

A shaft 41 has a rotor 29 and an encoder magnet cover 34a tightened and fixed by a locking nut 38. The shaft 41 is rotatably supported by the motor case 11 and the motor cover 12 via bearings 32, 32, and a rotor 29 is disposed to rotate keeping an uniform gap within the stator 13. The rotor 29 is formed by adhering a radially magnetized permanent magnet to a rotor yoke which is made to be cylindrical by multilaying thin ring-shaped silicon steel plates having a hole at the center to engage with the shaft 41. And, to the encoder magnet cover 34a, a ring-shaped encoder magnet 34, which corresponds to the number of pole pairs of the rotor 29 and is magnetized axially, is fixed by adhering. Thus, a position in the rotating direction of a magnetic pole radially magnetized in the rotor 29 (or a position in the rotating direction of the rotor 29) can be seen by detecting a position of a magnetic pole in the rotating direction of the encoder magnet 34 axially magnetized.

A DC brushless motor using a magnetic encoder detects a position of a magnetic pole of the rotor by the magnetic encoder which is structured by multiple magnet detecting elements fixed to the motor case 11 and the encoder magnet 34, and rotates the rotor by switching a drive phase of a coil having plural phases wound on the stator. Therefore, when circumferential intervals of the multiple magnet detecting elements are different, the coil having plural phases wound on the stator has a delicately different drive time, deteriorating the motor efficiency. Since fixing of the multiple magnet detecting elements to different cases cannot obtain high accuracy in circumferential intervals among the elements, the multiple magnet detecting elements are soldered to a board before fixing the board (hereinafter referred to as the sensor board) to the case using screws.

Figure 17:
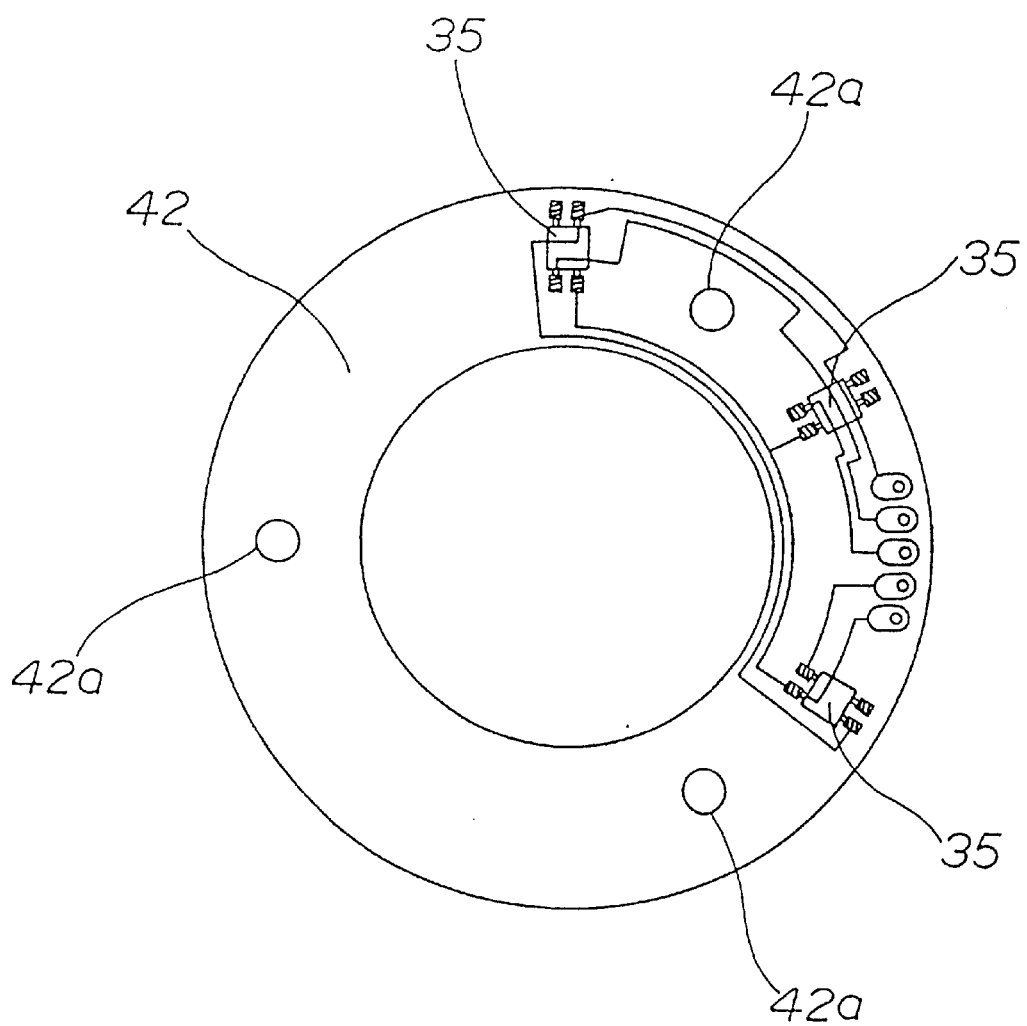
FIG. 17 is a plan view of the sensor board of a DC brushless motor, one embodiment of the fifth invention.

FIG. 17 shows the sensor board of the three-phase DC brushless motor of this embodiment. In this embodiment, as the magnet detecting elements, surface mount type Hall ICs 35 are used. The Hall IC 35 is an IC having a function for detecting the direction of a magnetic field by utilizing a Hall effect and an amplifier effect, and when the N pole is approached to the Hall IC, output is about +5 (V), and when the S pole is approached, output is about 0 (V). This embodiment needs three Hall ICs 35 at intervals of 60 degrees circumferentially, so that three Hall ICs 35 are soldered at intervals of 60 degrees to the sensor board 42. On the sensor board 42, copper foil patterns are drawn to supply the power from the motor exterior to the three Hall ICs 35 in parallel and to transmit the output signals of the Hall ICs 35 to the motor exterior. The copper foil patterns make a long detour around three holes 42a for fixing the sensor board drilled at intervals of 130 degrees on the same circumference, so that the copper foil patterns are not short-circuited by the heads of round head screws 40 for fixing the sensor board.

Back to FIG. 16 again, the motor case 11 has on its outside bearing holes having a diameter for tight fitting with bearing housing washers to receive housing washers of bearings 32. The bearings 32 are press-fitted into the bearing holes, and held by a C-shaped snap ring 39. Since the bearings 32 are fixed outside the case, the sensor board 42 is not interfered by the housing washers of the bearings 32. Therefore, the sensor board 42 has a smaller inner diameter than a conventional one, and the board area is larger.

And, the motor case 11 has a space for fixing the sensor board 42 using screws therein. In this space, when the shaft 41 to which the rotor 29 and the encoder magnet cover 34a are fixed is inserted into the bearings 32, the Hall ICs 35 oppose the encoder magnet 34 to detect a position of a magnetic pole axially of the encoder magnet 34, and three screw holes are machined to meet the holes 42a formed in the sensor board 42. The sensor board 42 is fixed to an appropriate position on the motor case 11 using the round head screws 40 having a larger nominal diameter than a conventional one. Then, the heads of the screws 40 are axially higher then the Hall ICs 35, so that the heads protrude axially from the Hall ICs 35.

According to the invention, the bearings are fixed from outside of the case, the area of the sensor board is increased, and the sensor board is fixed using the screws having a larger nominal diameter than a conventional one, so that the sensor board can be fixed easily, and the screw heads protrude from the magnet detecting elements toward the encoder magnet cover side. Therefore, even when the encoder magnet cover comes close to the sensor board when the shaft is not fixed, the screw heads come into contact with the encoder magnet cover, thereby protecting the magnet detecting elements. Thus, the reliability of the motor is improved, contributing for safety.

Figure 6:
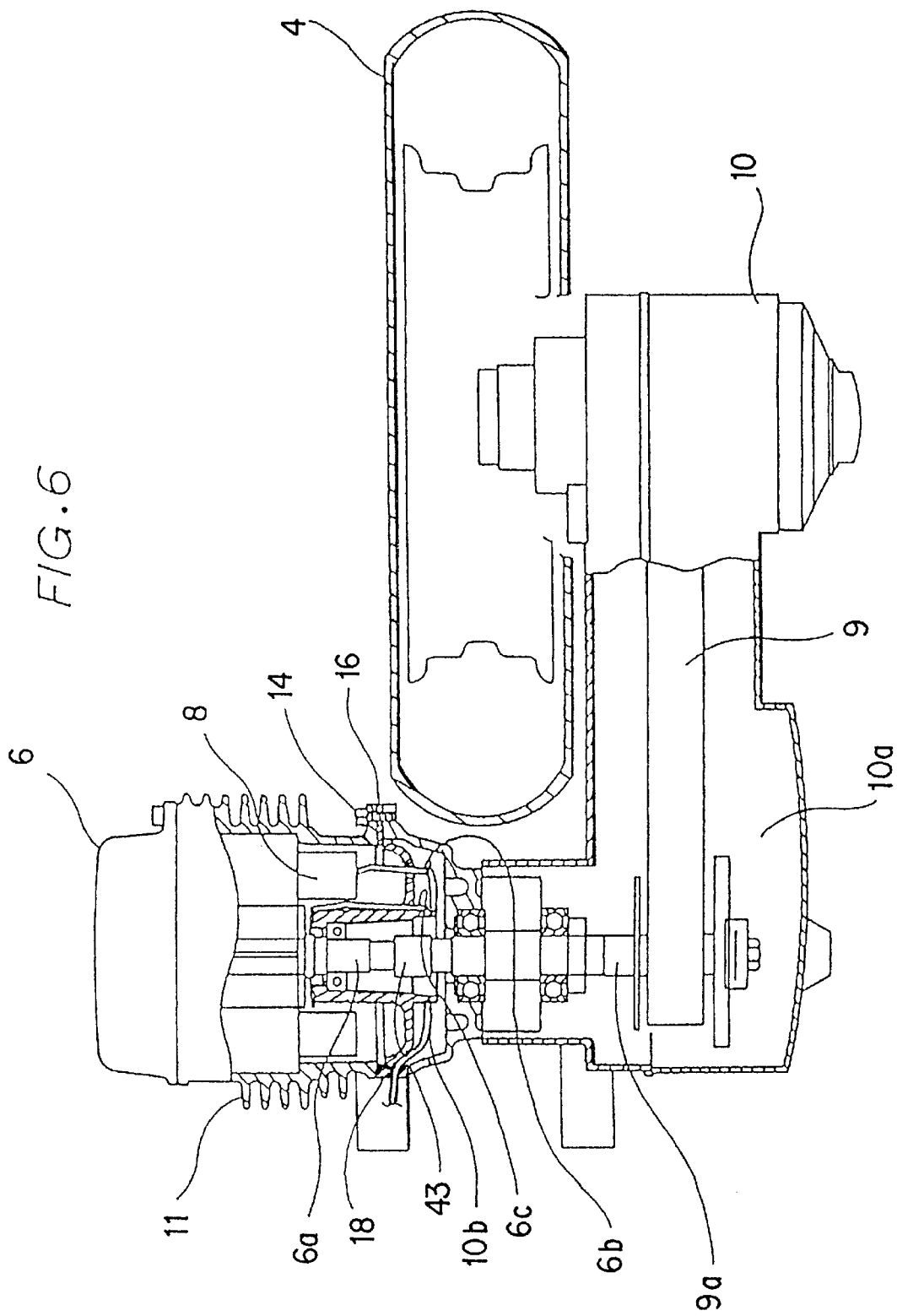
FIG. 6 is a sectional view showing a power transmission mechanism according to one embodiment of the invention.
Figure 7:
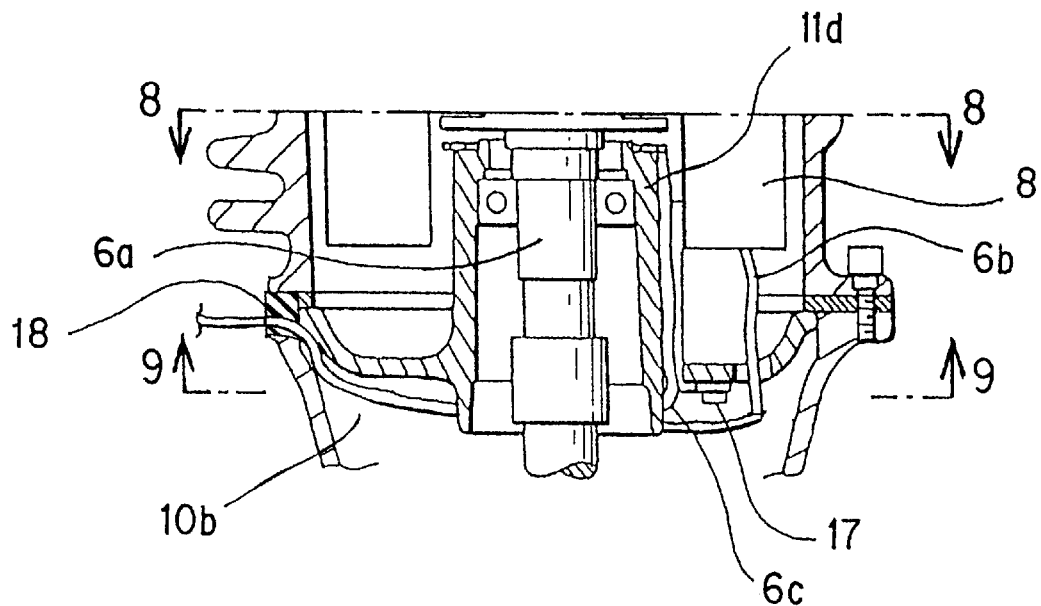
FIG. 7 is a sectional view showing the joining section of a motor case and a case for the power transmission mechanism, one embodiment of the second invention.
Figure 8:
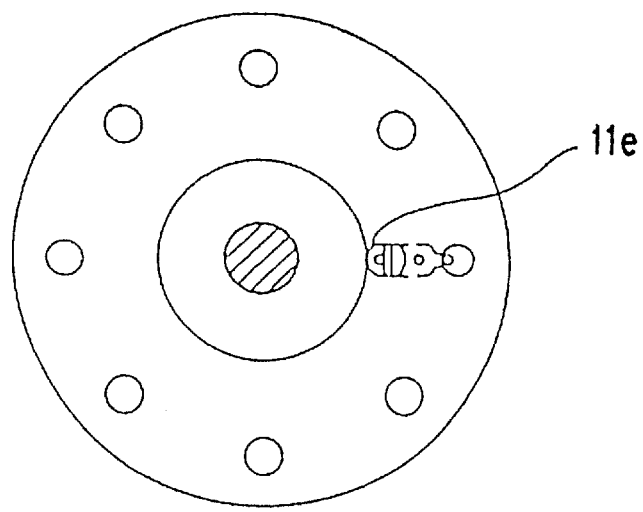
FIG. 8 is a view taken on line X—X of FIG. 7.
Figure 9:
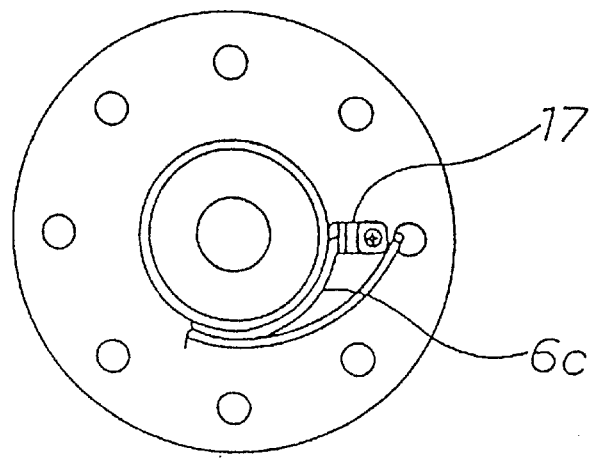
FIG. 9 is a view taken on line Y—Y of FIG. 7.
Figure 10:
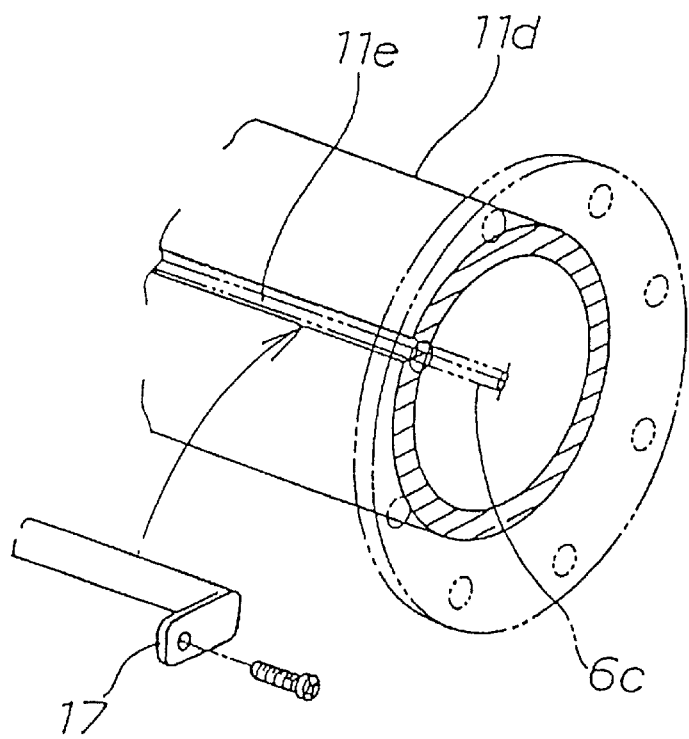
FIG. 10 is a perspective view showing a groove and a fixture of the motor case.

As described with reference to FIG. 6, the power of the motor 6 is transmitted to the rear wheel 4 via the power transmission mechanism 9. The motor 6 is attached using the fastening bolts to the case 10 in a direction so that the rear wheel 4 is parallel with the output shaft 6a.

Figure 18:
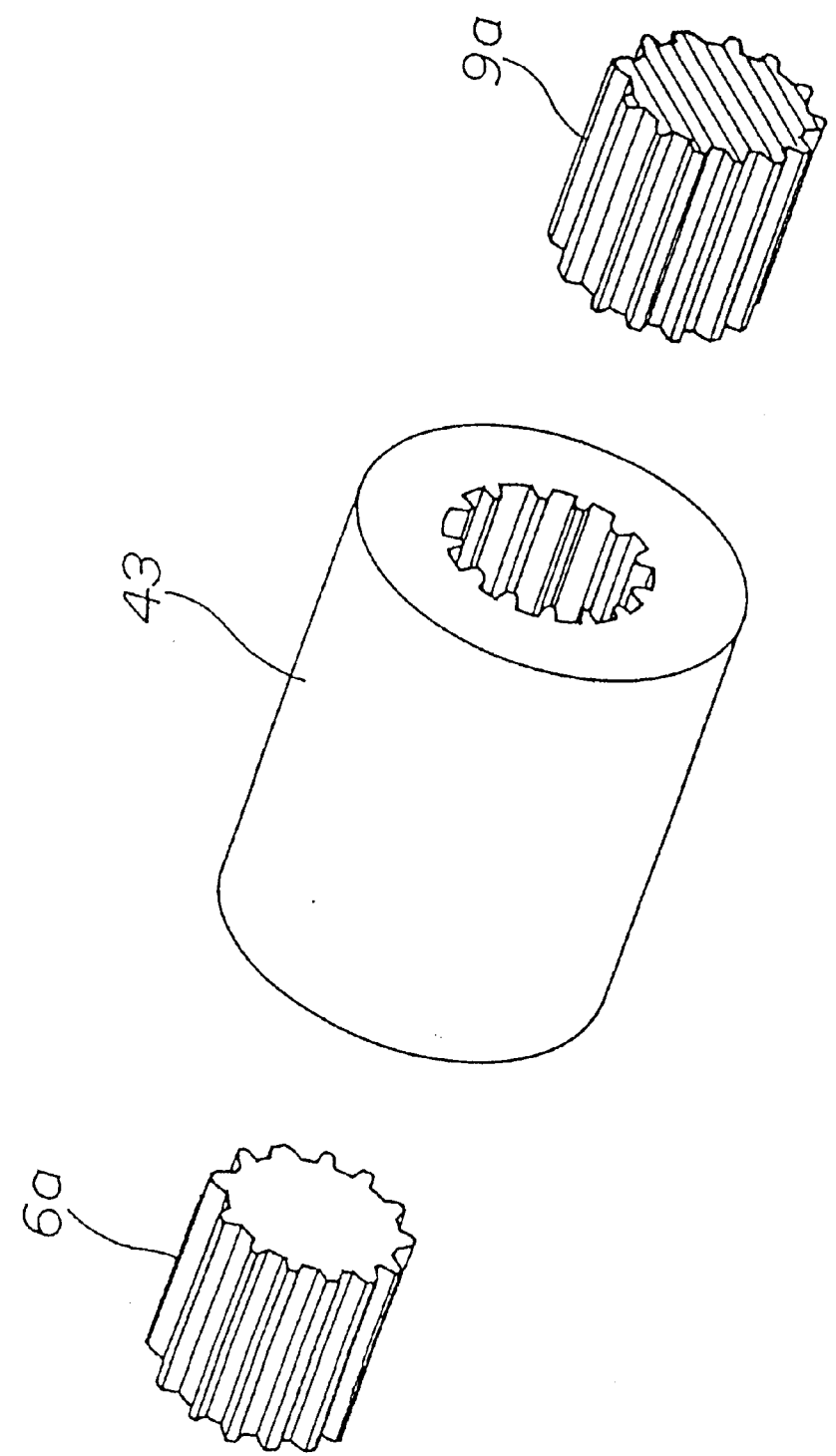
FIG. 18 is a perspective view showing a collar spline and an input/output shaft connected thereto.

FIG. 18 is a perspective view showing that a collar spline (collar undergone a spline hole machining) 43 is disposed between an output shaft 6a of the motor 6 and an input shaft 9a forming the power transmission mechanism 9. And, the motor 6 and the power transmission mechanism 9 are connected through the collar spline.

The collar spline 43 is cylindrical and made of the same metal as the output shaft 6a and the input shaft 9a, having a spline hole machined inside.

An involute spline shaft machining for JIS automobiles is applied to the end of each connecting side of the motor shaft 6a and the input shaft 9a of the power transmission mechanism 9, and the shaft ends 9a and 6a are inserted for fixing into the collar spline (collar undergone an involute spline hole machining for JIS automobiles) 43. Standard for engaging the spline shaft and the spline hole is free (a space is certainly provided). Further, the spline shaft-machined sections of the output shaft 6a and the input shaft 9a have shaft diameters machined into different diameters to engage for an axial length of the collar spline 43 and to prevent the collar spline 43 from moving axially. Therefore, special fixing of the collar spline 43 in the axial direction is not needed.

To install the motor 6 to the case 10 for accommodating the power transmission mechanism, the collar spline 34 is inserted into the output shaft 6a, and the engagement section of the motor is guided by the engagement of the shaft and the hole both precisely machined to the engagement section of the case 10 for accommodating the power transmission mechanism 9 so as to be installed in a prescribed attaching position. Therefore, adjustment such as centering is not required when assembling, making the assembly easy. When a flexible shaft coupling is used as in a conventional case, sizes of the coupling section become large axially and radially, and when a shaft coupling using bolts are used, its assembly becomes quite troublesome. Further, when transmission is made using a key, a center displacement of the shafts to be connected, or precision of the position according to the machining precision of the output shaft, the input shaft, each bearing holding section, and each engaging section is very significant, and if precision is not secured, the bearings suffer from a stress, decreasing a service life and a transmission efficiency.

On this point, this embodiment does not need to enhance the machining precision of the output shaft of the motor 6, the bearing holding section and the engaging section with the case 10, and the machining precision of the input shaft 9a of the power transmission mechanism 9, the bearing of the case 10 and the engaging section with the motor 6. And, assembling can be made easily, and the power of the motor can be transmitted efficiently.

According to the invention, the number of parts is reduced and the machining precision is eased, reducing costs. And, this is a power transmission method which can be mounted even when a pace between the motor shaft and the power transmission mechanism is small. For example, when a structural arrangement is required to fully secure the maximum angle (banking angle) of an electric motor two wheeler which is largely inclined inward when turning a corner, the projections of the motor from the body are prevented, providing remarkable protection against falling. Further, for electric motor vehicles in general, miniaturization of the power transmission mechanism is very effective in packaging various accessories.

Figure 19:
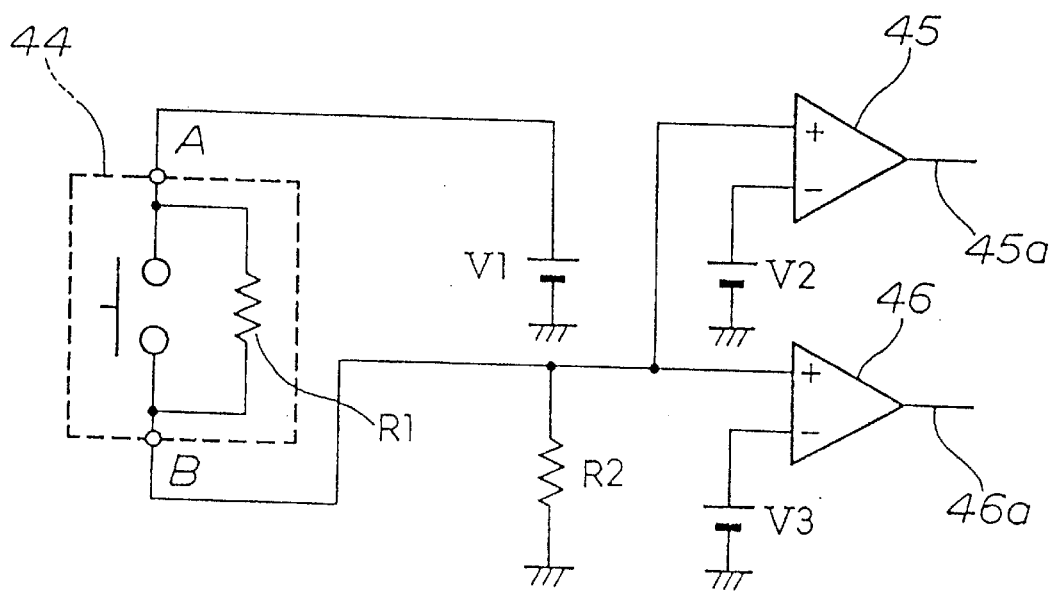
FIG. 19 is a connection diagram of a switch, one embodiment of the seventh invention.

FIG. 19 is a connection diagram of the switch of this embodiment. Reference numeral 44 represents a switch, which consists of a push switch and a resistor R1 which is connected in parallel with the above switch. In this switch 44, when the contact of the switch is open, a resistance value between its terminals is R1. Practically, the resistor R1 is integrally formed so as not to come off from the push switch. And, the switch is not limited to the push switch but may be any type. One terminal A of the switch is connected to a standard voltage V1 and the other terminal B1 to a resistor R2 and a non-inversion input terminal of comparators 45, 46. Another terminal of the resistor R2 is grounded. Respective inversion input terminal of the comparators 45, 46 is connected to standard voltages V2, V3.

Now, a voltage which is entered in the non-inversion input terminal of the comparators 45, 46 depending on the condition of the contact of the switch 44, or how a voltage drop of the resistor R2 is different will be considered. First, when the switch 44 is closed, the voltage is V1. And, with the switch 44 open, the voltage is expressed as follows because the resistor R1 is connected in series with the resistor R2.

$$(R2/R1+R2)*V1$$

And, the voltage is 0 under a condition that a conducting wire connected to the terminal A or B is broken and the switch 44 is broken away. When it is assumed that outputs 45a, 46a of the comparators 45, 46 are H level (a state that the voltage has increased to about the voltage of the power source. Hereinafter referred to as this) when the voltage of the non-inversion input terminal is higher than that of the inversion input terminal and L level (a state that the voltage is lowered to about 0V. Hereinafter referred to as this) when the voltage of the inversion input terminal is higher than that of the non-inversion input terminal. Then, the voltage of the standard voltages V1 and V2 is set to meet the conditions of the following.

$0 < V2 \leq [R2/(R1+R2)]*V1 < V3 < V1$

Under a condition that the switch 44 is closed, the outputs 45a, 46a become H level: under a condition that the switch 44 is open, the output 45a becomes H level and the output 46a becomes L level; and under a condition that the switch is broken away, e.g., a conducting wire is broken, the outputs 45a, 46a become L level. Therefore, checking the outputs 45a, 46a allows to distinguish a state that the switch 44 is open and a state that the switch 44 is broken away.

Figure 20:
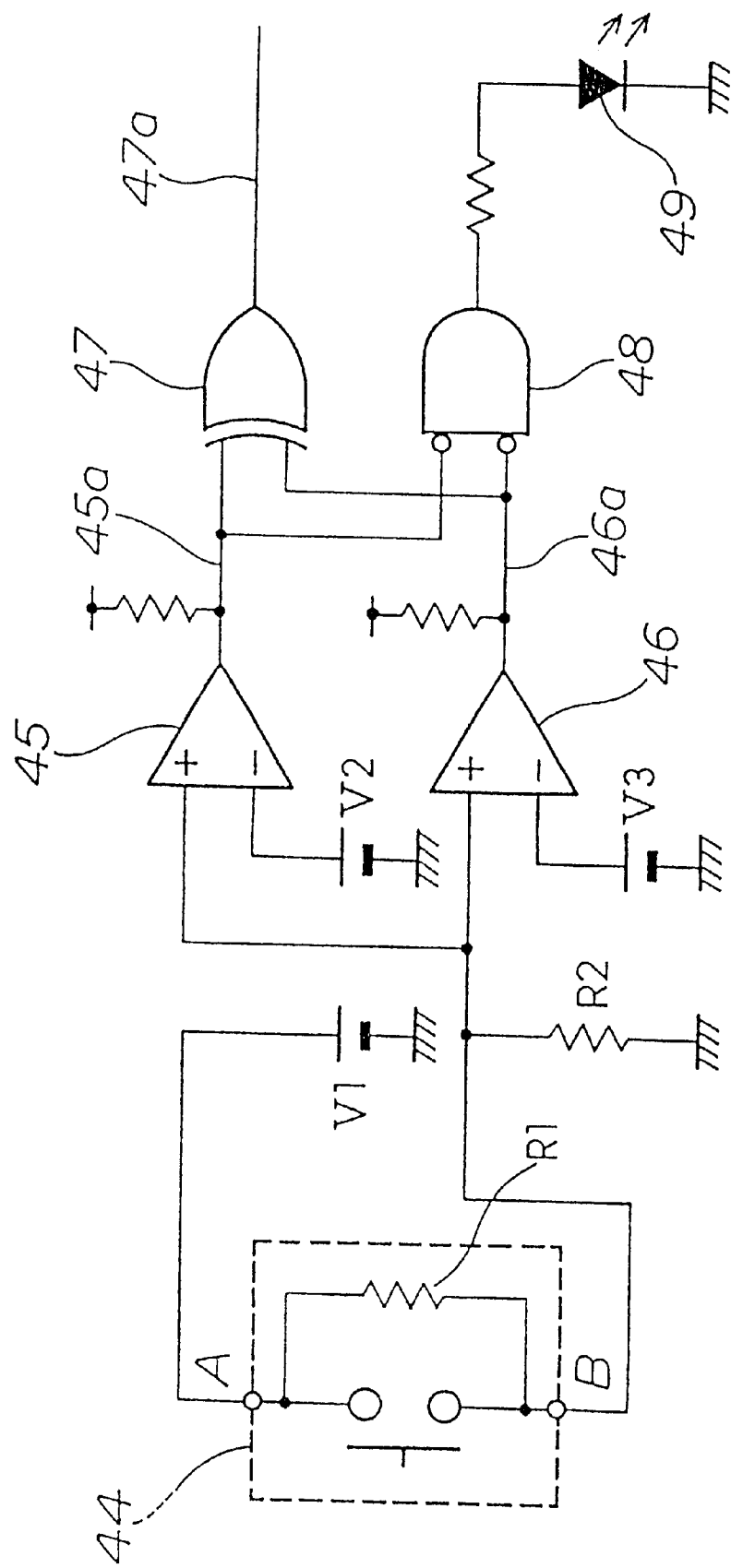
FIG. 20 is a circuit diagram of a switch, one embodiment of the seventh invention.

FIG. 20 is an example showing a more practical circuit with a decode circuit added to the circuit of FIG. 19. Respective comparator outputs 45a, 46a are entered into the inputs of EX-OR gate 47 and NOR gate 48. Since the EX-OR gate 47 outputs H level only when two input levels are different, the voltage of H level is outputted to its output 47a only when the switch 44 is open, and the voltage of L level is outputted when the switch 44 is closed and when the switch 44 is broken away.

The output 47a can be used to determine the operating condition of an apparatus in which this circuit is installed. An example of using it for a kill switch for an electric two wheeler will be described. When a control circuit is configured so as to stop a motor when the output 47a reaches L level, the motor stops not only when the switch is pressed but also when the switch is broken away. Thus, a risk that the motor does not stop when the switch is pressed in case of emergency can be remedied. Furthermore, since both the comparator outputs 45a, 46a become L level when the switch is broken away in this circuit, the NOR gate 48 outputs H level, and a light emitting diode 49 turns on to give warning. An operator or a driver can recognize a problem in the apparatus from this warning.

According to the invention, the reliability of a device in which the switch is installed can be remarkably improved because a state that the switch is open and a state that the switch is broken away can be clearly distinguished. Particularly, safety is tremendous when it is used for a kill switch for a two wheeler.

Figure 21:
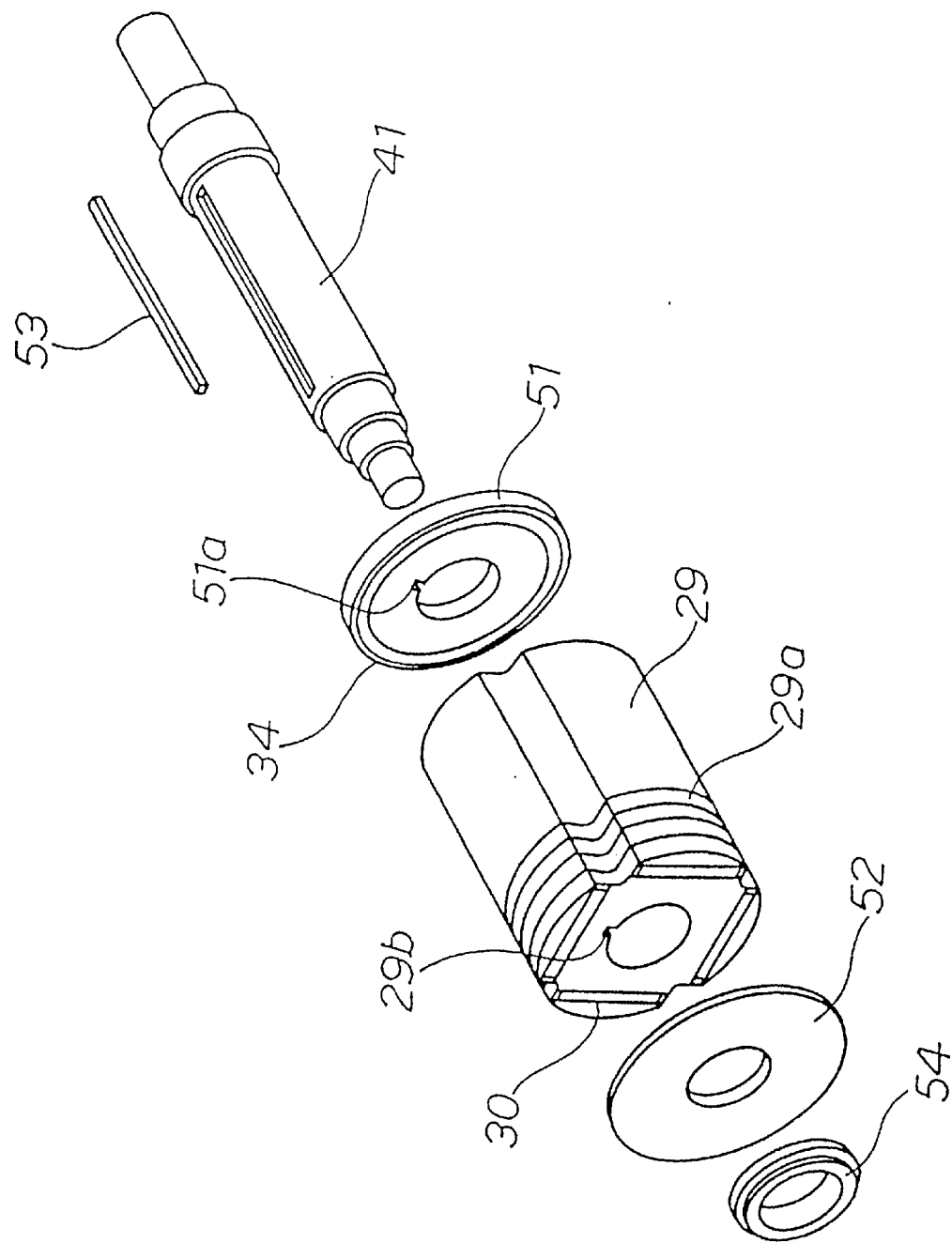
FIG. 21 is an exploded perspective view of parts fixed to a shaft, one embodiment of the eighth invention.
Figure 22:
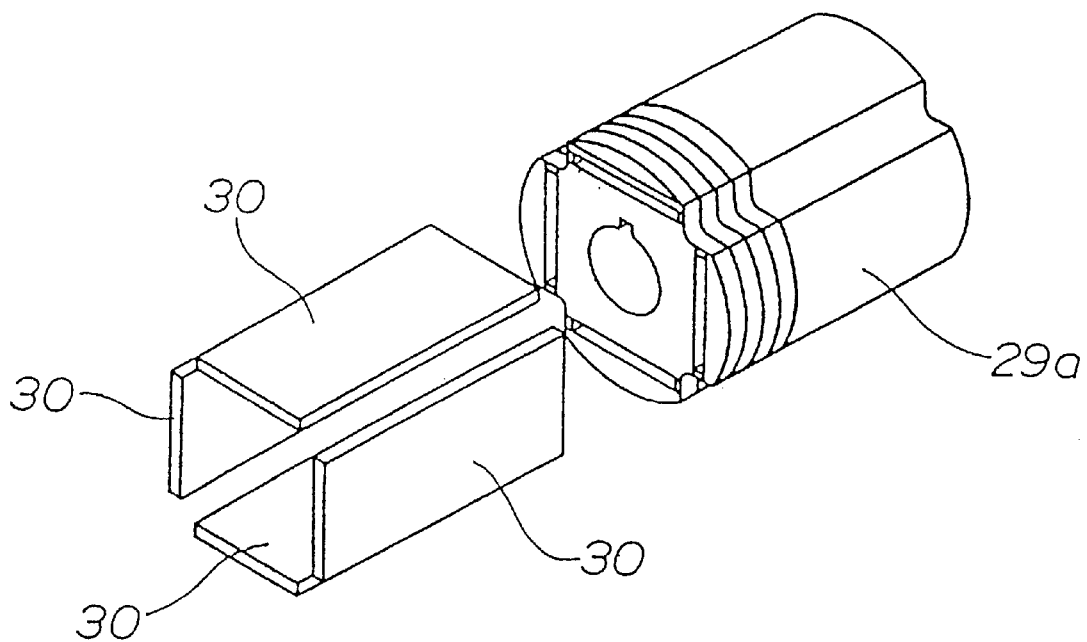
FIG. 22 is an exploded perspective view showing the structure of a rotor, one embodiment of the eighth invention.
Figure 23:
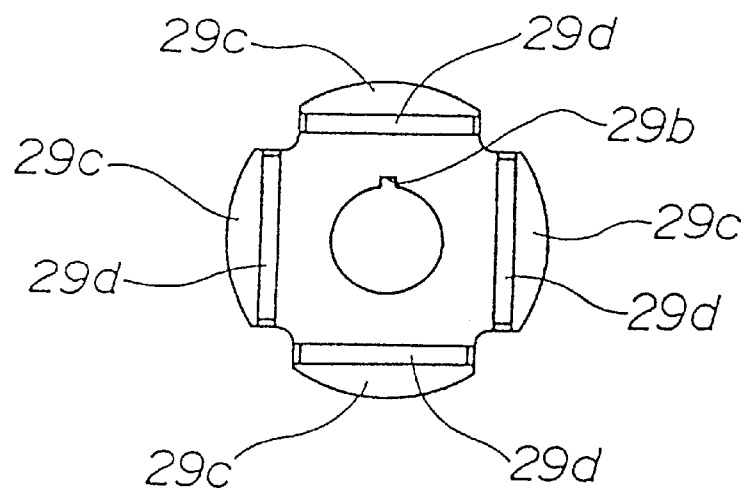
FIG. 23 is a side view of a rotor yoke, one embodiment of the eighth invention.

FIG. 21 is an exploded perspective view of parts to be fixed to a shaft, showing one embodiment of the eighth invention. FIG. 22 is an exploded perspective view showing the structure of a rotor. FIG. 23 is a plan view of a rotor yoke. The rotor will be described first.

A rotor 29 is structured by inserting four magnets 30 for a field magnet into slots 29d of a rotor yoke 29a so as to invert the magnetic poles of adjacent salient poles. The rotor yoke 29a is structured by multilaying silicon steel plates and has a hole at the center for loose fitting of a shaft 41. And a key groove 29b is machined at a part of the hole. Besides, the rotor yoke 29a has four salient poles 29c on the outer periphery, and the slot 29d is formed at the base of each salient pole.

Since the magnets 30 for a field magnet are stuck in the slots 29d by magnetic force, they may be moved axially due to vibration during the operation of a motor and come off the slots 29d. To prevent it from happening, discs 51, 52 are disposed at both ends of the rotor 29, and these three parts are tightened using a locking nut 54 to fix to the shaft 41. The discs 51, 52 are made of a non-magnetic material, have a hole at the center for loose fitting of the shaft, and have an outer diameter almost the same as the outermost diameter of the rotor. The disc 51 has an encoder magnet 34 embedded, which is used to detect a position of the rotor 29. Reference numeral 53 represents a key.

Figure 24:
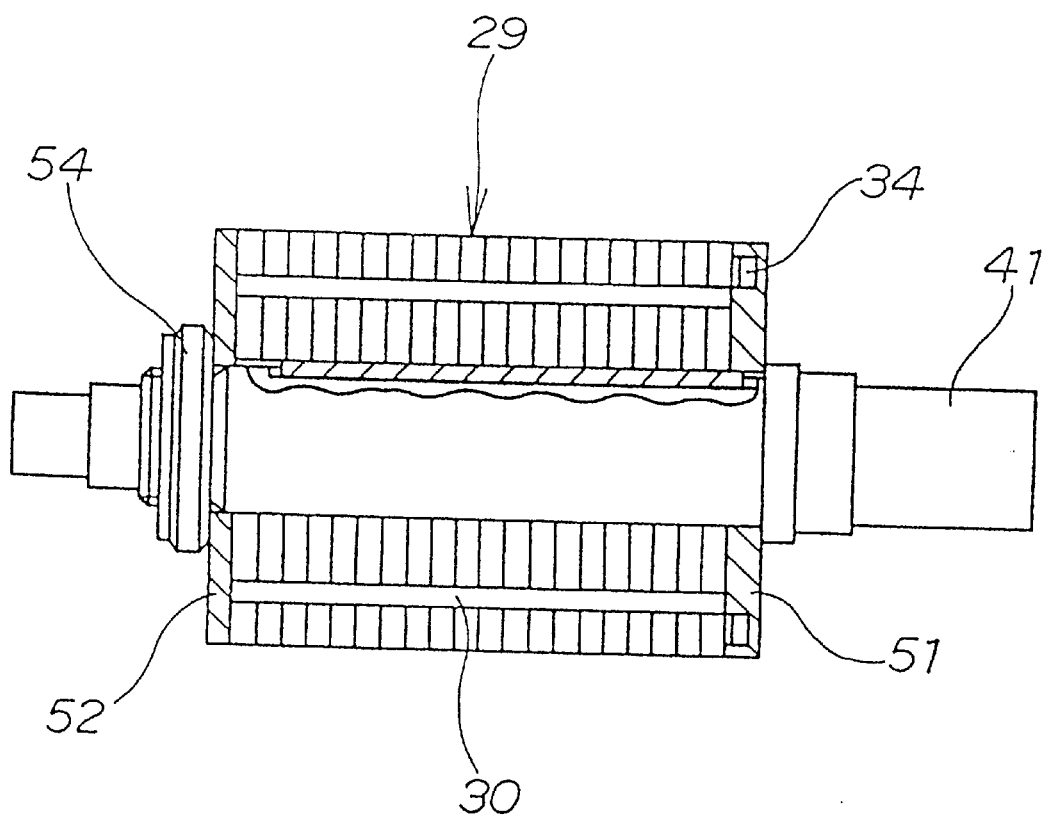
FIG. 24 is a vertical sectional view of the periphery of a shaft and a rotor showing an encoder magnet fixing structure, one embodiment of the eighth invention.

Now, a state that the discs 51, 52 and the rotor 29 are fixed to the shaft 41 using the locking nut 54 will be described with reference to FIG. 24. The disc 51 has the encoder magnet 34 embedded so as to face the side of the rotor 29. Therefore, all faces of the encoder magnet 34 are covered with the disc 51 or the rotor 29. And, the magnets 30 for a field magnet are fixed by the discs 51, 52 so not to displace axially.

Figure 25:
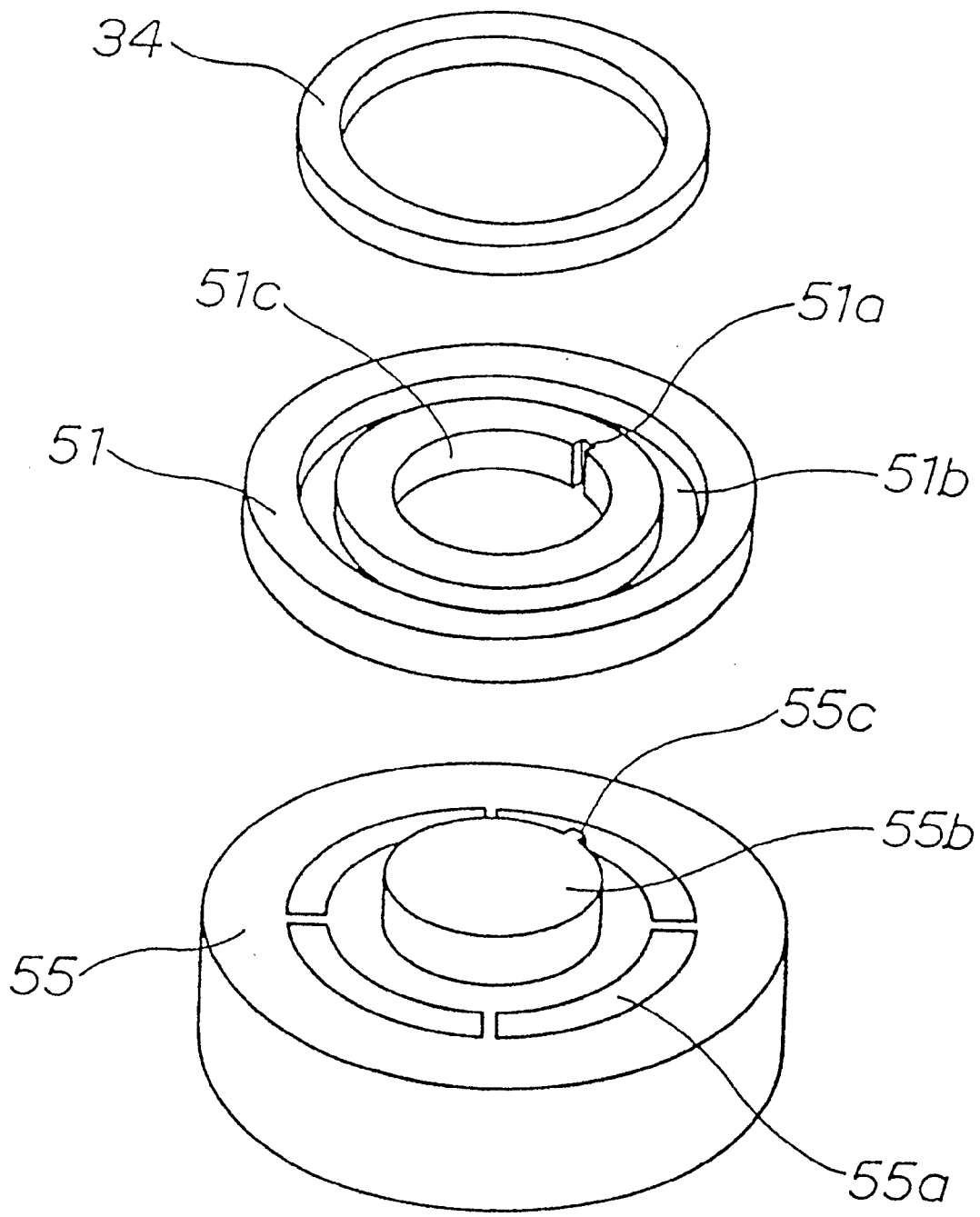
FIG. 25 is a perspective view showing an encoder magnet, a disc and a magnetized yoke, one embodiment of the eighth invention.

FIG. 25 is a perspective view of the encoder magnet, the disc, and a magnetic yoke. The disc 51 is made of a non-magnetic material such as aluminum, has a hole 51c at the center for loose fitting of the shaft 41, and has a key groove 51a formed at a part of the hole. The key groove 51a is used for alignment with the rotor 29 and also used for alignment of the magnetic yoke and the encoder magnet 34 when magnetizing the encoder magnet 34. And, the outer diameter of the disc 51 is concentric with the hole 51c and almost same as the outermost diameter of the rotor. And, a ring groove 51b is formed in concentric with the hole 51c between the inner and outer diameters of the disc 51, and it is wide enough to fit the encoder magnet 34 and deep enough so that the encoder magnet 34 does not protrude from the disc 51. One ring-shaped not-magnetized encoder magnet 34 is adhered to the groove 51b.

The magnetic yoke 55 is made of a non-magnetic material excepting yokes 55a, and has at the center a projection 55b which fits with the inner diameter of the disc 51. And a key 55c is formed at a part of the projection to engage with the key groove 51a of the disc 51. The yokes 55a have a coil (not shown) wound on them, and when an electric current is fed through the coil, they are magnetized into four poles having inverted magnetic poles between the adjacent yokes. The circumferential positional relation between the key 55c and the yoke 55a is equal to that between the key groove 29b of the rotor 29 and the four salient poles. Therefore, when the key groove 51a of the disc 51 is engaged with the key 55c and magnetized, circumferential positioning is made between the magnetic pole magnetized on the encoder magnet 34 and the four salient poles of the rotor 29.

According to the invention, since the encoder magnet 34 is fitted in the disc 51 which prevents the magnets 30 for a field magnet from coming off the slots 29d, even when the encoder magnet 34 adhered to the disc 51 is separated, the encoder magnet 34 is held between the disc 51 and the rotor 29. Therefore, the encoder magnet 34 does not fly off within the motor, and a damage to the motor can be prevented. And, since the disc 51 also serves as a conventional encoder magnet cover for fixing the encoder magnet, the number of parts can be reduced by one. Further, the fitting of one ring encoder magnet 34 to the disc 51 and the magnetization using the key groove 51a which is used for alignment with the rotor enable to accurately align the circumferential direction of the rotor magnetic pole with that of the magnetic pole of the encoder magnet. As a result, the motor performance and safety are improved.

Figure 26:
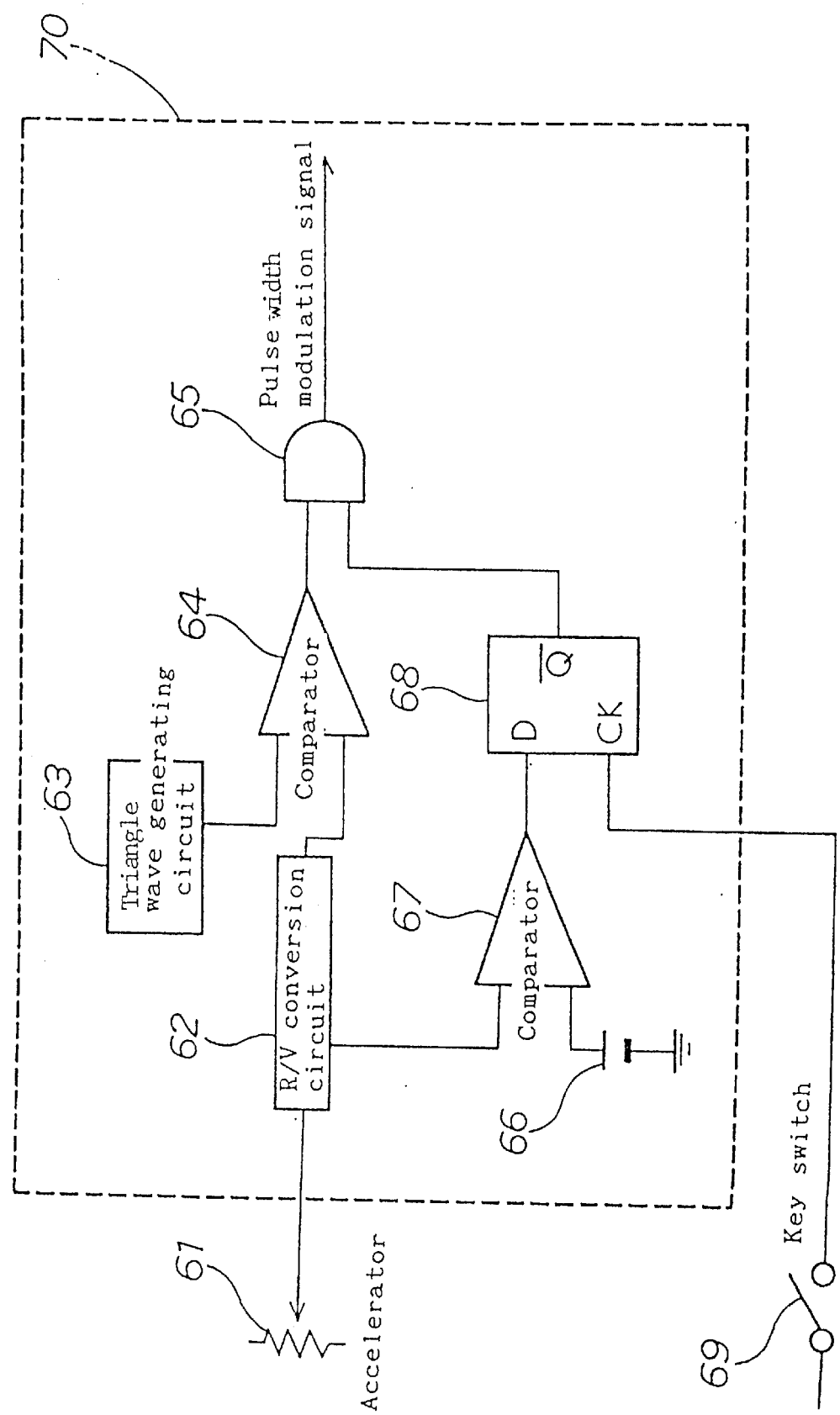
FIG. 26 is a circuit diagram of a controller, one embodiment of the ninth invention.
Figure 27:
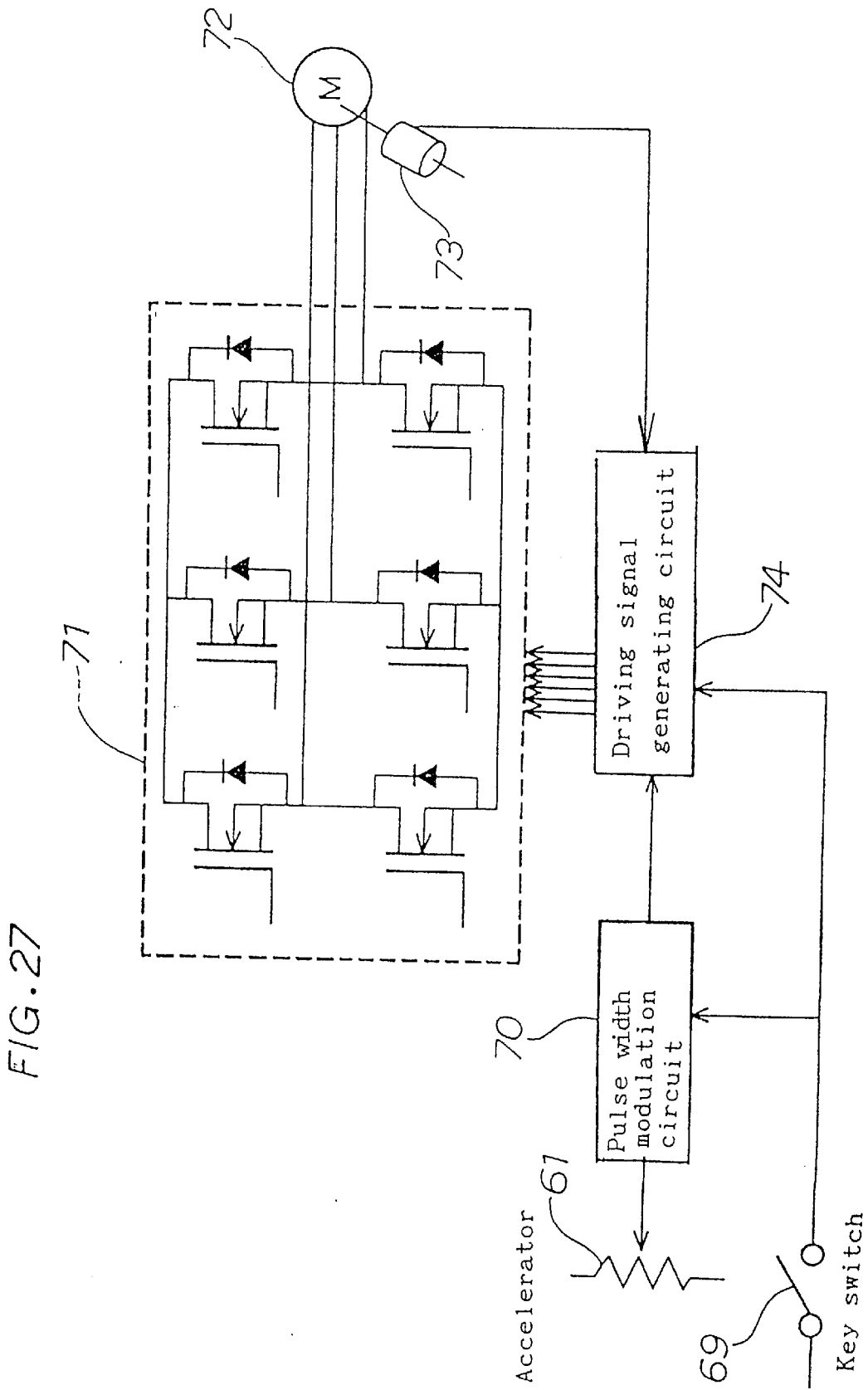
FIG. 27 is a circuit diagram for motor drive, one embodiment of the ninth invention.

FIG. 26 is a circuit diagram of a controller according to this embodiment, and FIG. 27 is a circuit diagram for driving a motor. This embodiment uses a brushless motor as the motor. And a signal from an accelerator is given as a resistance value. In the above drawings, a motor 72 has an inverter circuit 71 and an encoder 73 for detecting a rotor position connected. A rotor position signal from the encoder 73 is sent to a driving signal generating circuit 74, and the driving signal generating circuit 74 drives the inverter circuit 71 depending on the position of the rotor.

A signal from an accelerator 61 is entered in a pulse duration modulation circuit 70, and a pulse duration according to the degree of opening of the accelerator 61 is outputted and sent to the driving signal generating circuit 74.

The driving signal generating circuit 74 chopper-controls the inverter circuit 71 according to the pulse duration and controls the output of the motor 72. A signal from a key switch 69 is connected to the driving signal generating circuit 74 and stops the driving of the inverter circuit 71 under the state that the key switch 69 is off.

The pulse duration modulation circuit 7 of this embodiment will be described in detail with reference to FIG. 26. A resistance value varies depending on the degree of opening of the accelerator 61. The resistance value is converted into a voltage value by an R/V conversion circuit 62 to enter into a comparator 64. The comparator 64 is also receiving the output from a chopping wave generating circuit 63, and the pulse duration outputted from the comparator 64 varies depending on the voltage value outputted from the R/V conversion circuit 62.

The output from the R/V conversion circuit 62 is connected to the comparator 67. A reference voltage 66 may be set to a value that the accelerator 61 shifts from a closed state to an open state. In this embodiment, the output of a comparator 67 becomes an H level with the accelerator 61 in the open state and an L level with the accelerator 61 in the closed state.

This embodiment uses a flip flop 68 as a means to judge the open or closed state of the accelerator 61 when the key switch 69 is turned on. Into the data input terminal of the flip flop 68, the output of the comparator 67 is entered, and into the clock input terminal, the on signal of the key switch 69 is entered.

When the key switch is turned on with the accelerator 61 open, or in a state that the H level is entered in the data input terminal of the flip flop 68, the L level is outputted from the output bar Q of the flip flop 68, and when the key switch is turned on with the accelerator closed, the bar Q outputs the H level.

When the output signal of the comparator 64 and the output signal of the flip flop 68 are entered into the input terminal of logical sum 65, and when the key switch is turned on with the accelerator 61 open, the L level is outputted from the output terminal of the logical sum 65, and the rotation of the motor can be prohibited.

In this embodiment, the brushless motor has been used as an example, but this embodiment can also be applied to a brush motor or inductive motor. And, the comparator 67 can be omitted by coinciding the open and close threshold of the accelerator 61 with the threshold of the flip flop 68 in the structure of the R/V conversion circuit 62.

According to the invention, even if the key switch is turned on with the accelerator open in error, the motor does not rotate, enabling to prevent the electric motor vehicle from recklessly running.

Figure 28:
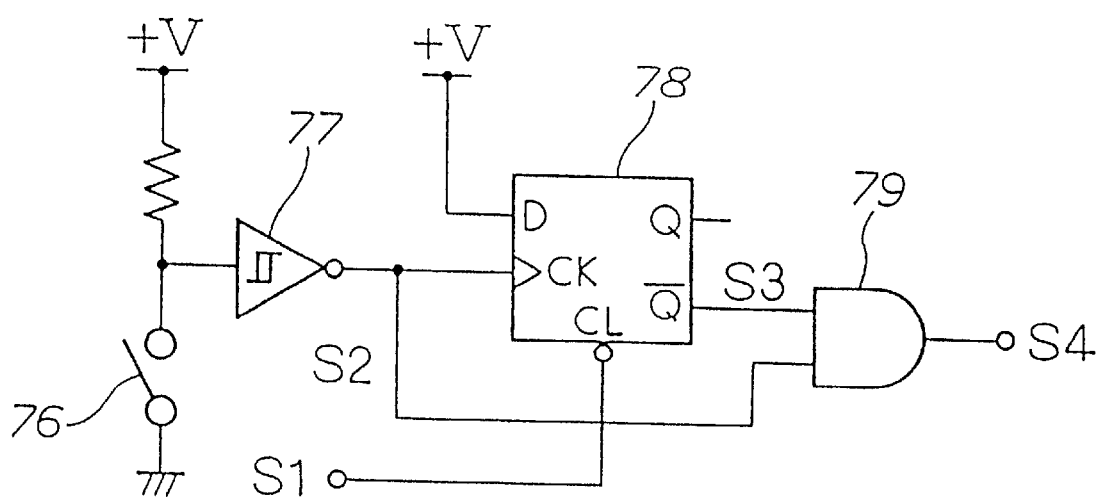
FIG. 28 is a block diagram of a travel prohibiting circuit, one embodiment of the tenth invention.

FIG. 28 shows a block diagram of a travel prohibiting circuit, one embodiment of the tenth invention. In FIG. 28, the reference numeral 76 represents a switch for inhibiting a vehicle from traveling, 77 a NOT gate, 78 a flip flop, and 79 an AND gate.

Into a clear terminal of the flip flop 78, a signal S1 which indicates the open or closed state of an accelerator is entered. The voltage of the signal S1 becomes L level when the accelerator is closed and H level when the accelerator is opened. A signal S2 shows the state of the contact of the switch 76. When the switch 76 is open, the input voltage of the NOT gate 77 becomes H level, and the voltage of H level appears in the signal S2. Conversely, when the switch 76 is closed, the input voltage of the NOT gate 77 becomes L level, and the voltage of H level appears in the signal S2. The signal S2 is connected to the clock terminal of the flip flop 78 and an input terminal of the AND gate 79. A signal S3 is an inversion output of the flip flop 78 and connected to another input terminal of the AND gate 79. A signal S4 to be obtained by the above connection is a signal to determine if the vehicle may travel or not, and when its voltage is at L level, the vehicle is in the travel inhibited state, and when its voltage is at H level, the vehicle is in the travel allowed state.

Operation of the circuit of FIG. 28 will be described.

Since the signal S2 is at L level when the switch 76 is open, the AND gate 79 does not meet AND conditions, and the signal S4 becomes L level regardless of the signals S1, S3. That is to say, the vehicle is in the travel inhibited state.

Operation of the circuit when the switch 76 is closed will be described.

Since the signal S1 is at L level when the accelerator is closed, the flip flop 78 is cleared and the voltage of H level is retained for the signal S3. Therefore, the signal S2 becomes H level when the switch 76 is closed, and the AND gate 79 meets the AND conditions, then the signal S4 changes to H level and the vehicle shifts to the travel allowed state. Then, even if the accelerator is opened and the signal S1 changes to H level, the flip flop 78 retains the signal S3 at H level. Therefore, the travel allowed state is retained until the switch 76 is opened again.

Since the signal S1 is H level when the accelerator is in an open state, when the switch 76 is closed, the flip flop 78 reads the voltage of H level applied to a D input terminal simultaneously with the startup of the signal S2 inputted into the clock terminal and retains the signal S3 at L level. Therefore, the AND gate 79 does not meet AND conditions and the signal S4 is continuously retained at L level. In other words, the vehicle does not start even if the accelerator is open, and its abrupt start is prevented. When the accelerator is closed in this state, the signal S1 becomes L level and the flip flop is cleared. And the signal S3 returns to H level, so that the signal S4 also becomes H level. Then, the vehicle shifts to the travel allowed state.

Figure 29:
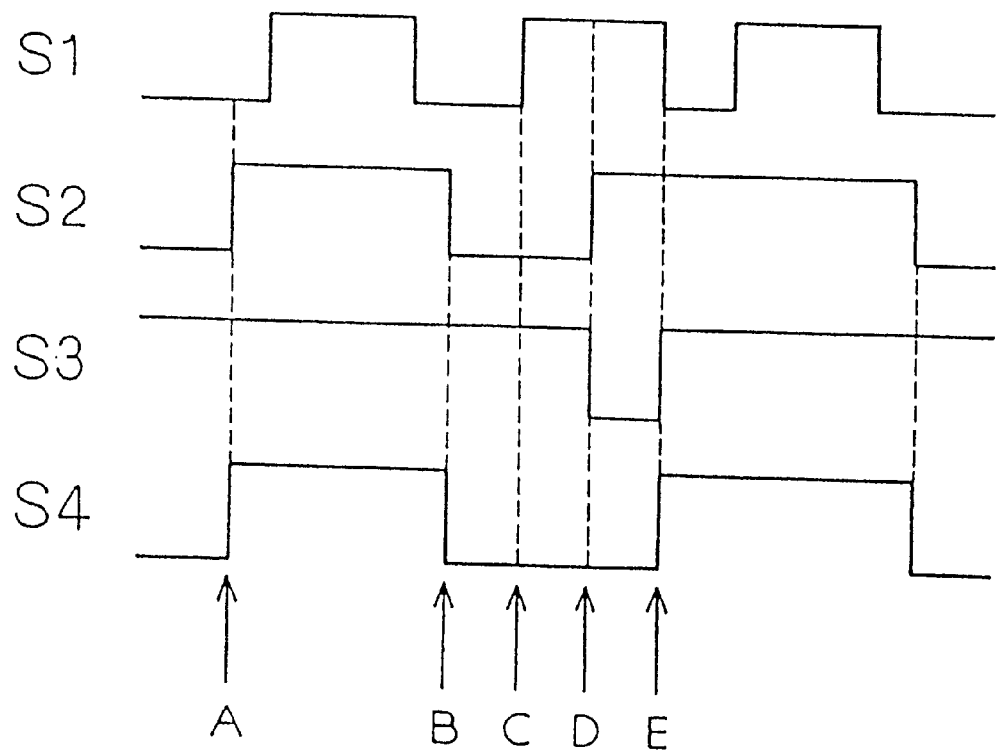
FIG. 29 is a timing chart of a travel prohibiting circuit of the tenth invention.

FIG. 29 is a timing chart of the travel inhibiting circuit of this embodiment. In the drawing, since the accelerator is closed at point A, the signal S1 is L level and the switch is closed, then the signal S2 becomes H level. At the same time, the signal S4 also becomes H level and the vehicle falls in the travel allowed state. When the switch is opened at point B and the signal S2 becomes L level, the signal S4 also becomes L level and the vehicle falls in the travel inhibited state. Therefore, the vehicle does not travel even when the accelerator is opened at point C and the signal S1 becomes H level. Furthermore, the switch is closed at point D and the signal S2 becomes H level, but since the accelerator is in the open state, the signal S3 becomes L level and the signal S4 continuously retains L level. In other words, the vehicle does not travel even when the accelerator is open, and its abrupt start can be avoided. When the accelerator is closed at point E and the signal S1 becomes L level, the signal S3 becomes H level, then the signal S4 becomes H level. Therefore, the vehicle falls in the travel allowed state.

According to the invention, even when the switch to inhibit a travel is released in a state that the accelerator is open, an unexpected abrupt start can be avoided, and safety can be remarkably improved.

Figure 30:
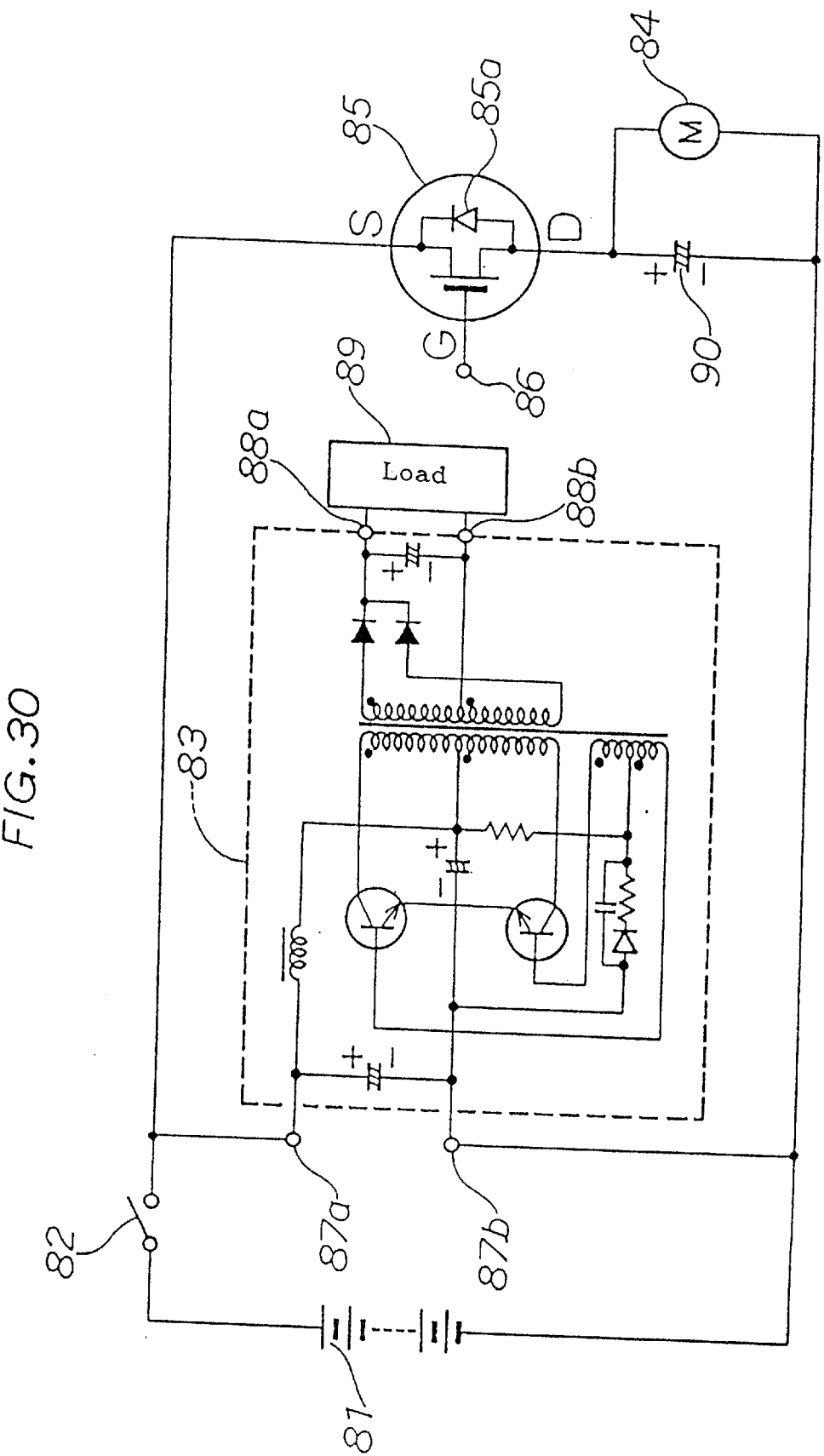
FIG. 30 is a power circuit diagram, one embodiment of the eleventh invention.

FIG. 30 is a power circuit diagram according to this embodiment. In FIG. 30, a DC power of a battery 81 is supplied to a DC/DC converter 83 and a motor 84 through a power switch 82. The DC power of the battery 81 is applied between an input terminal 87a and an input terminal 87b. An output power from the DC/DC converter 83 is outputted to a load 9 from output terminals 88a and 88b.

Specifically, the DC/DC converter 83 works to convert the voltage of the battery 81 and supply to the load 89. For the voltage to be converted, for example the 48-V battery 81 is converted into 12V and supplied to the load 89.

The motor 84 is supplied with the DC voltage which has undergone the switching control (speed control) by a power FET 85. A control voltage for this switching control is supplied to an input terminal 86 and applied to a gate of the power FET 85. The voltage undergone the switching operation by the power FET 85 is outputted from a drain of the power FET 85 to the motor 84. Since the motor 84 generally includes an inductance component, a serge voltage may be produced between the both electrodes of the motor 84. In order to absorb this serge voltage, a large-capacity capacitor 90 is connected between the both electrodes of the motor 84.

In the circuit shown in FIG. 30, when the power switch 82 is on, power is supplied as usual, and the DC/DC converter 83 converts the voltage of the battery 81 and supplies to the load 89. And, the power FET 85 makes the switching operation, supplies the output power from the drain of the power FET 85 to the motor 84, and controls the speed of the motor 84.

When the power switch 82 is off, the power supplying operation is stopped. When maintenance is required, the power switch 82 is turned off. When the power switch 82 is off, the battery 81 does not supply the power to the DC/DC converter 83 nor the motor 84. At this time, a closed circuit is formed through the positive terminal of the capacitor 90, the diode 85*a*, the input terminal 87*a*, the input terminal 87*b*, and the negative terminal of the capacitor 90. The diode 85*a* is a parasitic diode which is formed within the power FET 85 when it is manufactured.

Since the DC/DC converter 83 is a DC/DC converter which starts the oscillation operation by merely applying the voltage between the input terminals 87*a* and 87*b*, a current of a no-load current or more flows between the input terminals 87*a* and 87*b* of the DC/DC converter 83, including when the load 89 is under no load. Therefore, the DC/DC converter 83 is connected with the capacitor 90 in parallel, and the power of the both ends of the capacitor 90 is applied to the input terminals 87*a* and 87*b* of the DC/DC converter 83, thereby discharging a residual charge from the capacitor 90 without disposing a special discharge circuit.

In addition to the above embodiment, any circuit format may be used as long as it is a circuit which flows a consumption current even when the load 89 is under no load for example, or the DC/DC converter 83 through which a no-load current flows.

According to the invention, a residual charge of the capacitor can be discharged without mounting a resistive circuit for discharging the capacitor, making it possible to improve a space factor and achieve the light weight while basically retaining safety.

Figure 31:
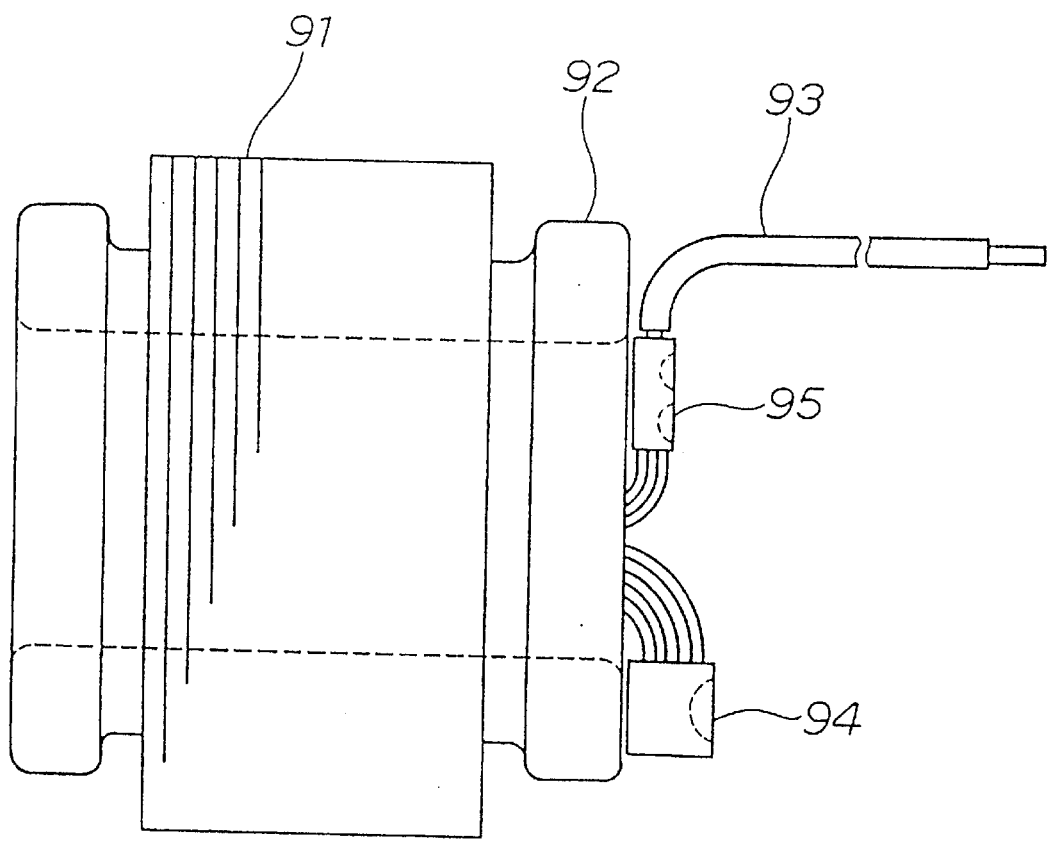
FIG. 31 is a side view of a stator winding, one embodiment of the twelfth invention.

FIG. 31 shows a side view of a stator winding of this embodiment. Reference numeral 91 is a stator structured by multilaying 0.5-mm thick silicon steel plates. Reference numeral 92 is a coil formed by winding an electric wire (called a magnet wire) having an insulating film on a copper wire. This embodiment has a three-phase Y-connection, having four single coils per phase, and one single coil has three turns. Because of the three-phase Y-connection, there are three coils 92 for three phases. Twenty parallel wound 0.8-mm electric wires are used for the stator winding. To facilitate the insertion of the wire into the stator 91, an electric wire undergone a low-friction surface treatment is used. A portion from the stator 91 of the coil 92 is especially called a coil end to distinguish from a part remaining in the stator. Reference numeral 93 is a lead wire. In FIG. 31, only one lead wire 93 is shown for convenience of the description, but it is practically provided in three for three phases. In this embodiment, the lead wire is a flame retardant synthetic resin insulated electric wire having a nominal cross section of 5.5 square millimeters. Reference numeral 94 is a crimp connector for connecting the coils 92, 92. Since the coil 92 is a three-phase Y-connection, the crimp connector 94 connects the three-phase coils 92. Reference numeral 95 is a crimp connector for connecting the coil 92 and the lead wire 93.

Figure 32:
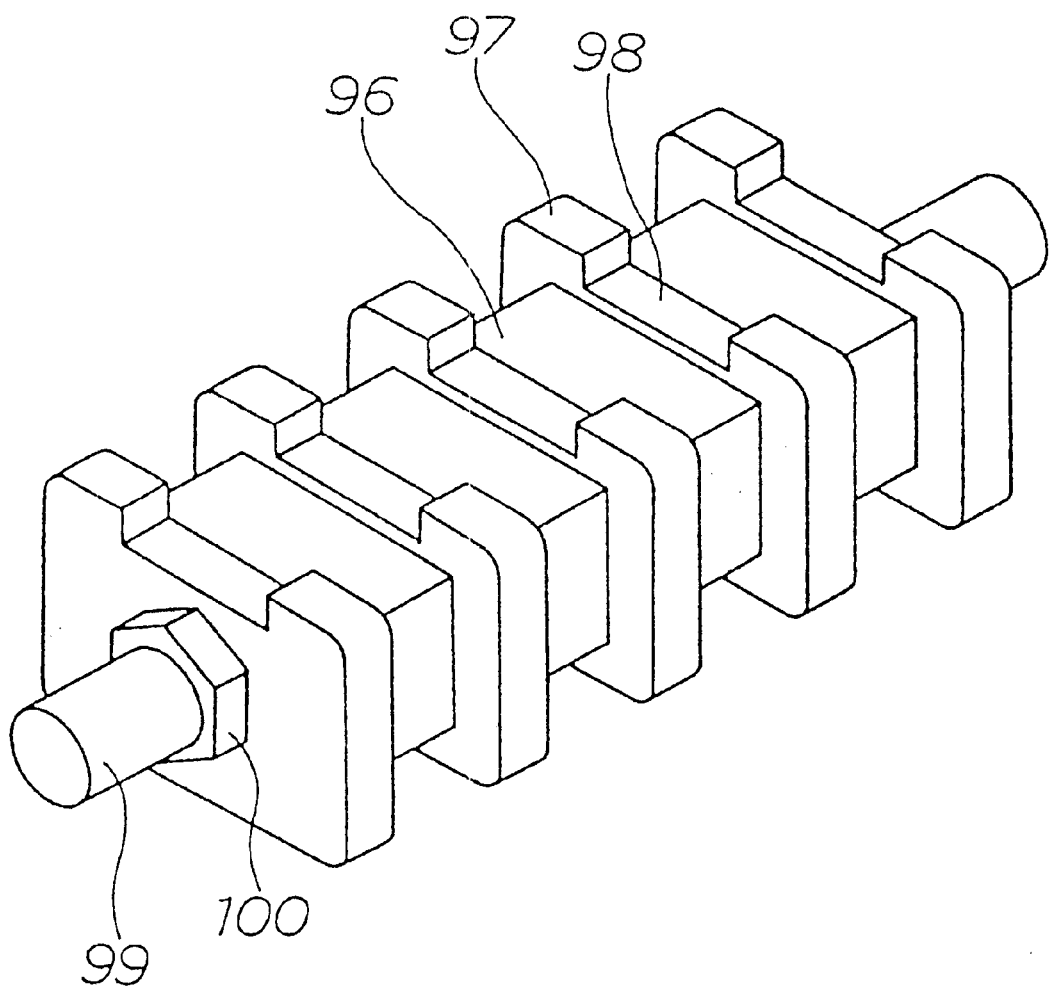
FIG. 32 is a perspective view of a bobbin, one embodiment of the twelfth invention.

FIG. 32 is a perspective view of a bobbin for forming the coil 92 by winding an electric wire. Reference numeral 96 is a frame for winding the electric wire, 97 a spacer, 98 a groove formed in the spacer 97 to provide a connecting section in the coil 92, and 99 a shaft. Reference numeral 100 is a nut. Removal of the nut 100 can disassemble the bobbin. Four bobbins for four one-phase coils form one set. A coil bobbin and an electric wire guide are disposed in six sets so that a coil winding machine can wind one to six electric wires simultaneously. The bobbin rotates to wind the electric wire on the frame 96 to form the coil 92. To form the coil 92, five 0.8-mm thick electric wires are wound three turns on the frame 96 simultaneously, crossed to the next frame 96 through the groove 98 of the spacer 97, and turned three times. This procedure is repeated for four coils to finish a one-phase coil.

In this case, the nut was conventionally removed to disassemble the bobbin to remove the coil from the bobbin, and the coil was fitted to the inserting jig of the winding inserting machine. But, in this embodiment, the coil is not removed, and the electric wire is wound on the electric wire, which is already wound on the bobbin, by repeating the above procedure. The formation of four coils is repeated four times to form desired 20 coils.

After forming the coil 92 by winding the electric wire on the bobbin multiple times, the bobbin is disassembled to remove the coil 92 from the bobbin, and the coil 92 is fit to the inserting jig of the winding inserting machine. And, the winding inserting machine is operated to insert the coil 92 into the slot of the stator 91. Thus, the coil insertion for one phase is completed.

Figure 33:
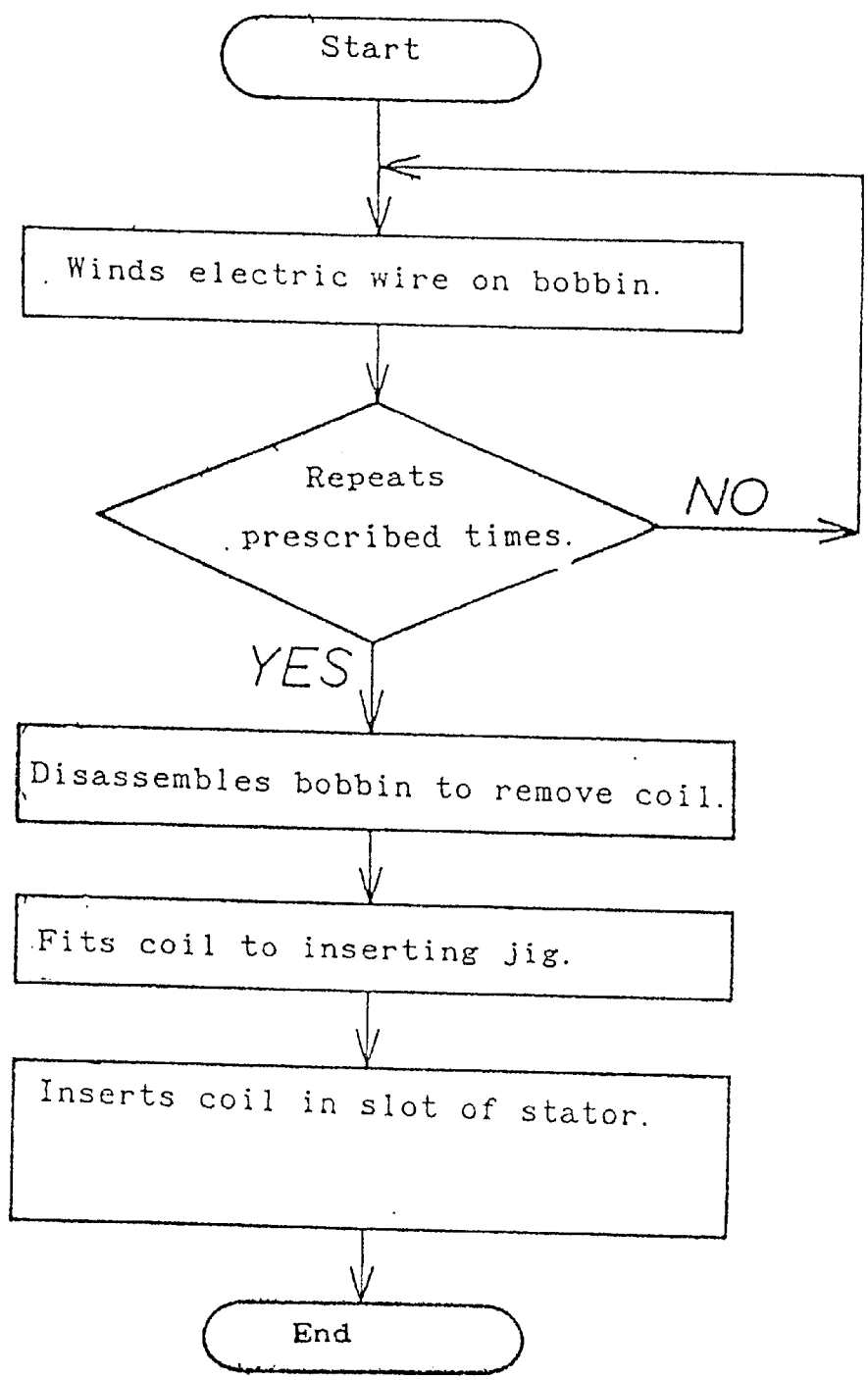
FIG. 33 is a production flowchart of a stator winding, one embodiment of the twelfth invention.

FIG. 33 shows a flowchart of the aforementioned stator winding production. First, the electric wire is wound on the bobbin. This procedure is repeated prescribed times. Then, the bobbin is disassembled to remove the coil 92 from the bobbin. The coil 92 is inserted in the jig of the winding inserting machine. Lastly, the winding inserting machine is operated to insert the coil 92 into the slot of the stator 91. Thus, the stator winding is produced.

Since the electric wire is wound on the bobbin multiple times to form the coil 92 and the coil 92 is inserted into the stator 91, the number of times for disassembling the bobbin and the number of times for inserting the coil 92 into the jig of the winding inserting machine are reduced, and productivity is improved. And, the fitting of the coil 92 to the jig of the winding inserting machine is facilitated, and a fitting error of the coil 92 is not caused easily. Further, since crossovers of the coils 92 are not tangled intricately, the number of coils 92 can be increased, the coil insertion can be facilitated, and the coil end becomes small.

The Y-connection for connecting the coils 92 of each phase needs to connect 20 wires per phase for three phases. Therefore, it is necessary to connect 60 wires. Connection is made as follows. First, sixty electric wires are cut to the same length, and their insulating films are peeled to a prescribed length. The insulating film is mechanically peeled one by one using a film peeling machine in view of safety and to avoid a problem of public pollution. In addition, the insulating film may be peeled using a chemical for example. Then, the electric wire is inserted in the crimp connector 94, which is then caulked using a prescribed cramp tool. Lastly, the cramp-connected section is covered with an insulating tube and fixed to the coil 92 using a thread or a binding band. The crimp connector 94 is the bare cramp sleeve P38 for copper wire of the JIS standard. Since sixty 0.8-mm thick electric wires are used, the total cross section is about 30 square millimeters, and the coils 92 are surely connected using the bare cramp sleeve P38 for copper wire.

Thus, the use of the cramp connector 94 to connect the coils 92, 92 eliminates preheating and cooling times which are required when soldering or welding even when many electric wires are used, improving productivity and connection reliability. Further, a disadvantage that heat affects the circumference can be completely remedied, so that the lead wire 93 is not melted by the soldering heat.

Figure 34:
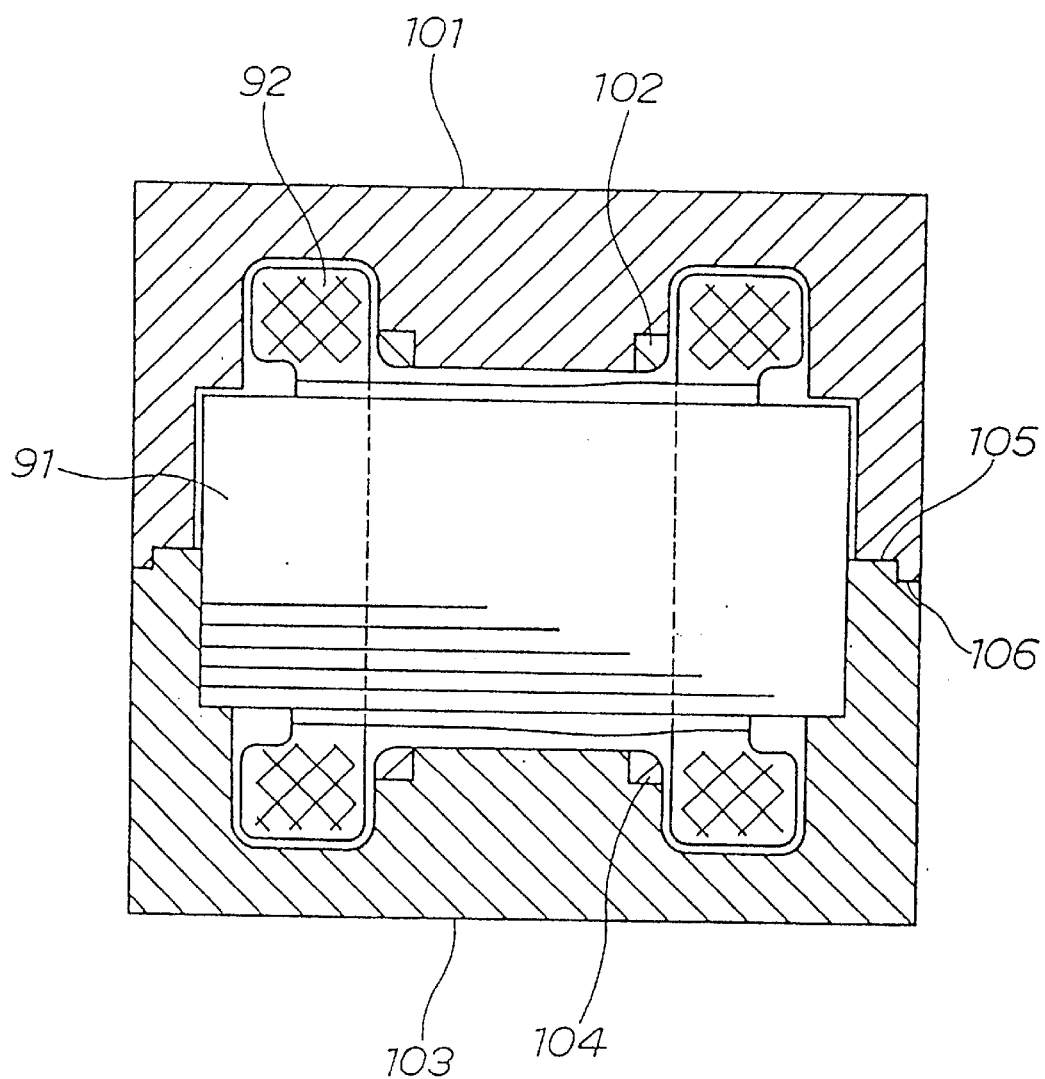
FIG. 34 is a sectional view of a forming jig, one embodiment of the twelfth invention.

FIG. 34 shows a sectional view of a forming jig for a coil end. Reference numeral 101 is an upper forming jig made of plastics excluding a tip part shown by 102. The tip part 102 is made of metal to prevent abrasion. Reference numeral 103 is a lower forming jig made of plastics excluding a tip part 104 which is made of metal. Reference numerals 105 and 106 are fitting sections. When the upper and lower forming jigs 101, 103 are pushed from above, the forming jigs 101, 103 on both sides of the stator 91 contact the fitting sections 105, 106, making positioning. When the forming jigs 101, 103 come into contact to each other, the stator 91 and the forming jig 101 have a space of about 0.2 mm to 1 mm therebetween. Therefore, a forming force for pushing the forming jigs 101, 103 using a press is not applied to the stator 91 from the forming jigs 101, 103. The coil end is formed by holding the stator 91, which has undergone the insertion of the coil 92, by the upper and lower forming jigs 101, 103, and pushing by a press from above. When the upper and lower forming jigs 101, 103 are pushed by the press, the coil 92 is deformed to conform to the shape of the forming jigs 101, 103 and formed into a prescribed shape.

Since the stator 91 is formed by multilaying silicon steel plates, it is weak to a force applied to a direction that the plates are displaced and deformed relatively easily. But, the forming jigs 101, 103 on both sides of the stator 91 come into contact to each other and a forming force is not applied to the stator 91 from the forming jigs 101, 103, so that the forming force is not applied to the stator 91, remedying a disadvantage that the stator 91 is deformed in the coil forming process.

The stator 91 undergone the coil end forming is subjected to the connection of the coils 92, 92 and the connection of the coil 92 and the lead wire 93, has the coil end tied by thread guarding, and is treated with varnish to become a completed stator product.

According to the invention, since the coil is formed by winding the electric wire on the bobbin multiple times and inserted into the stator, the coil can be easily fitted to the winding inserting machine, and a fitting error of the coil does not occur easily. Further, since the crossovers of the coils are not tangled intricately, the number of coils can be increased, the coil insertion can be facilitated, and the coil end becomes small.

And, the use of the cramp connector to connect the coils eliminates preheating and cooling times which are required when soldering or welding even when many electric wires are used, improving productivity and connection reliability. And, safety (avoidance of an electric shock) is improved, and a disadvantage of thermal effects on the circumference can be completely remedied.

Furthermore, the use of the cramp connector to connect the lead wire and the coil eliminates preheating and cooling times which are required when soldering or welding even when many electric wires are used, improving productivity and connection reliability. Besides, a disadvantage of thermal effects on the circumference can be completely remedied, and the lead wire is not melted by the soldering heat.

In addition, since the forming jigs on both sides of the stator come into contact to each other and a forming force is designed not to apply to the stator from the forming jigs, the forming force is not applied to the stator, and a disadvantage that the stator is deformed in the coil forming process is remedied.

Figure 35:
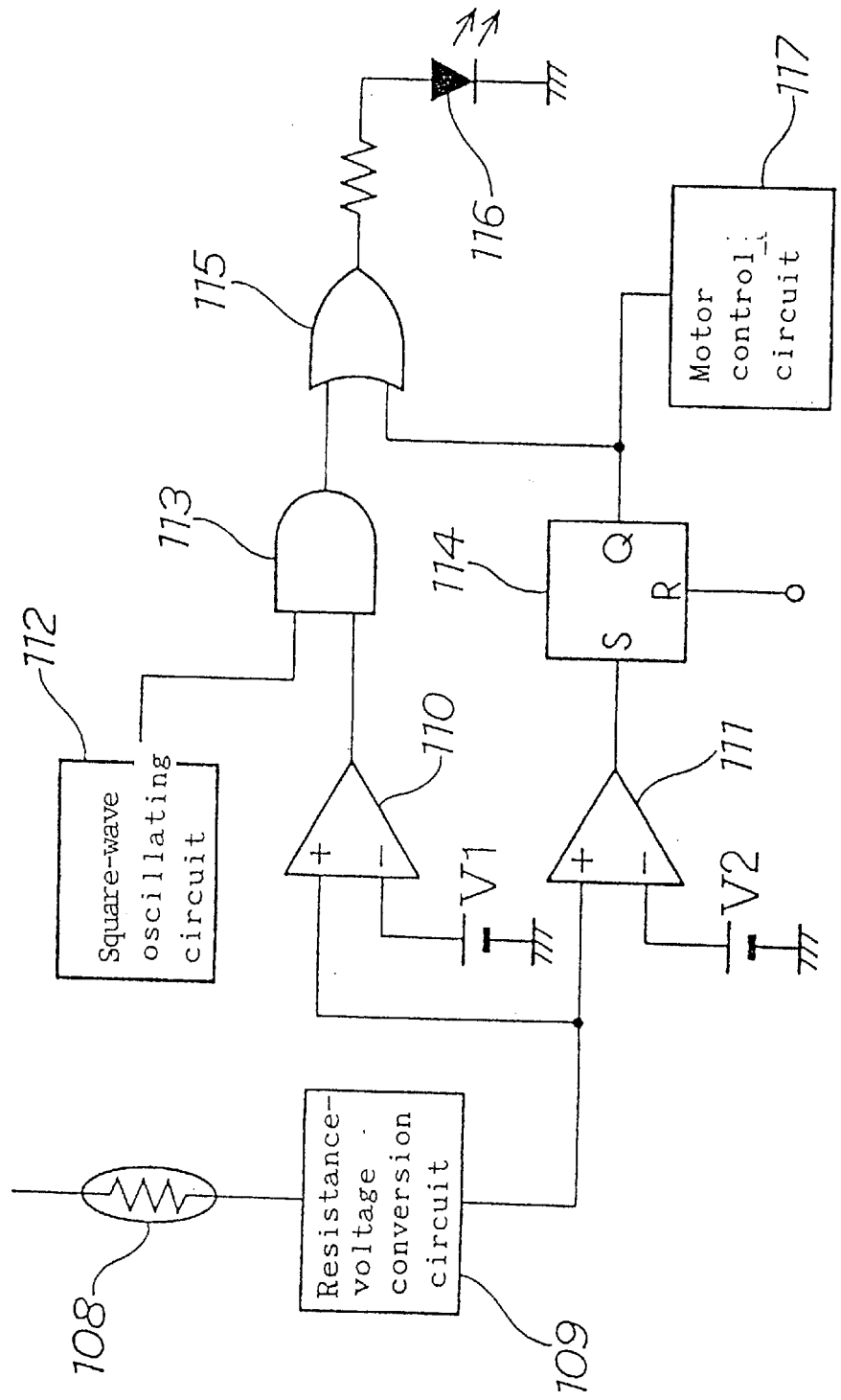
FIG. 35 is a connection diagram of a motor controller, one embodiment of the thirteenth invention.

FIG. 35 is a connection diagram of the motor controller according to this embodiment. In the drawing, reference numeral 108 represents a thermistor for detecting a temperature of a motor, which is actually disposed on part of a stator of the motor. Reference numeral 109 represents a resistance-voltage conversion circuit for converting a resistance value of the thermistor 108 varying depending on a temperature into a voltage value, which includes a circuit so that the output voltage is increased as the motor temperature rises. Reference numerals 110, 111 represent comparators and the output voltage of the resistance-voltage conversion circuit 109 is entered into the non-inversion input terminals of the comparators. And, a standard voltage V1 is connected to the inversion input terminal of the comparator 110 and a standard voltage V2 to the inversion input terminal of the comparator 111. V2 is set to a voltage higher than V1. Reference numeral 112 represents a square-wave oscillating circuit, which repeatedly outputs H level and L level at a certain oscillating cycle. The outputs from the square-wave oscillating circuit 112 and the comparator 110 are entered into AND gate 113. The output from the comparator 111 is entered into an S terminal of an RS latch 114. Further, the outputs from the AND gate 113 and the RS latch 114 are entered into an OR gate 115. The output from the OR gate 115 is connected to a light emitting diode 116. And, the output from the RS latch 114 is also entered into a motor controlling circuit 117.

When a temperature of the motor is low enough, the output voltage of the resistance-voltage conversion circuit 109 is lower than the standard voltage V1, and the outputs of the comparators 110, 111 are at L level. Therefore, the AND gate 113 does not meet AND conditions and its output becomes L level. When it is assumed that R terminal of the RS latch 114 is given a reset pulse before the operation of the motor and its output is reset to L level, OR conditions of the OR gate 115 are not fulfilled and its output is at L level. That is to say, the light emitting diode 116 remains turned off.

When a temperature of the motor rises to about a threshold value at which the revolution of the motor shall be stopped, the output voltage of the resistance-voltage conversion circuit 109 is short of the standard voltage V2 but higher than the standard voltage V1. In other words, the output of the comparator 110 becomes H level. Then, with the AND gate 113, the output of the square-wave oscillating circuit 112 becomes H level and AND conditions are fulfilled, so that the AND conditions are periodically realized. Since the OR conditions of the OR gate 115 are also realized when the AND conditions are realized at the AND gate 113, the output of the square-wave oscillating circuit 112 appears as such at the output of the OR gate 115. Therefore, the light emitting diode 116 blinks at the oscillating cycle of the square-wave oscillating circuit 112. An operator recognizes from the blinking of the light emitting diode that the motor is going to overheat. Thus, the operator is given a time to take a necessary procedure before the motor stops its revolution.

When the motor temperature further rises to reach a threshold value at which the revolution of the motor shall be stopped, the output of the resistance-voltage conversion circuit 109 also exceeds V2. In other words, the output of the comparator 111 becomes H level. At this time, the output of the RS latch 114 is latched to H level and the OR conditions of the OR gate 115 are always realized, so that its output becomes H level and the light emitting diode remains lighted. At the same time, the motor controlling circuit 117 detects that the output of the RS latch 114 has changed to H level and outputs a stop signal to the motor. When the motor stops, the inner temperature of the motor lowers gradually and overheat can be prevented. Adding a reset pulse to the R terminal of the RS latch 114 allows the motor to revolve again.

Figure 36:
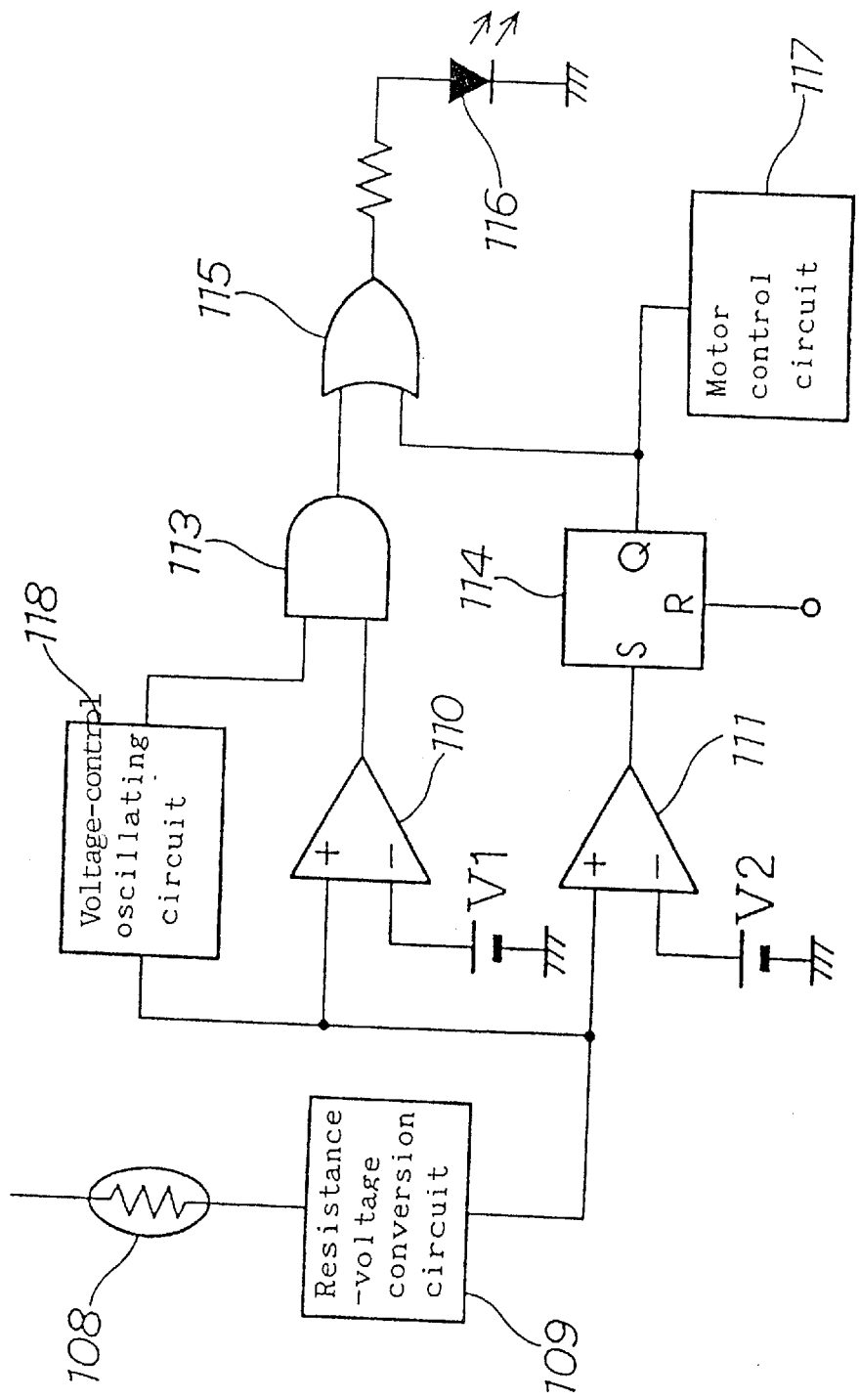
FIG. 36 is a connection diagram of a motor controller, another embodiment of the thirteenth invention.

FIG. 36 is a connection diagram of the motor controller showing another embodiment. In FIG. 36, a voltage controlling oscillating circuit 118 is used instead of the square-wave oscillating circuit 112 of FIG. 35. With the voltage controlling oscillating circuit 118, the oscillating cycle of a square wave to be outputted is changed according to the input voltage. In other words, since the blinking cycle of the light emitting diode changes continuously with respect to the change of the motor temperature, the operator is visually informed how the motor stops revolving due to overheating.

According to the invention, since the motor is automatically stopped from revolving in case of its overheating, the performance of a permanent magnet for a field magnet is never deteriorated by heat. And, by disposing an indication means to warn the overheating of the motor and starting to make the indication before stopping of the motor, an accident which may be caused by an unexpected stop of the motor can be prevented from happening.

Figure 37:
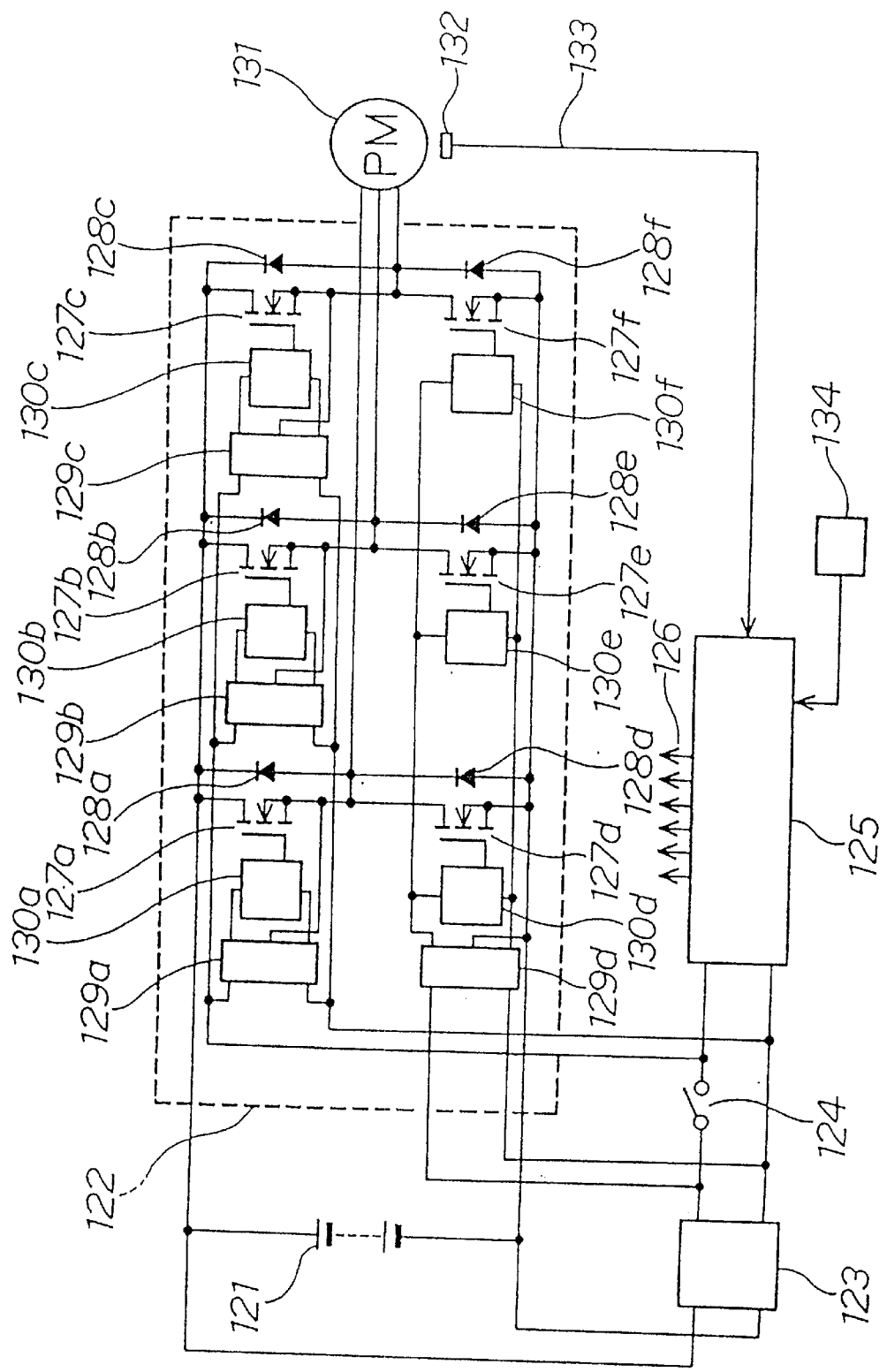
FIG. 37 is a drive circuit diagram of a motor controller, one embodiment of the fourteenth invention.
Figure 62:
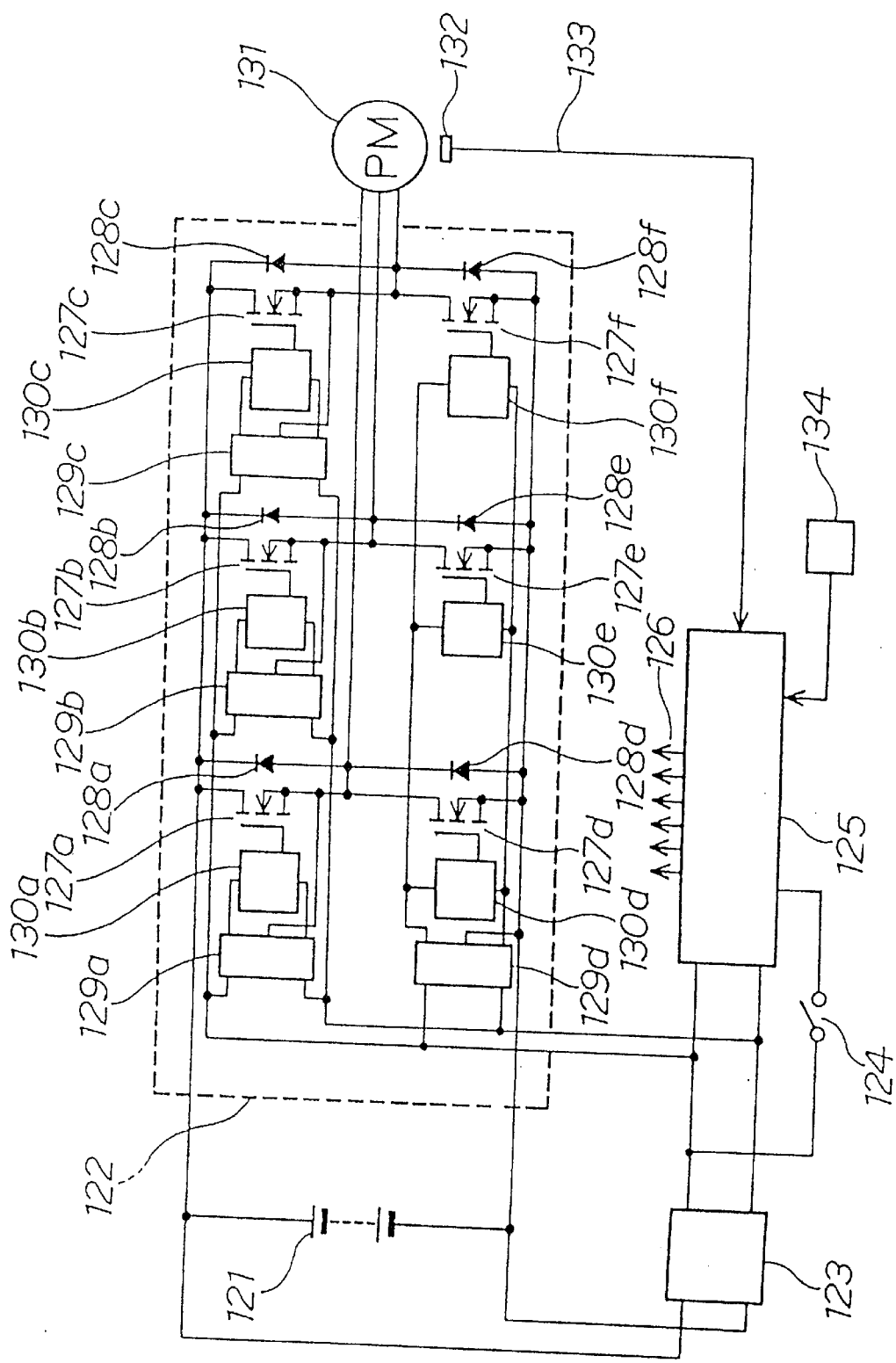
FIG. 62 is another drive circuit diagram of a conventional motor controller.

FIG. 37 shows a drive circuit diagram of a motor controller according to this embodiment. In this drawing, power is not supplied to a control circuit 125, power sources 129a, 129b, 129c, and control circuits 130a, 130b, 130c when a key switch 124 is off, while power is supplied to the entire circuit of a conventional embodiment shown in FIG. 62.

Figure 63:
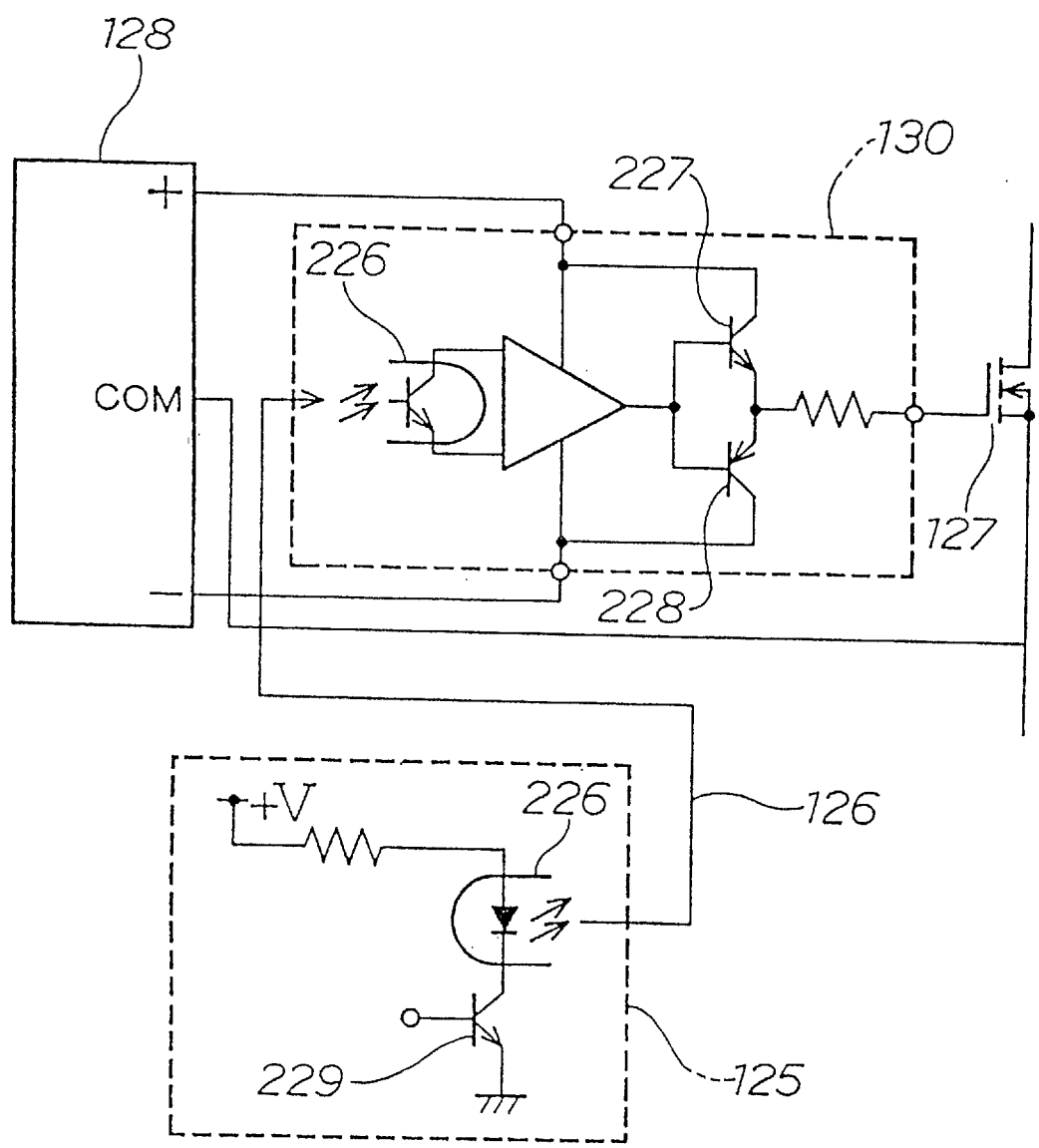
FIG. 63 is another drive circuit diagram of a conventional motor controller.

In FIG. 37, when the key switch 124 is off, power is not supplied to the power sources 129a, 129b, 129c. Specifically, since the control circuits 130a, 130b, 130c are not operated, semiconductor switches 127a, 127b, 127c connected to the plus terminal of a battery have neither of positive or negative voltage applied to the control terminal, and on/off falls in an unsteady state. But, since a power source 129d is fed, control circuits 130d, 130e, 130f are operating, and since the control circuit 125 is not supplied with power, a transistor 228 of FIG. 63 is not turned on, and an electrifying signal 126 is not outputted. Therefore, semiconductor switches 127d, 127e, 127f on the side of the minus terminal of the battery have a negative voltage applied to the control terminal, falling in an off state. As described above, regardless of no supply of power to most of the circuit including the control circuit 125, a short circuit between the battery terminals can be surely avoided. At this time, power is consumed only by a power source 123, the power source 129d, the control circuits 130d, 130e, 130f, and the control terminals of the semiconductor switches 127d, 127e, 127f. And, the consumed power is controlled to be very small, so that its value may be practically neglected.

Figure 38:
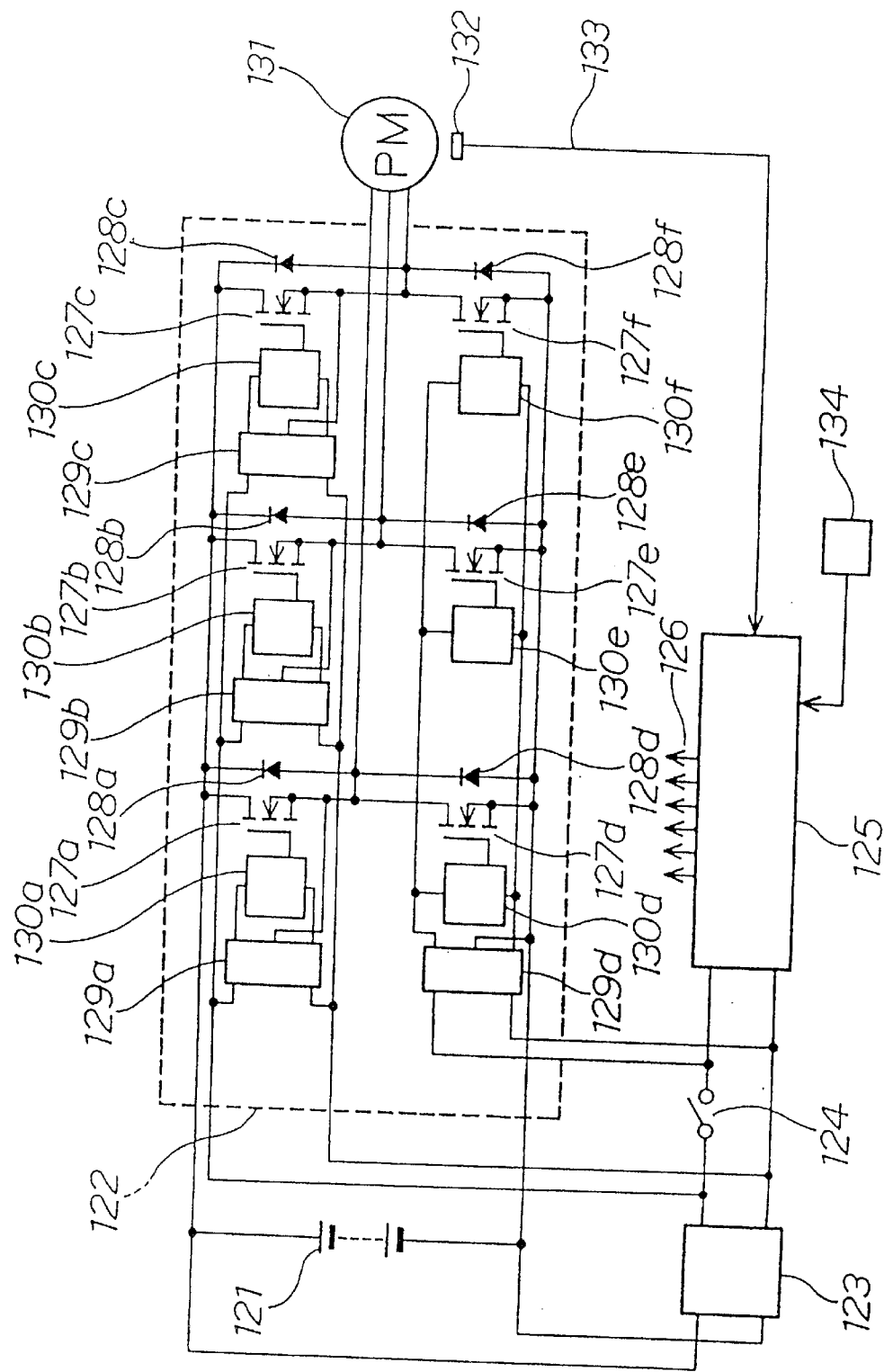
FIG. 38 is another drive circuit diagram of a motor controller, one embodiment of the fourteenth invention.

FIG. 38 shows another embodiment. In the above embodiment, the power source which is fed when the key switch is off is the power source 129d, but in FIG. 38, modifications are made so that the power sources 129a, 129b, 129c are fed, and the power source 129d is fed only when the key switch 124 is on. Operation is the same as in the above embodiment.

Figure 39:
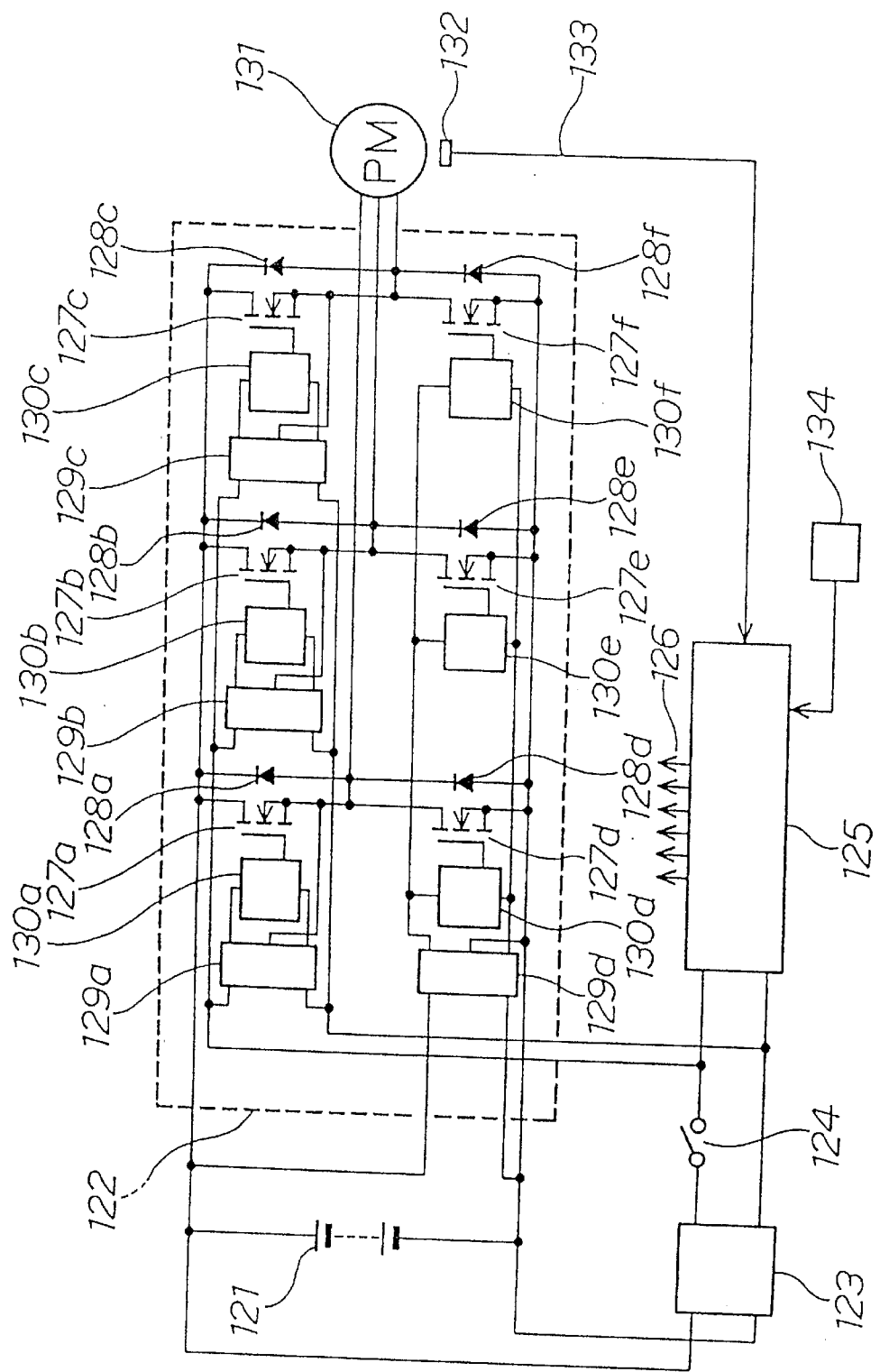
FIG. 39 is another drive circuit diagram of a motor controller, one embodiment of the fourteenth invention.

FIG. 39 shows still another embodiment. The power source 129 has power supplied from the power source 123 in FIG. 37, but modification is made to have power supplied from a battery 121 in FIG. 39. Taking a loss of the power source 123 into consideration, it is advantageous to have the power source 129d directly fed from the battery 121 as shown in FIG. 39.

In the above embodiment, the motor is a brushless DC motor, and the semiconductor switch within the inverter device is an MOSFET. But, it is not limited to the above. For example, the motor may be an induction motor, and the semiconductor switch may be a bipolar transistor, IGBT, or another element.

According to the invention, the circuit supplied with power with the key switch off is limited to the minimum part required to avoid a short circuit of the battery, so that the consumed power is reduced extensively. As a result, necessity of cutting off the output of the battery using a relay is eliminated, thereby making it possible to achieve a light-weighted vehicle body.

Figure 40:
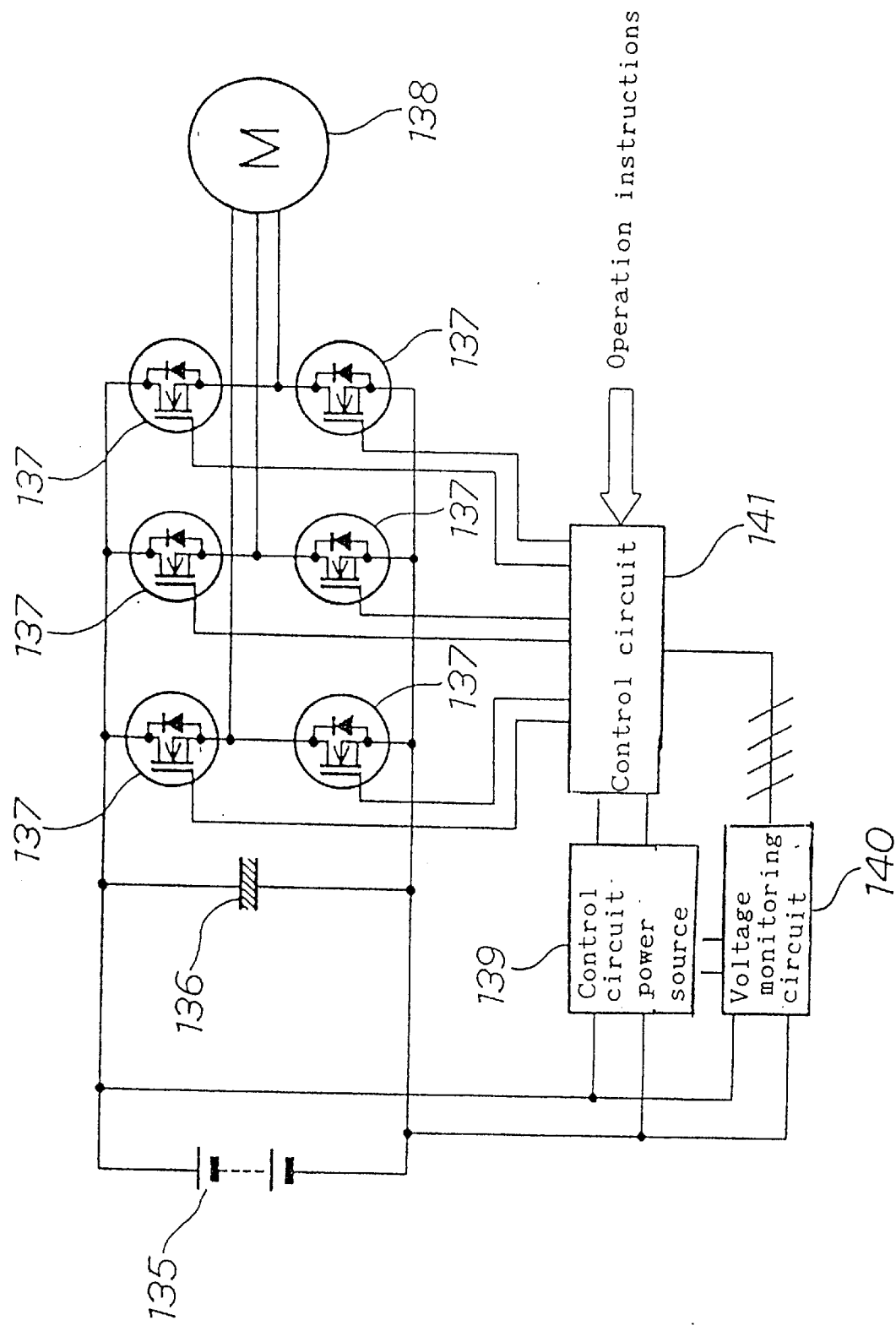
FIG. 40 is a drive circuit diagram of a motor controller, one embodiment of the fifteenth invention.

FIG. 40 is a drive circuit diagram of the motor controller of this embodiment. In this drawing, the motor driving device consists of a capacitor 136, a power element 137, a control circuit 141, a control circuit power source 139, and a voltage monitoring circuit 140.

A battery 135 is connected to the power element 137 to supply electric power to a motor 138 and to the control circuit power source 139 as well. The control circuit power source 139 varies a voltage of the battery 135 to a voltage suitable for the control circuit 141 and supplies electric power to the control circuit 141. The control circuit 141 controls the power element 137 to operate the motor according to external operation instructions. The voltage monitoring circuit 140 is a means for detecting a terminal voltage of the battery 135 and detects the terminal voltage of the battery 135 to send the detected results to the control circuit 141.

Figure 41:
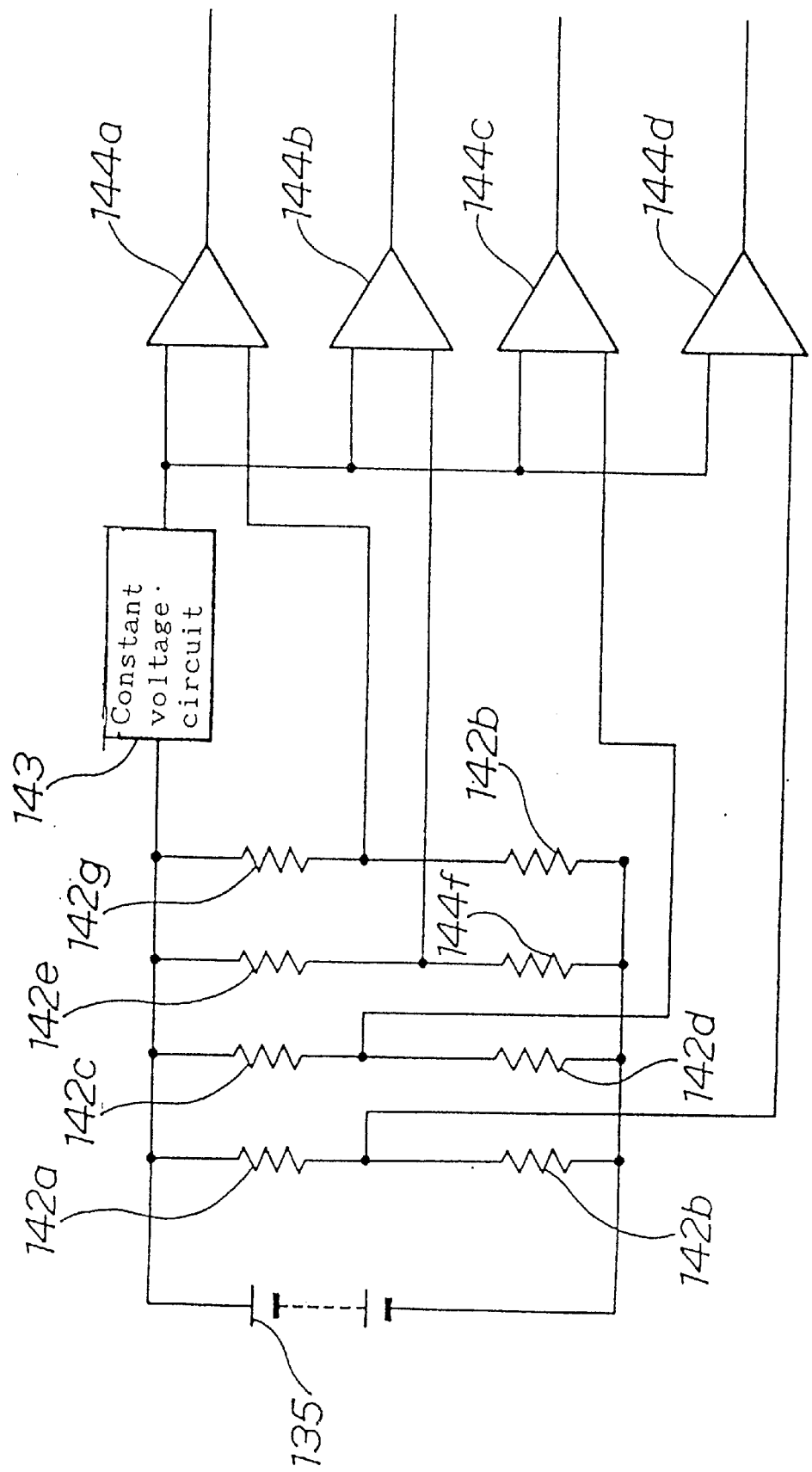
FIG. 41 is a voltage monitoring circuit diagram, one embodiment of the fifteenth invention.

FIG. 41 shows a configuration example of the voltage monitoring circuit 140. A constant voltage circuit 143 is connected to the battery 135 and lowers a voltage of the battery 135 to generate a constant voltage. In this case, a value of the voltage from the constant voltage circuit 143 is preferably set to a value lower enough than a voltage value to be detected. Resistors 142a through 142h are in pairs, forming four potential dividers. In this embodiment, two potential dividers are used to lower a voltage of the battery 135 and the other two to raise a voltage. Each potential divider selects a resistance value so as to be equal to a value of the voltage from the constant voltage circuit when a terminal voltage of the battery 135 becomes a voltage value desired to be detected. The output from the constant voltage circuit and the output from the potential dividers are entered into the input terminals of comparators 144a through 144d, and the outputs from the comparators 144a through 144d are varied according to a terminal voltage of the battery 135.

Figure 42:
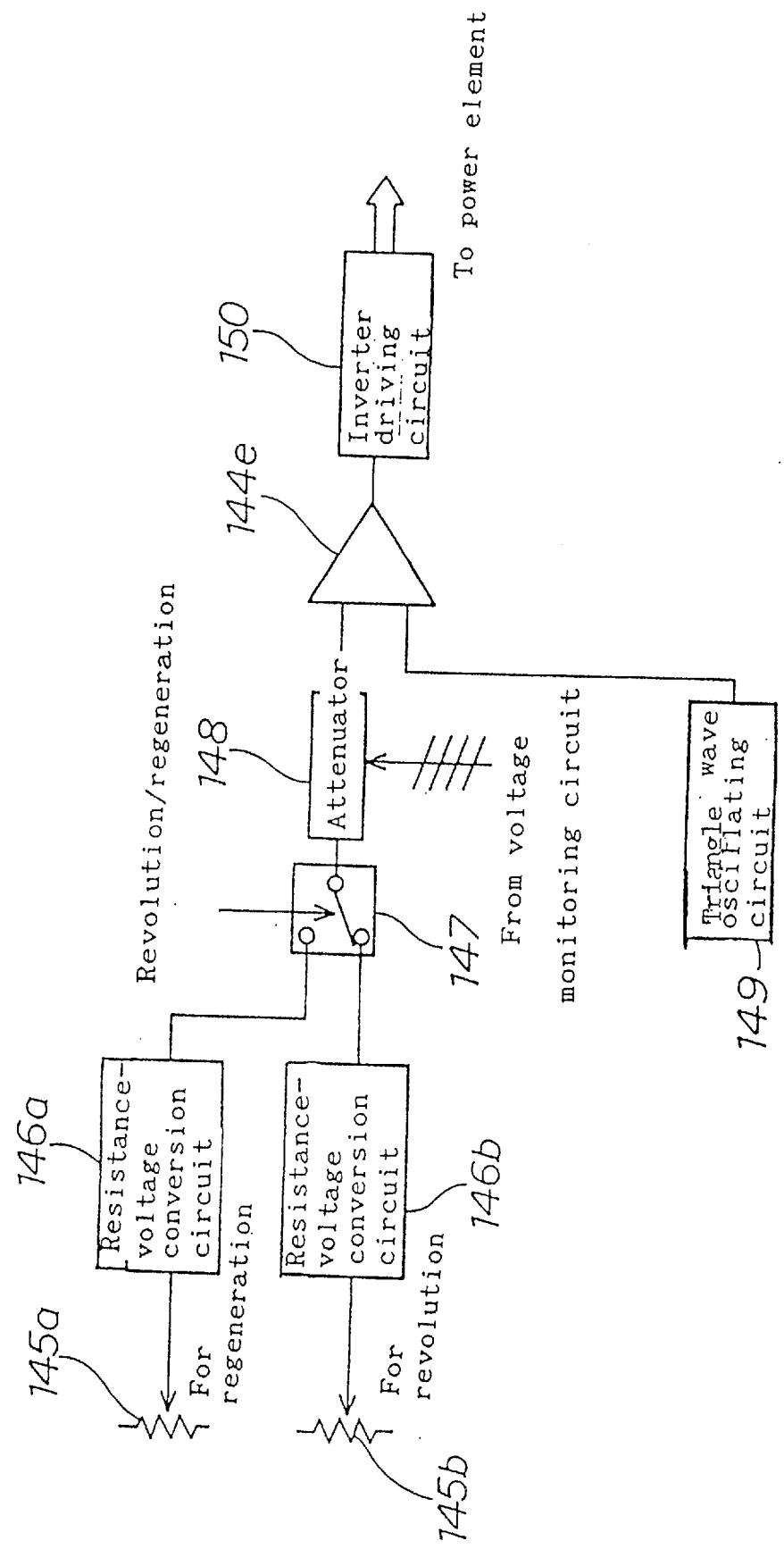
FIG. 42 is a block diagram of a control circuit, one embodiment of the fifteenth invention.

FIG. 42 shows a block diagram of the control circuit. In this embodiment, the instructions on the output volume and the regenerative volume of the motor are given by a change of the resistance value. Reference numerals 145a and 145b are variable resistors for instructing the regeneration and the output of the motor. Respective resistance values of the variable resistors are sent to resistance-voltage conversion circuits 146*a*, 146*b* and converted into voltage values. The converted voltage values are entered into a switch 147. The switch 147 selects the voltage values of the output volume and the regenerative value according to external instructions.

The output of the switch 147 is entered into the comparator 144*e* via an attenuator 148. The output of a chopping wave oscillating circuit 149 is entered into one input terminal of the comparator 144*e*. Thus, a square wave having a pulse width corresponding to the resistance values of the variable resistors 145*a*, 145*b* is obtained from the output of the comparator 144*e*. The square wave having its pulse width modulated by the resistance values of the variable resistors 145*a*, 145*b* is entered into an inverter driving circuit 150. The inverter driving circuit 150 subjects the power element to a chopping driving with the pulse width of the square wave to vary the power of the motor.

Between the output of the switch 147 and the input of the comparator 144*e*, the attenuator 148 is disposed as a means for varying the output to the motor according to the terminal voltage of the battery 135. An output signal of the voltage monitoring circuit 140 is entered into the attenuator 148. In other words, an attenuation amount of the voltage value is determined according to the terminal voltage of the battery 135, and the attenuated voltage value is entered into the comparator 144*e*. When the terminal voltage value of the battery is excessively raised or lowered, a signal is sent from the voltage monitoring circuit 140 to the attenuator 148, and a voltage value to be entered into the comparator 144*e* is lowered. When the input voltage value of the comparator 144*e* is lowered, the pulse width from the comparator 144*e* is narrowed. Thus, the output volume or regenerative volume of the motor can be reduced when the terminal voltage value of the battery 135 is lowered or raised.

Figure 43:
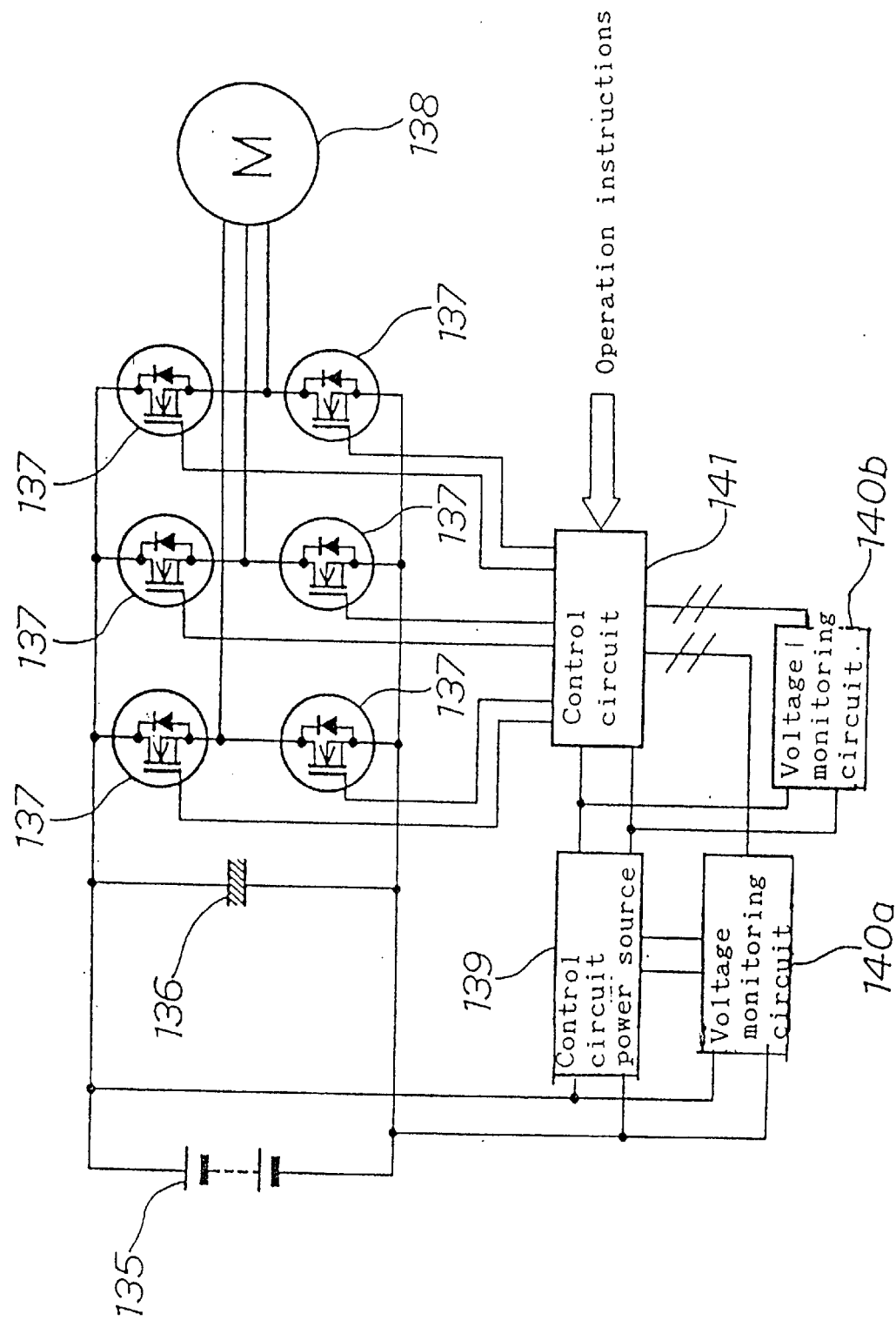
FIG. 43 is a drive circuit diagram of a motor controller, another embodiment of the fifteenth invention.

And, the voltage monitoring circuit 140 can be also disposed on the output side of the control circuit power source. FIG. 43 shows a block diagram. In this case, the voltage monitoring circuit 140 may set a detection voltage to a voltage value so that the control circuit does not malfunction. In FIG. 43, a voltage monitoring circuit 140*a* monitors if a voltage of the battery 135 rises, and a voltage monitoring circuit 140*b* monitors if a voltage of the battery 135 lowers. In FIG. 43, the construction is not different from the above description except that two voltage monitoring circuits 140*a*, 140*b* are disposed, and one of them is disposed on the output side of the control circuit power source.

According to the invention, the terminal voltage of the battery can be controlled by controlling the output volume and the regenerative volume of the motor, and the malfunction of the control circuit due to a destruction of the power source for the control circuit or a lowering of the output voltage of the control power source can be prevented. As a result, a trouble due to the malfunction of the control circuit can be prevented, and safety is improved. And, when regenerating, the degradation of the battery due to an excessive increase of the terminal voltage of the battery can be prevented.

This embodiment will be described with reference to a three-phase bipolar type inverter device mounted on an electric two wheeler. FIG. 44 is a plan view showing the arrangement of parts of the inverter device of this embodiment. FIG. 45 is a side view of the above arrangement. In these drawings, the inverter of this embodiment consists of a radiator 151, semiconductor devices 152, a rectifying capacitor 157, snubber capacitors 154, a current detector 156, a temperature detector 155, a copper bar 153, and semiconductor device protecting substrates 160.

Figure 46:
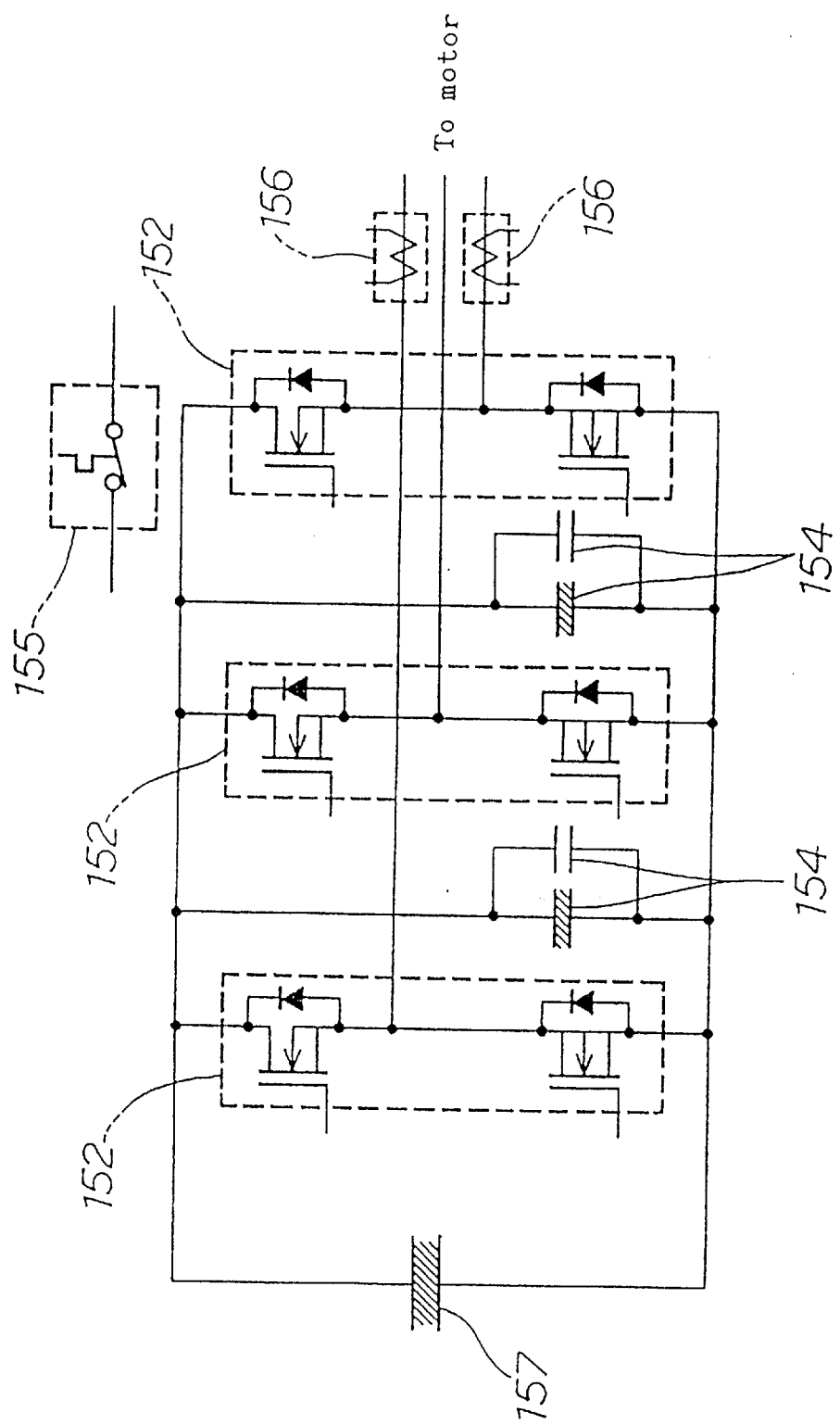
FIG. 46 is a circuit diagram of an inverter device, one embodiment of the sixteenth invention.

The three-phase bipolar type inverter consists of six semiconductor devices as shown in FIG. 46. In this embodiment, an MOS-FET is used as the semiconductor devices 152 but an IGBT and other semiconductor devices may be used. The semiconductor devices 152 of this embodiment are modularized, and two top and bottom semiconductors are accommodated in one package. A drain and a source for supplying electric power from a power source to a motor are screw terminals, and a gate and a source for controlling are fasten terminals.

Electric power is externally supplied and entered in the rectifying capacitor 157, flows a cable 158 and is supplied to each semiconductor device 152 through the copper bar 153. The copper bar has its surface insulated excepting parts which are attached to the semiconductor devices 152 in order to avoid a short circuit. Using the copper bar 153 allows a simple supply of electric power to respective semiconductor devices.

The temperature detector 155 sends a signal to the control device to stop the operation of the inverter device when the semiconductor devices 152 are heated to a temperature above a permitted temperature. Similarly, the current detector 156 sends a signal to the control device to stop the operation of the inverter device when electric current flows exceeding a permitted electric current of the semiconductor devices 152.

A control signal to the inverter device is entered in the semiconductor device protecting substrates 160 through a wire harness 159. The wire harness 159 is connected to the control device through a connector.

As shown in FIG. 44 and FIG. 45, the semiconductor devices 152 are disposed in a longitudinal direction side by side on the radiator 151, and the snubber capacitors 154 are mounted between the semiconductor devices.

Figure 47:
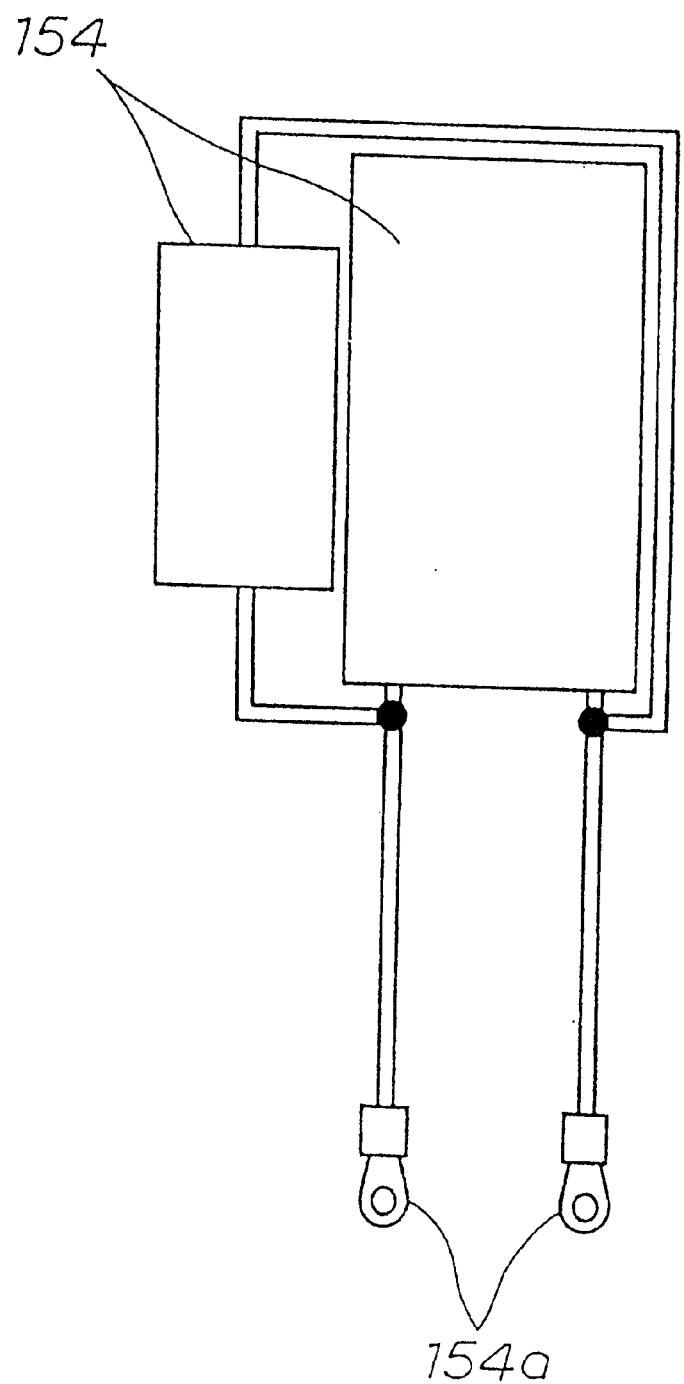
FIG. 47 is a snubber capacitor assembly diagram, one embodiment of the sixteenth invention.

The snubber capacitors are structured as shown in FIG. 47. In this embodiment, two types of capacitors, or an electrolytic capacitor and a film capacitor, are used in parallel in order to expand the frequency band of a serge voltage to be absorbed. The snubber capacitors may be structured by one type of or three or more types of capacitors depending on the frequency of serge generated. Two capacitors are connected by soldering and connected between plus and minus of the power source with crimp-style terminals 154*a*.

Figure 48:
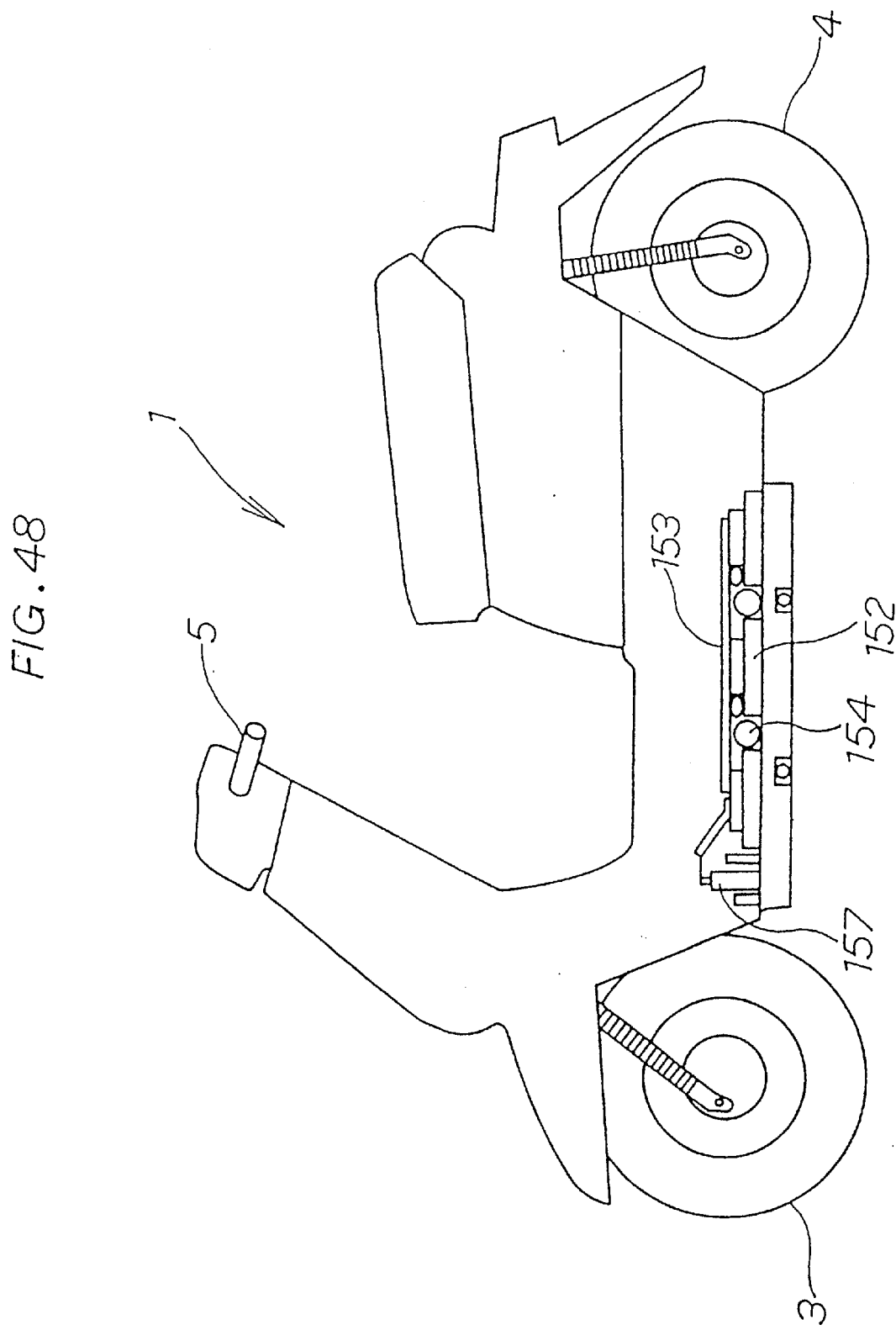
FIG. 48 is a side view showing a state of an inverter device of one embodiment of the sixteenth invention attached to an electric two-wheeler.

By disposing the semiconductor devices 152 in a longitudinal direction side by side and the snubber capacitors 154 between the semiconductor devices 152 as described above, the inverter device can be structured in crosswise. For example, the inverter device can be disposed in the lower part of the step of an electric two wheeler as shown in FIG. 48. Thus, very effective space efficiency can be obtained. Since the lower part of the step receives the best air flow when the electric two wheeler is traveling, cooling efficiency is excellent, and therefore, the volume of the radiator 151 can be made small.

By disposing the snubber capacitors 154 between the semiconductor devices 152, they can be disposed in a short distance from the position of the semiconductor devices 152, so that good electric characteristics can be obtained. In FIG. 44 and FIG. 45, the lead wire of the snubber capacitors is connected to the terminal of the semiconductor devices by taking workability into consideration, but when it is connected to the copper bar 153 in the shortest distance, much better electric characteristics can be obtained. Among parts forming the inverter device, the snubber capacitor is a part which is easily affected by a mechanical impact. Therefore, by disposing as in this embodiment, an external mechanical impact is received by the radiator 151 and the copper bar 153 which are not affected by such a mechanical impact, and the snubber capacitors 154 can be protected.

Figure 49:
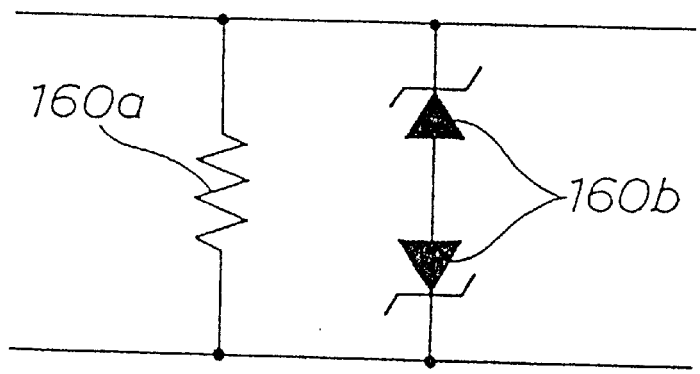
FIG. 49 is a circuit diagram of a semiconductor device protecting board, one embodiment of the sixteenth invention.

On the semiconductor device protecting substrate, the circuit shown in FIG. 49 is formed. A voltage regulation diode 160b is disposed to prevent the breakdown of the gate terminal of the semiconductor devices 152 which may be caused by overvoltage. And, a resistor 160a is attached to prevent the breakdown due to malfunction of the semiconductor devices 152 if a control signal is not entered in the semiconductor device protecting substrate 160 due to breakage or the like of the wire harness 159. In this embodiment, the protecting circuit is made of a resistor and a voltage regulation diode, but the voltage regulation diode may be replaced by an element such as a serge absorber having the same function.

Figure 50:
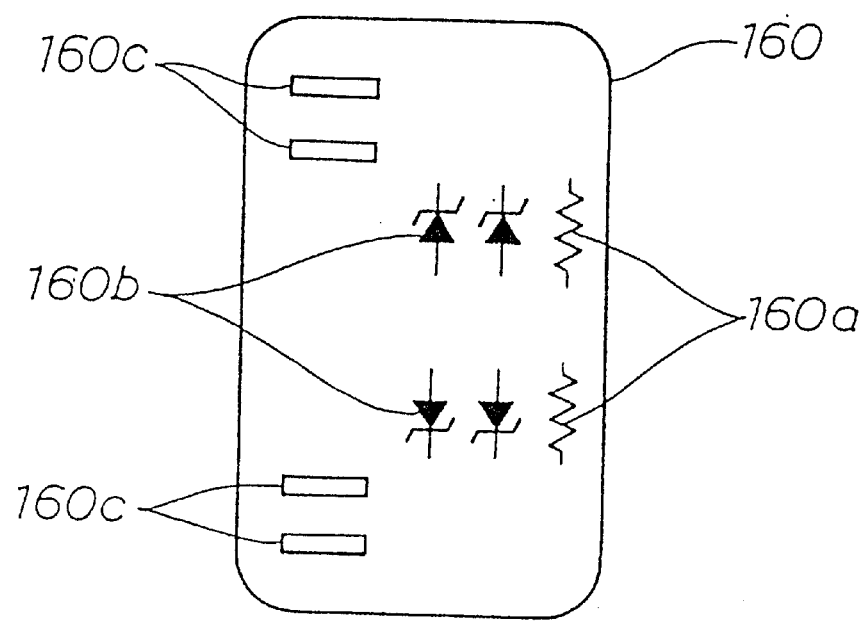
FIG. 50 is an assembly diagram of a semiconductor device protecting board, one embodiment of the sixteenth invention.

The semiconductor device protecting substrate 160 has a rectangular appearance as shown in FIG. 50. Since the semiconductor device 152 of this embodiment has two semiconductors accommodated in one package, the semiconductor device protecting substrate 160 has two sets of elements mounted. The reference numeral 160c represents holes which are designed to insert the fasten terminals for the source and the gate of the semiconductor device 152.

Figure 51:
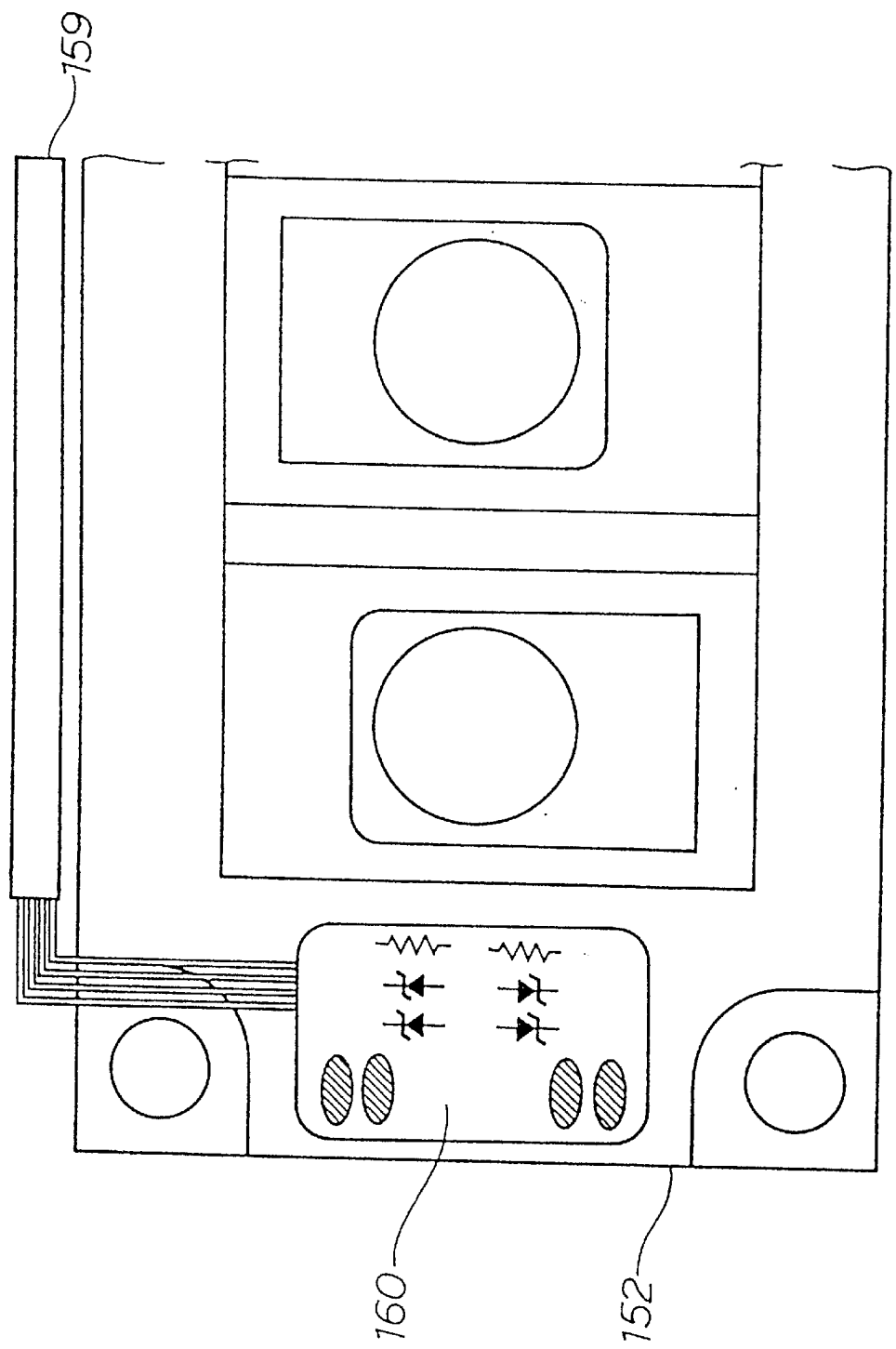
FIG. 51 is a mounting diagram of a semiconductor device protecting board, one embodiment of the sixteenth invention.

FIG. 51 shows a state that the semiconductor device protecting substrate 160 is attached to the semiconductor device 152. The semiconductor device protecting substrate 160 has the gate and the source of the semiconductor device 152 inserted into the holes 160c and connected by soldering. A semiconductor device drive signal is entered through the wire harness 159. Thus, by directly mounting the semiconductor device protecting substrate 160 to the semiconductor device 152, breakdown of the gate of the semiconductor device due to serge voltage or the like can be prevented even if the semiconductor device 152 is separated from a semiconductor device drive signal generating device. And, the control device and the inverter device can be freely disposed and the space efficiency can be enhanced.

According to the invention, the inverter device can be minimized and disposed in the lower part of the step having good cooling efficiency. Since the breakdown of the semiconductor devices can be prevented even if the control device is separated from the inverter device, safety is improved. And, flexibility of the mounting place of the control device is increased, so that the same space as in the case of a vehicle with an internal combustion engine can be secured. This embodiment has been described on the three-phase bipolar type inverter device which is mounted on an electric two wheeler, but the same structure can be applied to three-phase unipolar, two-phase bipolar, and other type of inverters.

Figure 52:
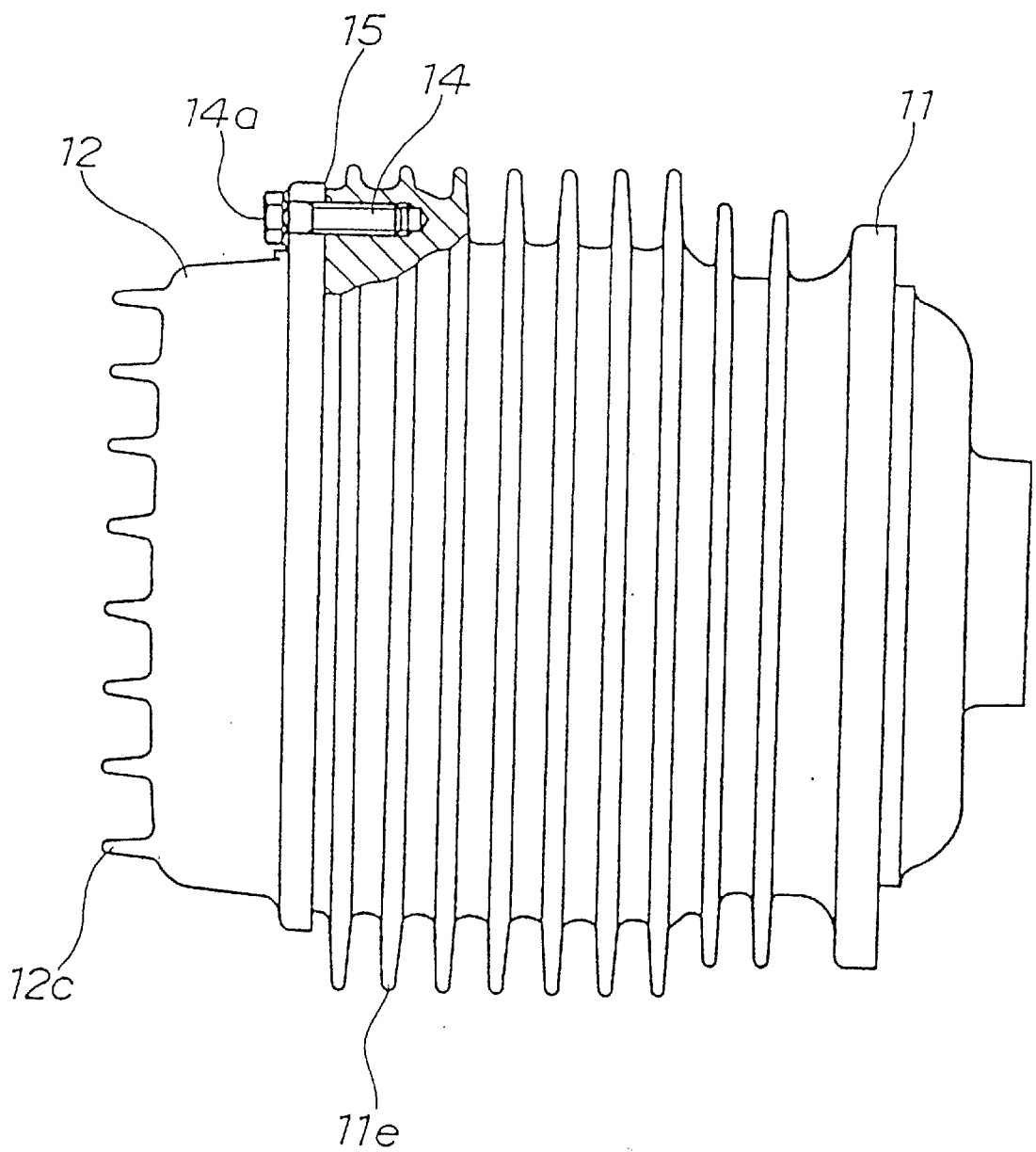
FIG. 52 is an appearance view of a motor, one embodiment of the seventeenth invention.
Figure 53:
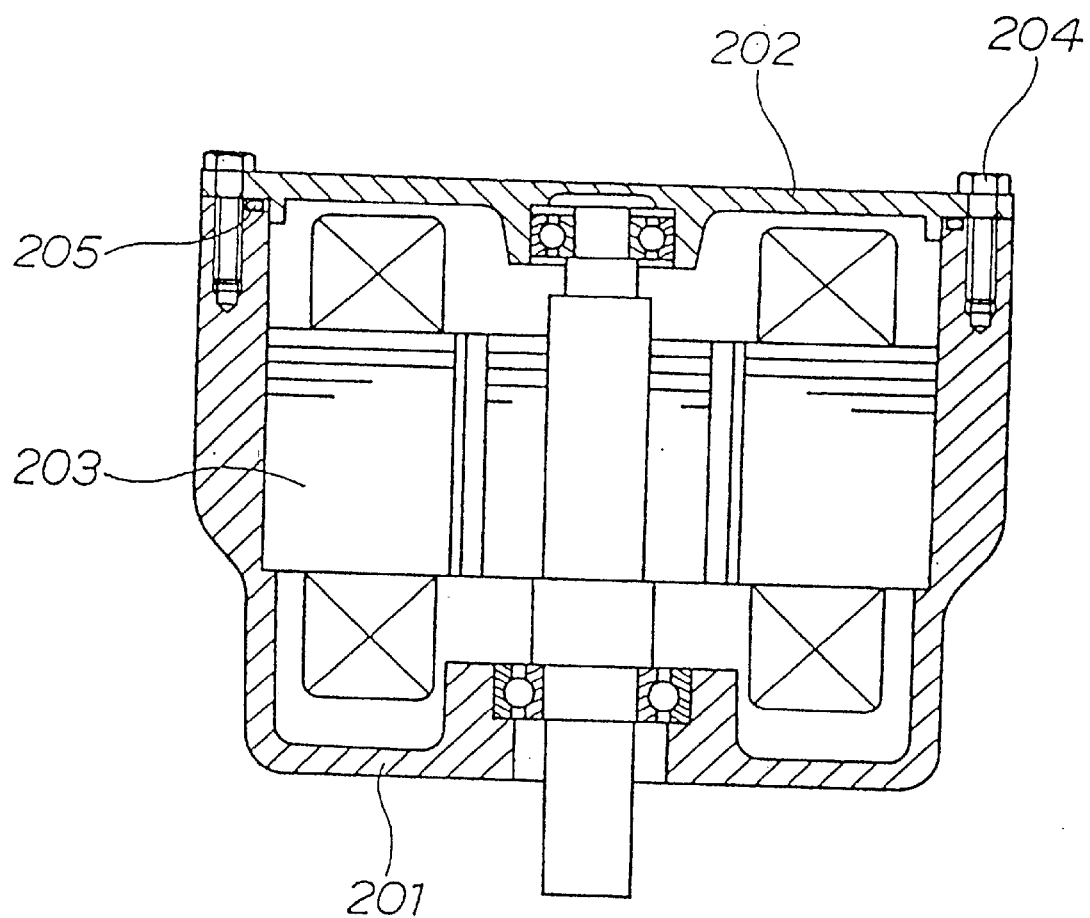
FIG. 53 is a vertical sectional view of a conventional motor.
Figure 54:
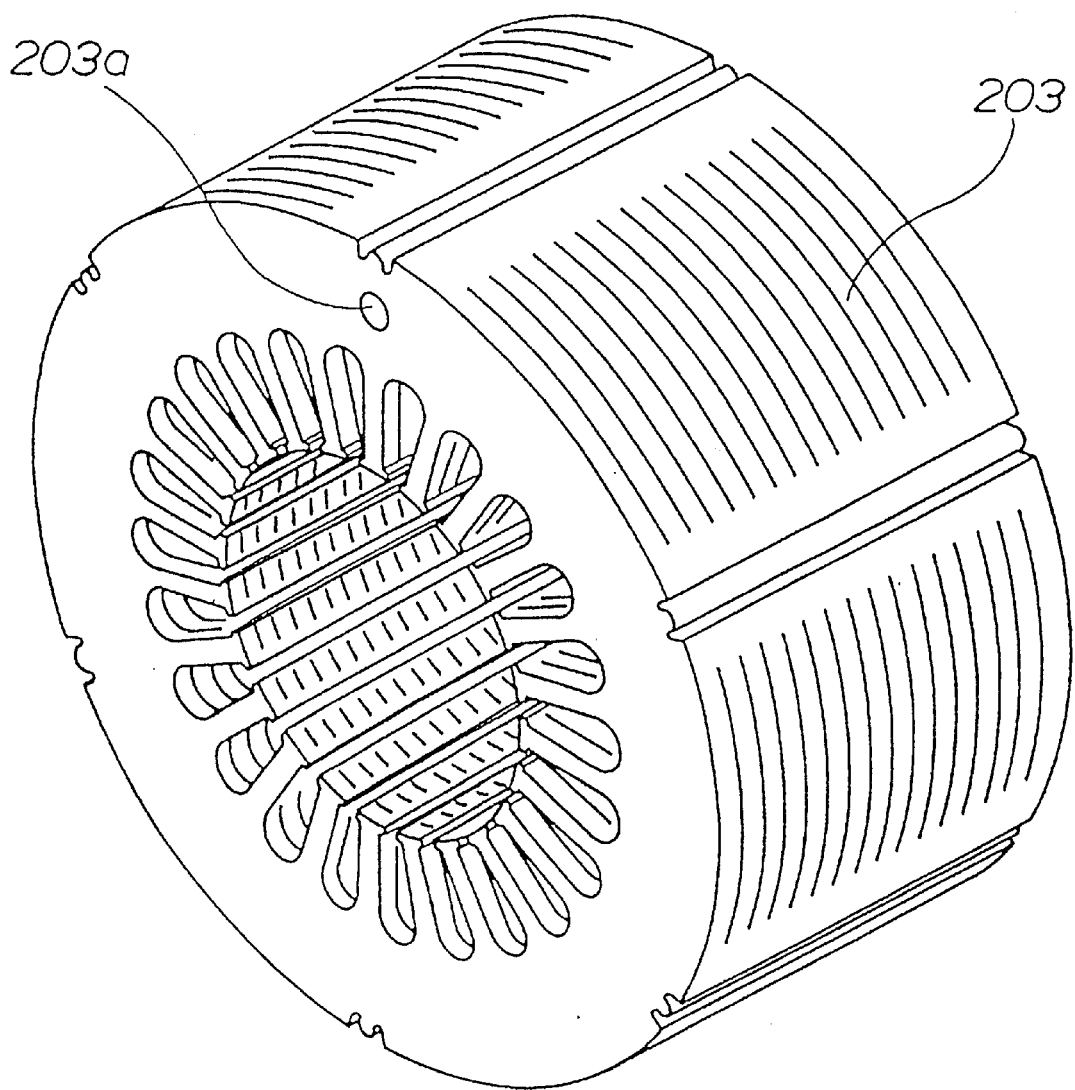
FIG. 54 is a perspective view of a stator of a conventional DC brushless motor.
Figure 55:
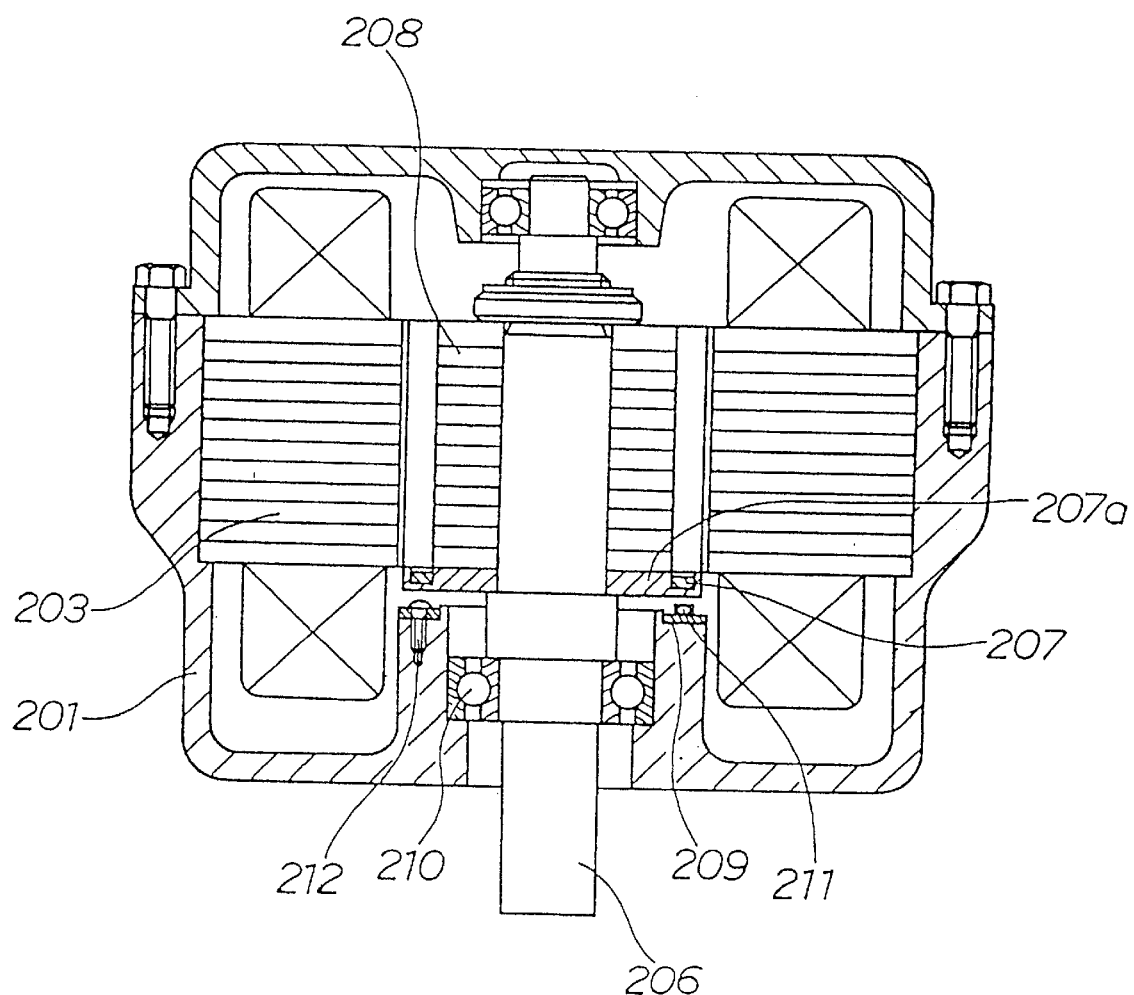
FIG. 55 is a vertical sectional view showing a conventional DC brushless motor.
Figure 57:
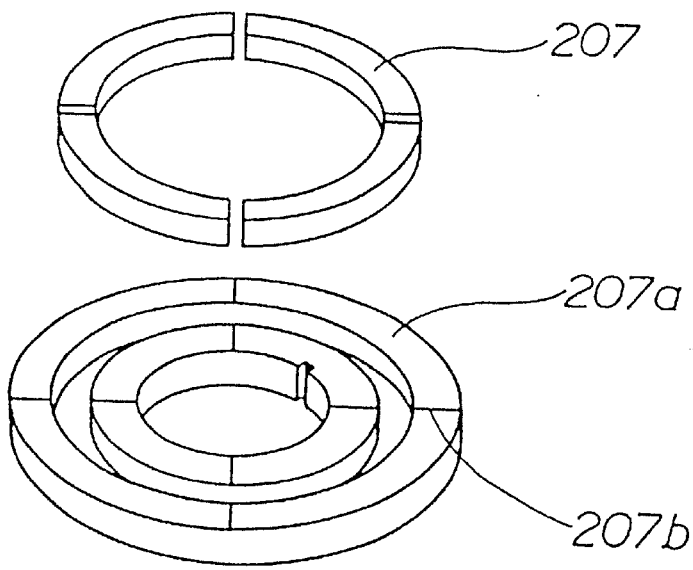
FIG. 57 is a perspective view showing a conventional encoder magnet and encoder magnet cover.
Figure 56:
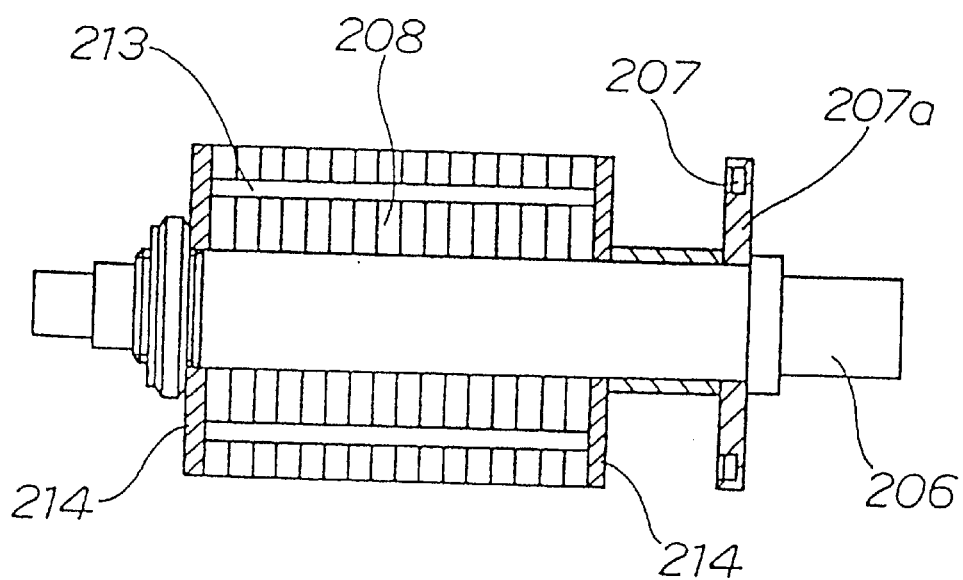
FIG. 56 is a vertical sectional view of the periphery of a shaft and a rotor, showing a conventional encoder magnet fixing structure.
Figure 58:
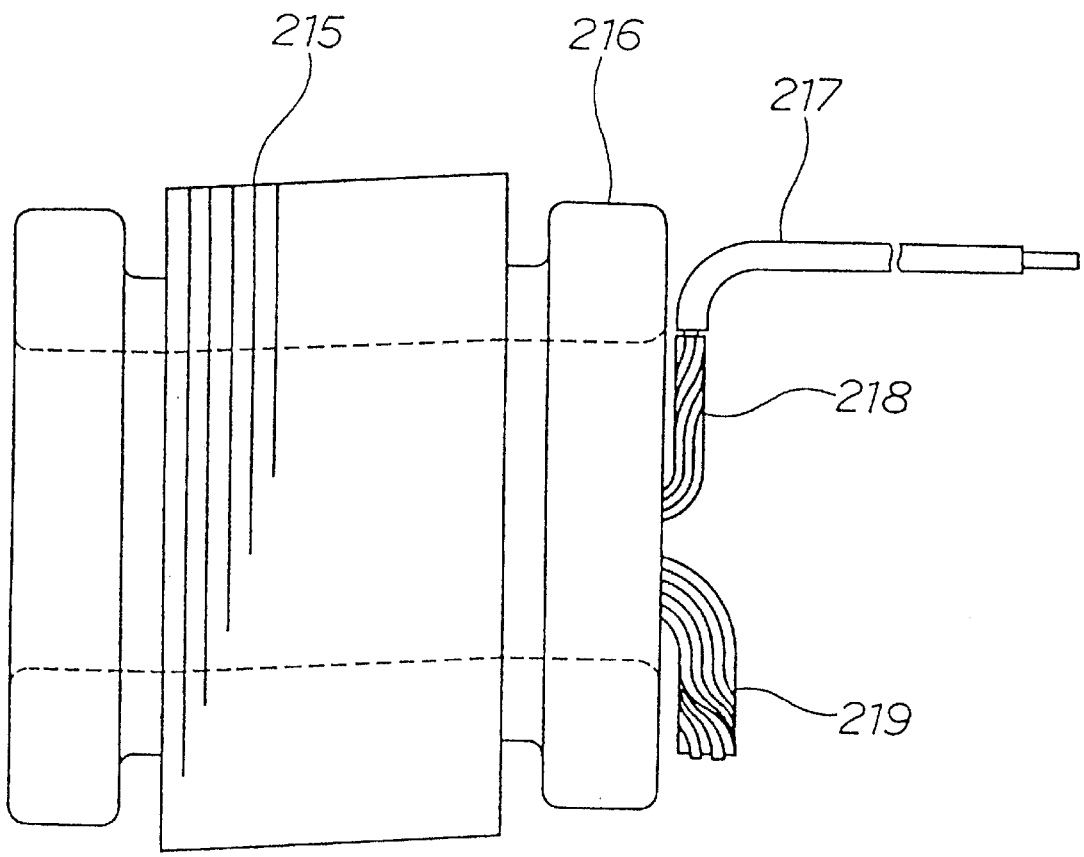
FIG. 58 is a side view of a conventional stator winding.
Figure 59:
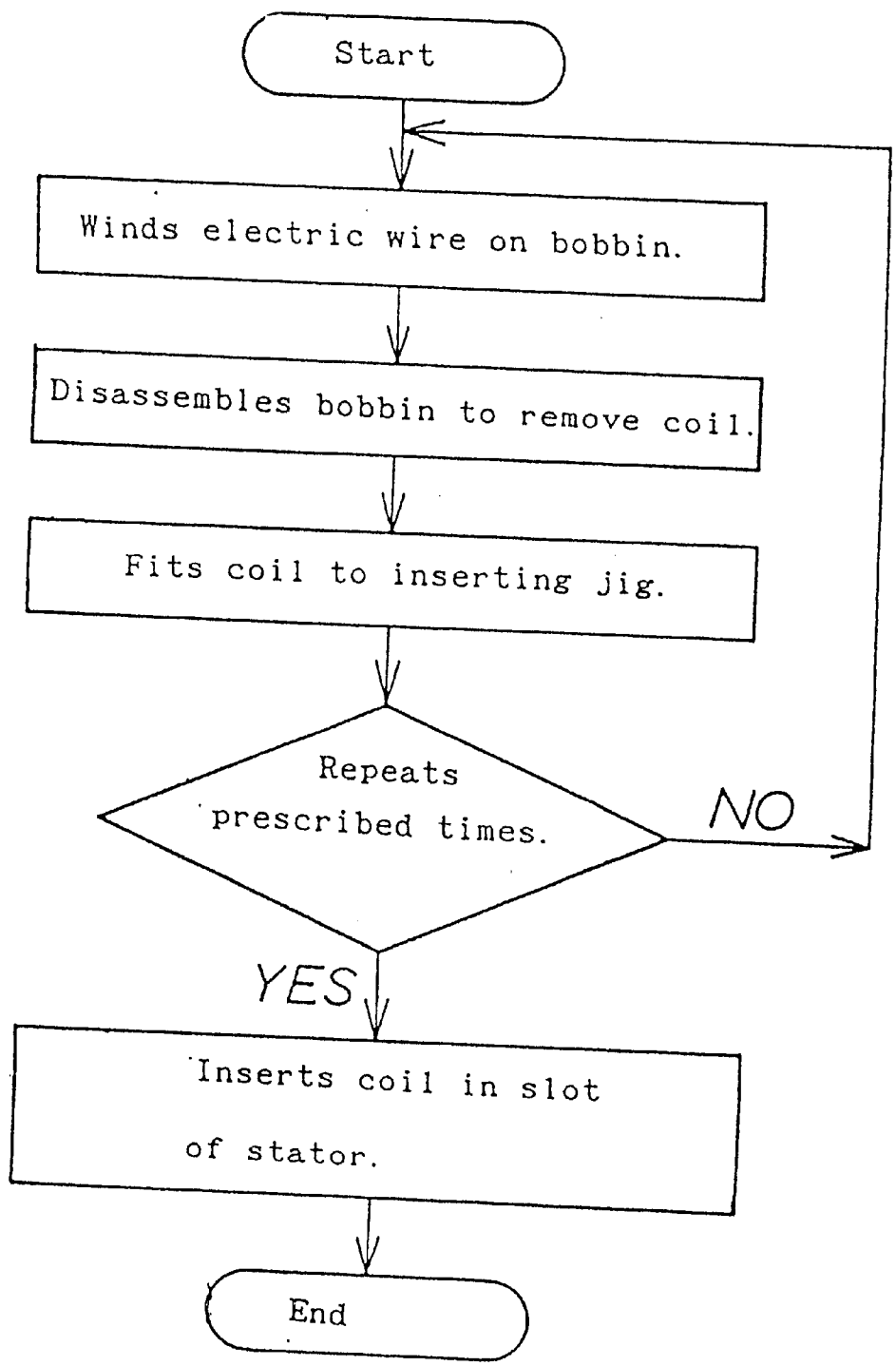
FIG. 59 is a production flowchart of a conventional stator winding.
Figure 60:
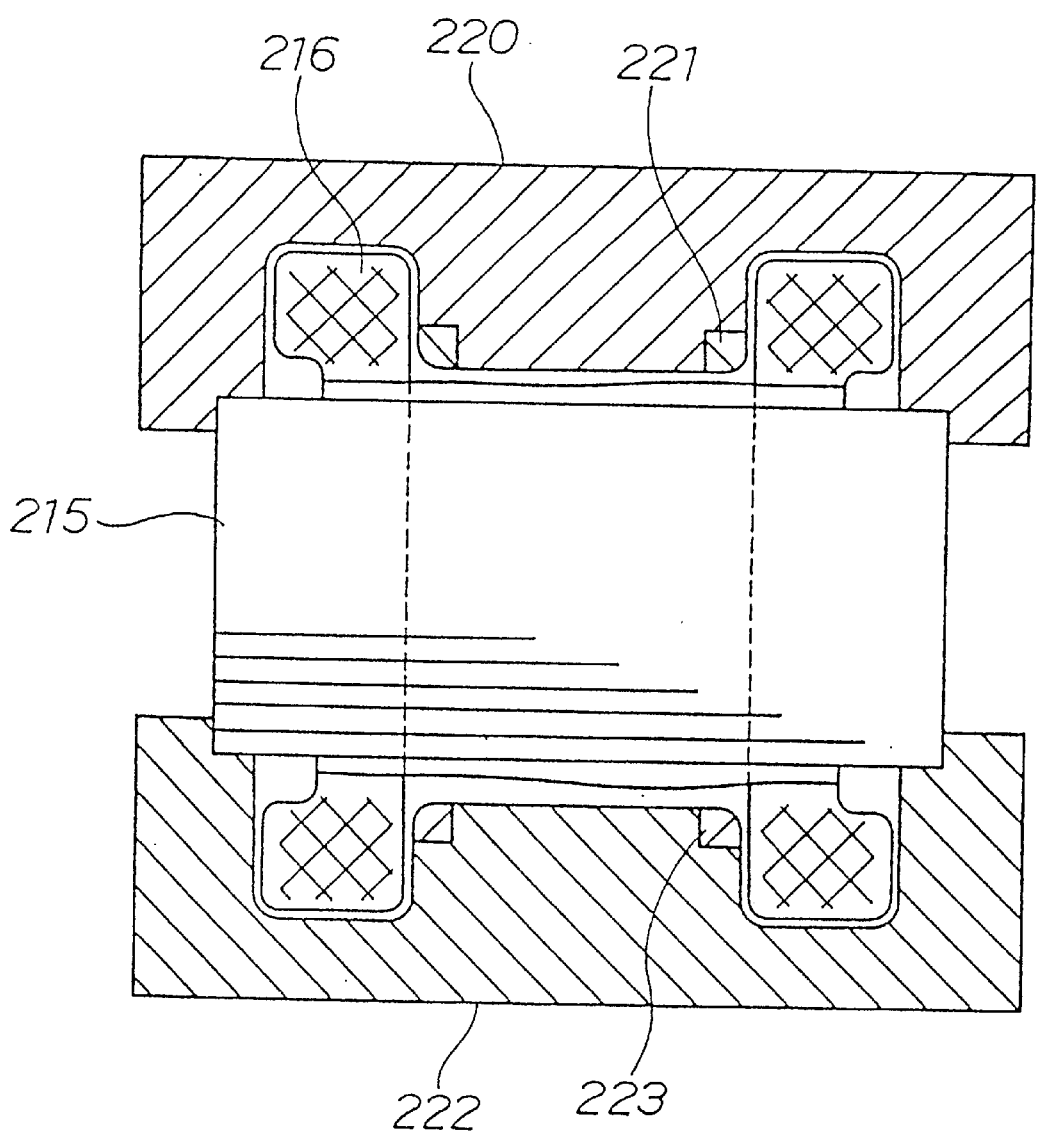
FIG. 60 is a sectional view of a conventional forming jig.
Figure 61:
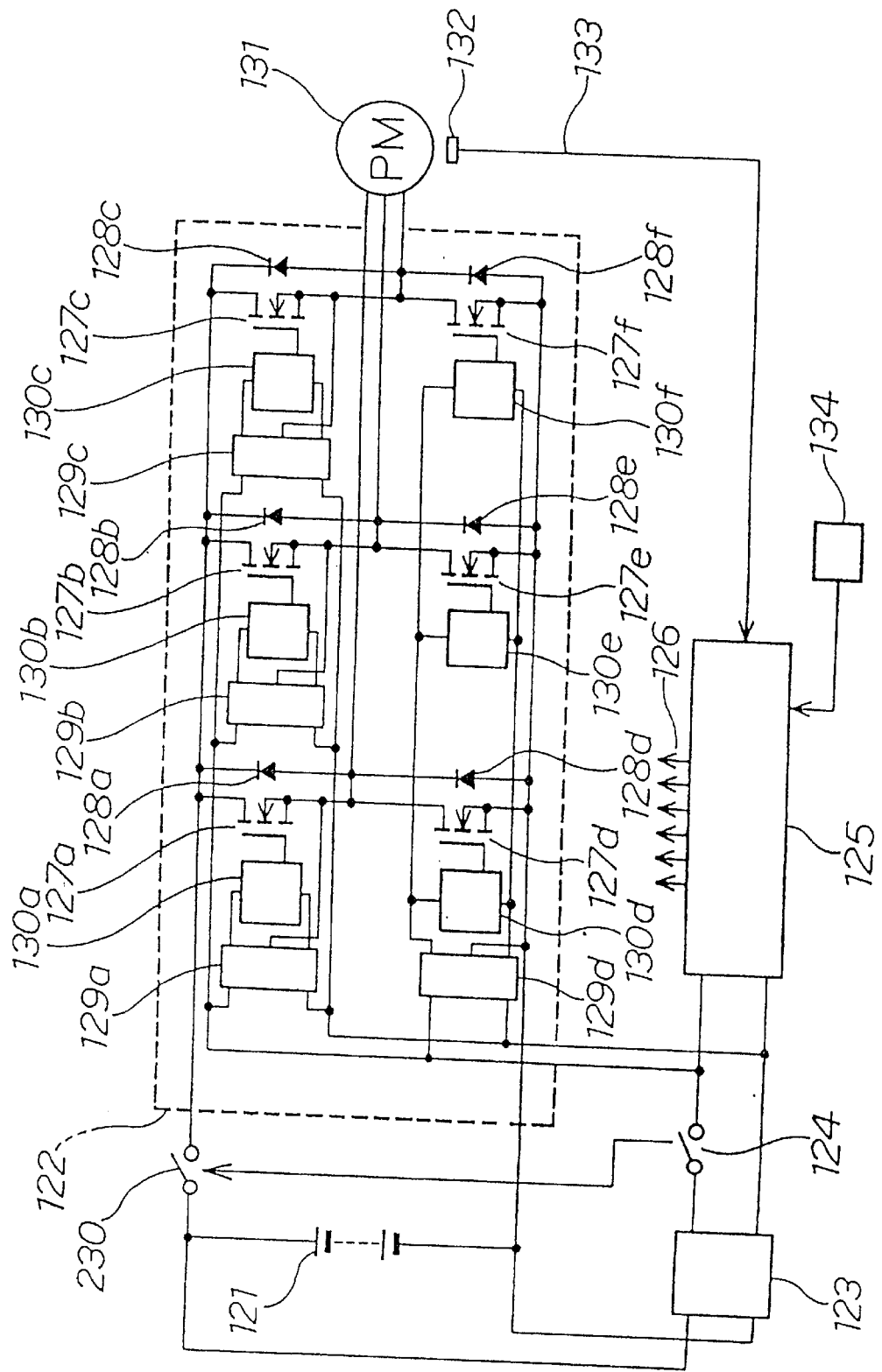
FIG. 61 is a drive circuit diagram of a conventional motor controller.

Referring to FIG. 13 and FIG. 52 being an appearance view of a motor, this embodiment will be described. A DC brushless motor shown in these drawings has a structure in that an output shaft (rotor shaft) 31 is rotatably supported by bearings 32, 32. These bearings 32, 32 are held by a motor cover 12 and a motor case 11 which form a casing for accommodating the functional parts of the motor. And, a stator 13 is made by multilaying silicon steel plates, and a coil 28 is wound on a prescribed position of the stator 13. The bearing 32 of the motor case 11 is supported near a rotor 29, so that the shaft end on the bearing 32 side of the output shaft 31 does not protrude from the motor case.

A rotor 29 is fixed coaxially with the output shaft 31 within the motor, and rotated keeping a little space from the stator 13 which is fixed to the motor case 11.

Since the output shaft 31 is merely supported by two ball bearings, and the bearings 32, 32 may be deformed or damaged by an external impact, it must be handled with sufficient care. The motor is very heavy because it has a magnet, and an impact is substantial when it is dropped. Since this embodiment has a structure in which the output shaft 31 does not protrude from the motor case 11, an external force is not directly applied to the output shaft 31. Therefore, the motor can be handled with ease and its reliability is improved. Further, an accommodating efficiency for packaging is improved, too.

The motor case 11 and the motor cover 12 for casing the motor shown in FIG. 52 are cast from an aluminum alloy. This production method can easily form rib-like projections lie, 12c integrally. The rib-like projections 11e, 12c are formed on the outer surfaces of the motor cover 12 and the motor case 11 to increase the surface area of the motor casing, thereby improving a cooling effect and suppressing the generation of heat of the motor. And, the rib-like projections 11e, 12c are thinner than the body and weak in strength. When an external impact is given to the motor, e.g. an electric two wheeler falls and the motor bumps against the surface of a road, the rib-like projections 11e, 12c are first to be impacted, thereby easing an impact against the motor body and enabling to minimize a functional damage.

The motor case 11 and the motor cover 12 forming a casing for the motor consist of two parts. And a sealant 15 is applied to the entire split faces of the motor case 11 and the motor cover 12 to seal the motor interior. The motor case 11 has four tapped holes formed and is structured to be joined with the motor cover 12 by four joining bolts from outside the motor cover 12, so that it can be disassembled or assembled. The motor 3 is assembled with its all inside functional parts controlled by the manufacturer through the production process so that its performance is secured. If the motor is carelessly disassembled to allow the entry of a foreign substance or remodeled, or its sealant is removed to deteriorate the sealing performance of the motor, its desired performance is deteriorated and a failure or accident may be caused. Therefore, it is important to prevent such events from happening. For the joining bolts 14 for joining the motor case 11 and the motor cover 12, special bolts which need a dedicated tool are used, so that disassembling cannot be easily made by anyone other than the manufacturer. This special bolt has a tool hole 14a drilled in its head and, since this tool hole 14a has a special form, the dedicated tool has to be used to fit its structure.

According to the invention, since the motor output shaft accommodated within the motor case is protected by the casing, an impact against the output shaft due to dropping or bumping against something in packaging, transporting or assembling work can be prevented, securing reliability in remedying the problems involved in handling. And, since the motor casing cannot be disassembled without using the dedicated tool, an accident due to mischief, remodeling or entry of a foreign substance can be prevented from happening.

Further, the motor casing has rib-like projections integrally formed with the motor case and the motor cover on their outer circumference to increase the surface area of the motor case and the motor cover, thereby improving a cooling effect and, in addition, in case of falling, an impact force against the motor is absorbed by the rib-like projections, thereby minimizing a damage to the motor body.

INDUSTRIAL APPLICABILITY

The inventions described above can be utilized for the holding and maintenance of motors and controllers for the electric motor vehicles using a motor, particularly for two wheelers and three wheelers such as motorcycles and scooters, and for the improvement of safety of electric motor vehicles.

We claim:

1. An electric motor vehicle having as a drive system a battery, a motor, and a controller for controlling rotation of the motor, comprising an accelerator for controlling speed of the motor, a key switch for turning on or off the motor and the controller, a circuit for judging an opening/closing state of the accelerator when said key switch is turned on, and a circuit for preventing the rotation of the motor when the key switch is turned on with the accelerator open.

2. An electric motor vehicle having as a drive system a battery, a motor, and a controller for controlling rotation of the motor, comprising:

an accelerator for controlling speed of the motor, a switch for prohibiting running, and a travel prohibiting circuit which judges opening/closing of the accelerator and maintains a travel prohibiting state even when the switch is released with the accelerator being open, wherein the travel prohibiting state, which is continuously maintained by the travel prohibiting circuit even when the switch is released with the accelerator open, is shifted to a travel allowing state by closing the accelerator.

3. An electric motor vehicle according to claim 2, wherein a resistor is provided in parallel with the contact terminals of at least one switch used.

* * * * *